US008337209B2

(12) United States Patent  (10) Patent No.: US 8,337,209 B2
Ashman, Jr.  (45) Date of Patent: Dec. 25, 2012

(54) COMPUTERIZED SYSTEMS AND METHODS FOR SELF-AWARENESS AND INTERPERSONAL RELATIONSHIP SKILL TRAINING AND DEVELOPMENT FOR IMPROVING ORGANIZATIONAL EFFICIENCY

(76) Inventor: Ward Ashman, Jr., Mountain View, CA (US)

( * ) Notice: Subject to any disclaimer, the term of this patent is extended or adjusted under 35 U.S.C. 154(b) by 1121 days.

(21) Appl. No.: 12/199,771

(22) Filed: Aug. 27, 2008

(65) Prior Publication Data

US 2010/0055655 A1  Mar. 4, 2010

(51) Int. Cl.
  *G09B 19/00* (2006.01)
(52) U.S. Cl. .................................. 434/236; 434/219
(58) Field of Classification Search .................. 434/236, 434/219, 238; 706/12, 52; 707/690; 340/10.6, 340/573.1; 709/206, 238; 273/242; 705/7.11, 705/309
  See application file for complete search history.

(56) References Cited

U.S. PATENT DOCUMENTS

| | | | | |
|---|---|---|---|---|
| 7,264,474 B2 * | 9/2007 | Sullivan et al. | ............... | 434/236 |
| 7,950,664 B2 * | 5/2011 | Chan | ............... | 273/292 |
| 2002/0045154 A1 * | 4/2002 | Wood et al. | ............... | 434/350 |
| 2003/0211449 A1 | 11/2003 | Seiller et al. | | |
| 2004/0219493 A1 | 11/2004 | Phillips | | |
| 2007/0048706 A1 * | 3/2007 | Tan | ............... | 434/236 |
| 2007/0208536 A1 | 9/2007 | Spector et al. | | |
| 2007/0245379 A1 * | 10/2007 | Agnihortri | ............... | 725/46 |
| 2007/0252812 A1 * | 11/2007 | Keahey | ............... | 345/156 |
| 2007/0282912 A1 | 12/2007 | Reiner | | |
| 2008/0081320 A1 * | 4/2008 | Hackett | ............... | 434/236 |

OTHER PUBLICATIONS

Ashman, Ward, "Creative Partnership—Course Manual", Trimergence, 2003, 32 pgs.
Ashman, Ward, "Insight to Action", Trimergence, 2003, 16 pgs.
Ashman, Ward, "Kernel Insights", Trimergence, 2003, 1 pg.
Ashman, Ward, "Managing Yourself Working Document", Trimergence, 1998, 45 pgs.
Ashman, Ward, "Survival-Evolution—Course Manual", Trimergence, 2003, 16 pgs.
Ashman, Ward, "The Evolutionary Enneagram—Course Manual", Trimergence, Oct. 15, 2003, 28 pgs.
Ashman, Ward, "The Three Commodities—Course Manual", Trimergence, 2003, 28 pgs.
Ashman, Ward, "The Three Commodities—Self-Assessment Tool", Trimergence, 2003, 20 pgs.

(Continued)

*Primary Examiner* — Timothy A Musselman
(74) *Attorney, Agent, or Firm* — Kang S. Lim

(57) ABSTRACT

A computerized training system and methods are provided for training an individual in self-evaluation and to interact with a partner. The training system and methods comprise an intelligence assessor to identify an intelligence makeup of the individual by scoring a completed intelligence questionnaire. Intelligences include Logic, Emotion and Intuition. An asset assessor assesses the strength of Three Assets of the individual by scoring a completed asset questionnaire. Assets include a Technical, a Psychological, and a Relational asset. A perception assayer identifies a dominant Perceptual Orientation of the individual by cross referencing the intelligence makeup with the viewpoint of the individual. An aggregator collects the profile information of the individual to generate an innate profile report and a self-insight report of the individual. A facilitator aids in exploring the insight report. A synchronizer may synchronize the individual with a partner by forming a dyad between the individual and the partner. A trainer may also train the individual to resolve conflicts with the partner.

24 Claims, 34 Drawing Sheets

OTHER PUBLICATIONS

Ashman, Ward, "Trimergence—Course Manual", Trimergence, 2003, 24 pgs.

Ashman, Ward, "Trimergence—Self-Assessment Tool", Trimergence, 2003, 20 pgs.

"16 pf—Career Development Report", ipat, an opp company, 2003, 6 pgs.

Daniels, M.D., David et al., "The Essential Enneagram—The Definitive Personality Test and Self-Discovery Guide", Copyright 2002, 8 pgs.

Palmer, Helen, "The Enneagram in Love & Work—Understanding your Intimate & Business Relationships", Copyright 1995, 8 pgs.

Richardson et al. "Personality Types—Using the Enneagram for Self-Discovery", Copyright 1996, 17 pgs.

Mayer, John D., "The effective leader: Understanding and applying emotional intelligence", Ivey Business Journal, Nov./Dec. 2002, 6 pgs.

Korean Intellectual Property Office, ISA, "International Search Report and Written Opinion", Apr. 8, 2010, 11 pgs.

* cited by examiner

COMPUTERIZED SYSTEMS AND METHODS FOR SELF-AWARENESS AND INTERPERSONAL RELATIONSHIP SKILL TRAINING AND DEVELOPMENT FOR IMPROVING ORGANIZATIONAL EFFICIENCY

BACKGROUND OF THE INVENTION

The present invention relates to a system and method for increased personal and organizational efficiency, known as a "turbo evolution machine", and more particularly systems and methods to enhance any personal relationship through self enhancement ("turbo evolution" state) and through tools for resolving interpersonal conflict. Currently, self growth programs exist which rely upon behavioral modification, or basic self assessment. However, such systems lack the deep personal self-awareness coupled to the necessary tools to efficiently engineer human cultures with the precision and exactitude that the turbo evolution machine is capable of.

Moreover, the turbo evolution machine is a highly integrated system that compiles all of the key components that lead to turbo evolution for both individuals and groups. This means that the combination of self-awareness and interpersonal skills are required to facilitate a full evolutionary path. Using only one of these principles either creates an overbalance on insight (self-awareness) or action (interpersonal skill). Without the balance of the two then individuals and groups are not able to fully evolve in balance. Therefore a turbo evolution state is not fully possible because the individual is not able to influence both him/herself and the social environment to the maximum in a positive manner.

Human conflict and inefficiency results in incalculable waste; both within organizational cultures and personal relationships. It is believed that all interpersonal relationships, whether business or personal, have common elements of conflict, creativity, motivations and self knowledge. As such, systems and methods, as described in the present invention, which are capable of honing these common elements, may act to transcend an individual into an evolved state in all relationships, be it business or personal.

For most businesses and organizations the employees, or "human resources", are the company's most important commodity. Employees define the company, and ultimately dictate the success or failure of the business. For example, in a business, personnel inefficiencies result in slow, error-prone work product. Not only is money wasted on unnecessary salaries, but poor performance may result in downstream "hidden" costs such as lost clientele or inferior products. In the extreme, businesses may be literally ground to a halt due to internal friction and waste. Likewise, in personal relationships, inefficiencies may result in the breakdown of friendships, marriages, familial relations and social group activities.

As such, the ability to decrease interpersonal friction and increase personal efficiency has the potential to greatly improve business performance and strengthen personal relationships. Achievement of such a hyper efficient, self fulfilled and actuated state is referred to as being "turbo evolved". An individual engaged in a turbo evolution state is capable of identifying her own strengths, adjusting her behaviors to bolster her weaknesses, and confront her environment using all of the intelligences, assets and capabilities at her disposal. The result of such a state includes a stronger awareness of oneself and others, and an increased ability in every facet of life she is engaged in.

The ability to streamline one's performance by achieving a turbo evolved state increases not only the individual's performance, but also group performance as conflicts are more readily resolved and the turbo evolved individual acts to inspire and motivate others.

Additionally, when multiple turbo evolved individuals are processed through "synchronization" programs, the overall efficiency of the group is exponentially increased as friction is significantly diminished from the group dynamic.

Some current self enhancement programs rely upon non-adaptable and static behavioral modification regimes. Yet other current self enhancement programs may focus on psychological analysis for personal growth. However, these current systems fail to combine the targeted self assessment with application of insights to interpersonal tools as in the turbo evolution machine.

It is therefore apparent that an urgent need exists for a system and method for a turbo evolution machine. This system would be able to increase personal performance and increase group efficiencies in both personal and organizational settings.

SUMMARY OF THE INVENTION

To achieve the foregoing and in accordance with the present invention, a computerized training system and methods are provided for use in conjunction with training an individual in self-evaluation and training the individual to interact with the at least one partner are provided. Such systems and methods are useful for providing increased efficiency in an organization.

The training system and methods comprise an intelligence assessor. The assessor identifies an intelligence makeup of the individual. This makeup includes at least one of Three Intelligences by scoring a completed intelligence questionnaire. These Three Intelligences includes a Logic intelligence, an Emotion intelligence and an Intuition intelligence.

An asset assessor then assesses the relative strength of at least Three Assets of the individual. This assessor utilizes scoring a completed asset questionnaire. The Three Assets include a Technical asset, a Psychological asset, and a Relational asset.

Subsequently, a perception assayer may identify a dominant Perceptual Orientation of the individual. This perception assayer further comprises a receiver for receiving the intelligence makeup of the individual, a viewpoint delineator for distinguishing the individual's viewpoint, a candidate generator for selecting possible Perceptual Orientations of the individual, and a perception identifier for distinguishing the individual's dominant Perceptual Orientation.

The individual's viewpoint may be that of an extrovert or introvert. The viewpoint delineator determines viewpoint through behavioral and attitudinal analysis. The possible Perceptual Orientations are generated by cross referencing the intelligence makeup with the viewpoint. Finally, the dominant Perceptual Orientation is selected from the possible Perceptual Orientations by scoring of a completed questionnaire.

The dominant Perceptual Orientation of the individual may include one of the following. A Principle Perceptual Orientation, a Service Perceptual Orientation, an Accomplishment Perceptual Orientation, an Essence Perceptual Orientation, a Brilliance Perceptual Orientation, a Vision Perceptual Orientation, an Affirmation Perceptual Orientation, an Energy Perceptual Orientation, and a Unity Perceptual Orientation.

An aggregator then collects the profile information of the individual by compiling the intelligence makeup, the relative strength of the three assets, and the dominant perceptual orientations. A reporter then generates an innate profile report of the individual from the aggregated profile information. The reporter may further generate a self-insight report of the individual using the innate profile report.

A facilitator may then facilitate self-awareness in the individual by exploring the insight report. Further, a synchronizer may synchronize the individual with a partner. This may be done by forming a dyad between the individual and the partner. The insight report is conveyed to each member of the dyad, and bilateral understandings between the dyad members are facilitated.

A trainer may also train the individual to resolve conflicts with the partner. The training includes one or more conflict resolution tools such as cross intelligence communication, creative partnership, and conflict to creativity.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION OF THE INVENTION

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

The present invention relates to systems and methods for a turbo evolution machine, and more particularly systems and methods to enhance any personal relationship through self enhancement and through tools for resolving interpersonal conflict.

The present invention differs from other self enhancing programs in that an individual engaged in the turbo evolution machine develops a profound insight into her intelligences, personality and assets. This deep insight may then be distilled into a concise personality resume, or "kernel insight" report. This kernel insight enables the individual to more fully exploit her natural capabilities and aids in interpersonal relations.

Additionally, the individual engaged in a "turbo evolution state", i.e. a state where all the individual's capabilities are being fully exploited thereby leading to an optimal efficiency and self understanding, may also take advantage of interpersonal relational tools supplied through the turbo evolution machine. These relational tools may modulate the group culture that the individual is interacting with. This cultural modulation, or "cultural turbo evolution", may increase utility and efficiency in the given group. Pragmatically, the turbo evolved individual and an evolved cultural group may perform at a higher level than would have been previously possible. This enables more successful businesses, marriages, social groups and families.

The following description of some embodiments of the present invention will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

I. Model Framework

The turbo evolution machine, as disclosed in the present invention, leverages a unique and powerful psychological model to aid in the assessments and generation of strategies. The understanding of this psychological model is essential to the workings of the turbo evolution machine and, as such, will be discussed in more detail below.

Figure 2A:
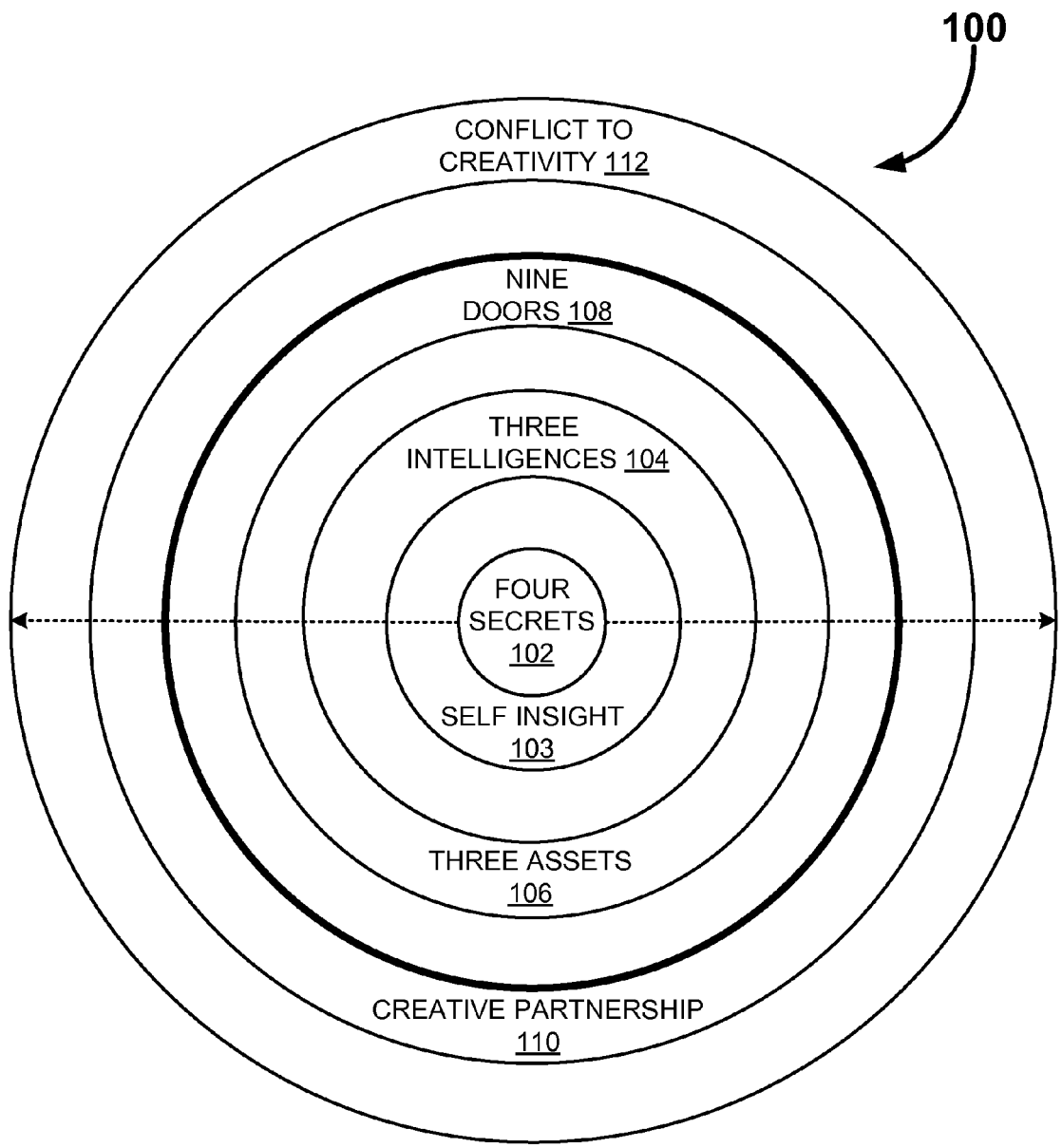
FIG. 2A shows an exemplary illustration of the tools used for the turbo evolution machine of FIG. 1A.

FIG. 2A shows an exemplary illustration of the Turbo Evolution Toolkit 100 used for the turbo evolution machine. The Turbo Evolution Toolkit 100 is arranged as a series of concentric circles as each layer in the Turbo Evolution Toolkit 100 serves as a foundation of deeper insight regarding the human condition. The core technology of the machine is the Four Secrets 102, which serves as the fundamental principle and system underlying the machine. However, users of the machine can access the machine at any level in the Toolkit, and still access the Four Secrets principles, but may do so indirectly. Ideally, those who enter in at higher levels will be inspired to learn the Four Secrets system directly at some point in their turbo evolution process. Thus, at the heart of the Turbo Evolution Toolkit 100 is the Four Secrets 102.

For the purposes of this application, the human experience may be described as existing in two "states" or "modes". The first of these states is a "survival" state. The survival state is often associated with childhood and other types of authoritarian interactions, and is considered the "natural" state of being, due to its long history and application within the human condition. However, at this stage of the evolution of the human species and societal system, this authoritarian relationship style is now obsolete and considered arbitrary rather than required, or "natural." This is a key step in the human evolution process, and requires specialized training in order to migrate from this historic and artifactual authoritarian relationship system. The Turbo Evolution machine replaces the authoritarian style with Creative Partnership as the fundamental evolutionary relationship approach. When in the survival state, one's "motivators" are blocked since one's existence is a basic reactive survival. Blocked motivators foster adversarial competition and limit one's ability to efficiently function or experience fulfillment. In this state, one succumbs to the authoritarian model of using shame to manipulate oneself and others. This type of shame-based trained self-hatred, even though considered "normal" by most who practice the authoritarian model, is actually a delusional state once one becomes an adult since self-hatred and succumbing to shame-oriented authoritarian principles and practices is unnecessary and actually counterproductive to the turbo evolution proposition and state of being.

The second state is one of conscious evolution, or an "evolved state". The evolved state frees one's motivators and enables proactive evolution. The evolved state, associated with adulthood and creative artistry, allows for a turbo evolutionary relationship and leadership style which leads to higher efficiency, and self actualization. The Four Secrets 102 identifies the individuals' balance of survival and evolution and enables that individual to actively evolve from a state of survival to a state of evolution by practicing the Four Secrets Scan system.

Above the Four Secrets 102 is Self Insight 103. The Self Insight 103, or Self Insight Program (SIP), is a detailed study of one's personality makeup. The ability to observe one's own personality as a survival system, similar to the body, is a key component of the turbo evolution state. This is because most of us identify our personality as the only defining principle of who we are. The best example is to hear someone say "that's just the way I am, no way I'm going to change." This statement actually represents a delusional state based on identifying one's personality as one's full state. "Who we are" is actually a form of observer state which is able to objectively witness and assess our life experiences while operating in the construct of the human condition.

The personality is actually a mechanical survival system caused by the principle of "history repeats itself." Thus, we all have personality patterns that repeat mechanically over time in response to internal and external stimuli. This phenomenon is similar to our physical body and its range of mechanical patterns. The primary difference between these two survival systems (personality and body) is that it is currently easier to measure the body's patterns than the personality's patterns. This is due to the body functioning in the physical realm. Patterns of personality, generally based on beliefs, attitudes and externalized behaviors, are generally measured indirectly using statistical inference.

Above the Self Insight 103 is Three Intelligences 104. The Three Intelligences 104 includes three kinds of intelligences: logic, emotion and intuition. Every person has each intelligence type; however, the typical individual usually over relies upon one intelligence type, while underutilizing the remaining intelligences, to the detriment of personal performance and relationships.

Directly related to the Three Intelligences 104 are the Three Assets 106, which includes three kinds of life assets: technical skills, psychological skills and relational skills. Each skill may be related to one of the Three Intelligences 104. These three basic skill sets have enormous impact upon job performance and basic problem solving functioning. The Assets are the intelligences applied into action.

Above the Three Assets 106 is the Nine Doors 108. The Nine Doors 108 corresponds to a modified Enneagram model. The Enneagram, which is well known by those skilled in the art, includes nine distinct Perception Orientations. The known Enneagram system only focuses on what are called "personality types." This terminology limits the deeper purpose and nature of the Enneagram system because it only focuses on the personality. The Nine Doors model focuses both on personality as a mechanical system as well as our observational state of being as defined by the construct and terminology of Perception Orientation. Thus, the conventional use of the Enneagram system is limited by staying only within the construct of personality type. Moreover, the Nine Doors 108 modifies and amplifies the traditional Enneagram model by emphasizing and introducing the conceptual framework of the Three Intelligences 104 and Four Secrets 102. As such, the Nine Doors 108 identifies the motivations that drive each Perception Orientation of the Nine Doors 108, and identifies shifts in the personality when under a wide range of internal and external circumstances.

Between the Nine Doors 108 and Creative Partnership 110 is a thicker line which exemplifies the transition from the individual to the group. Thus, individual evolution may rely upon the Four Secrets 102, the Self Insight Program 103, the Three Intelligences 104, the Three Assets 106, and the Nine Doors 108. Creative Partnership 110, and Conflict to Creativity 112, which leverage the previous layers of the Turbo Evolution Toolkit 100, apply to the group rather than the individual. However, the group oriented parts of the machine still utilize the fundamentals of the individual experience, and link directly to the Four Secrets.

The Creative Partnership 110 includes a skill set and training to resolve complex problems that occur in regular interpersonal dealings. Conflict to Creativity 112, on the other hand, involves a specific methodology designed to overcome acute conflicts. These tools, when employed by a turbo evolved individual, functions to "grease the wheels" of any cultural group. Thus, efficiency is improved, waste is minimized and impasses may be readily resolved.

Each of the components of the Turbo Evolution Toolkit 100 will be discussed in more detail below in conjunction with relevant figures.

Figure 2B:
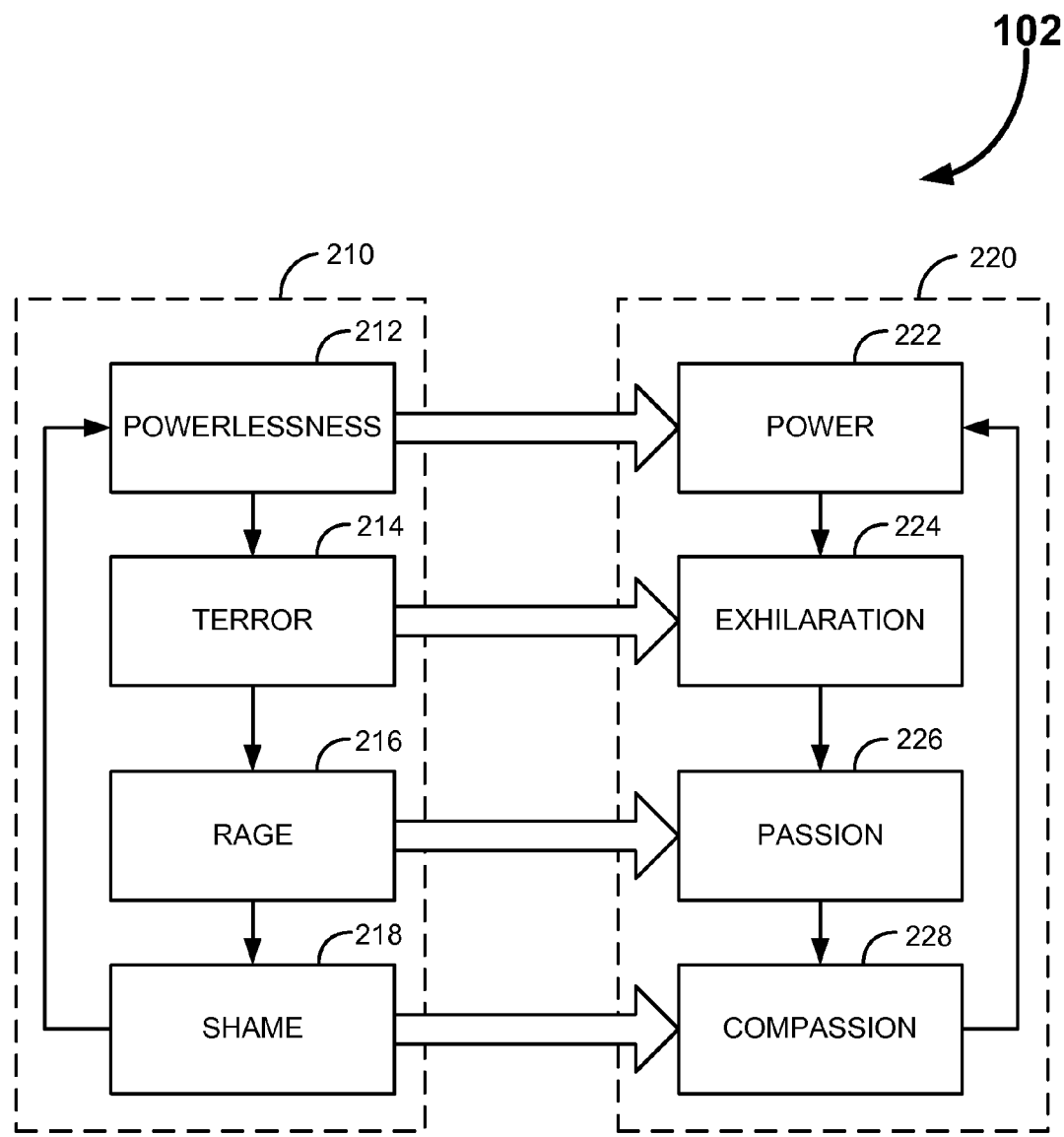
FIG. 2B shows an exemplary functional block diagram of the Four Secrets in accordance with the turbo evolution machine toolkit of FIG. 2A.

FIG. 2B shows an exemplary functional block diagram of the Four Secrets 102 in accordance with the Turbo Evolution Toolkit 100. Here the Survival State 210 may be seen across from the Evolved State 220. The Survival State 210 is actually a delusional state once the individual becomes an adult; whereas the Evolved State 220 is a state of conscious clarity. The blocked motivators of the Survival State 210 include Powerlessness 212, Terror 214, Rage 216 and Shame 218. Powerlessness 212 originates from early life experiences. Terror 214 originates from the need to survive. Rage 216 arises from blocked passions and Shame 218 is a trained self hatred. It should be noted that the blocked motivators are cyclical and formulaic in nature. Powerlessness 212 leads to Terror 214, which leads to Rage 216 which leads to Shame 218 which ultimately leads back to a feeling of Powerlessness 212.

It should also be noted that the blocked motivators correspond to the freed motivators of the Evolved State 220. Transfer of blocked motivators to freed motivators is facilitated through evolving conscious awareness facilitated by using the turbo evolution machine toolkit.

The freed motivators include Power 222, Exhilaration 224, Passion 226, and Compassion 228. Power 222 may be associated with love, while Exhilaration 224 originates from and drives bold action. Passion 226 is the fundamental energy of life, and Compassion is a highly evolved state that 228 may be for others as well as for self. Like the blocked motivators, freed motivators are also cyclical in nature. Power 222 leads to Exhilaration 224, which leads to Passion 226 which leads to Compassion 228, which ultimately leads back to a feeling of Power 222.

Each motivator pair (i.e., Powerlessness 212 and Power 222 ) applies most directly to particular Perception Orientations of the Nine Doors 108. Likewise, each motivator pair applies most directly to a particular intelligence type. The exceptions are Shame 218 and Compassion 228, which apply to every Nine Doors Enneagram Perception Orientation equally, as well as all intelligences. These associations will be discussed in more detail below.

Figure 3:
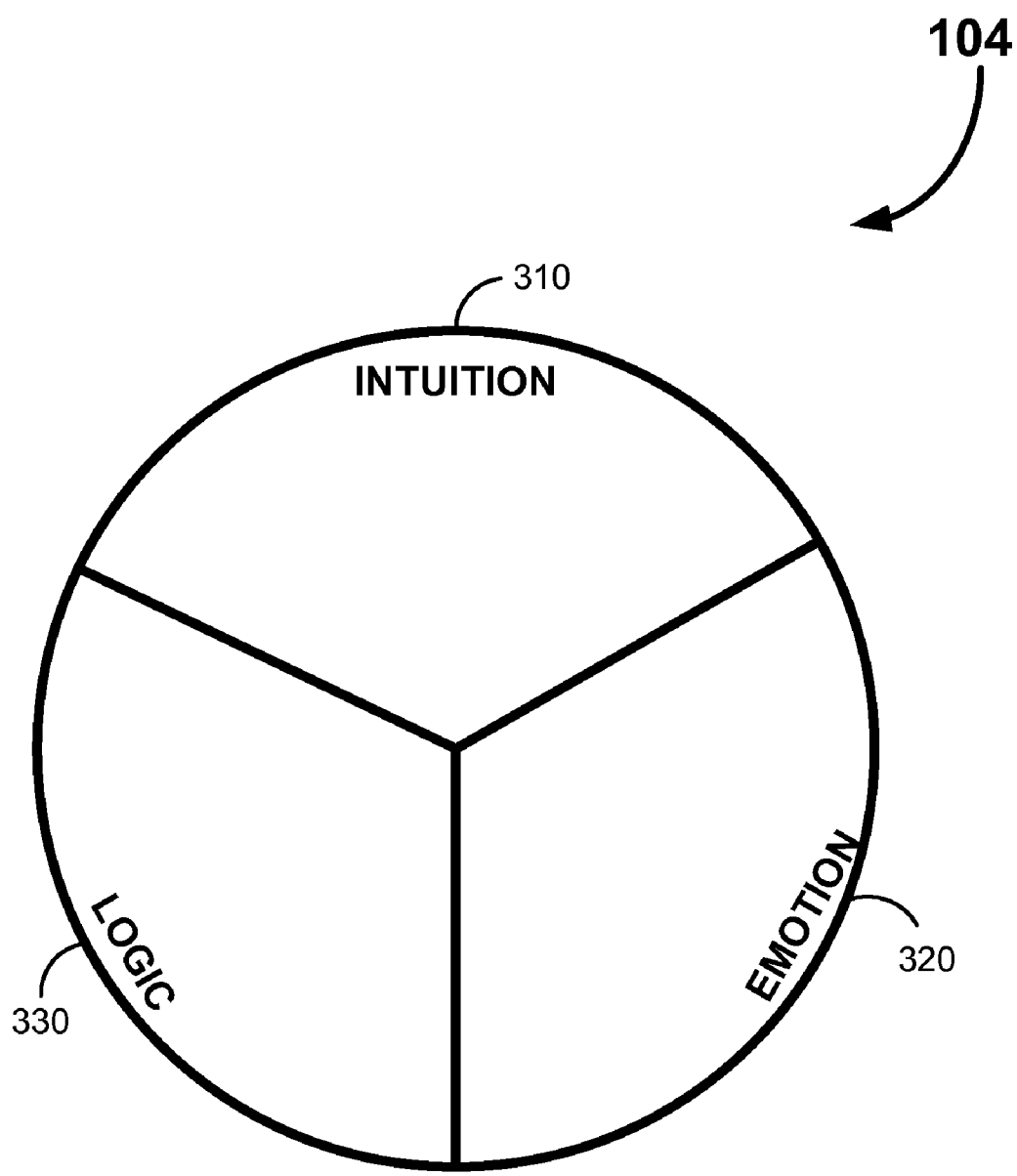
FIG. 3 shows an exemplary illustration of the Three Intelligences in accordance with the turbo evolution machine toolkit of FIG. 2A.

FIG. 3 shows an exemplary illustration of the Three Intelligences 104 in accordance with the Turbo Evolution Toolkit 100. Here, each intelligence type is illustrated as an equal portion of a complete circle. Intelligence is how we survive and evolve. The Three Intelligences 104 serves as a "reality access system"; facilitating in the collection of precise and relevant information about oneself and the surrounding environment. The Intelligences also serve as a "reality delivery system" because we use each intelligence to communicate information to others.

The intelligences are Intuition 310, Emotion 320 and Logic 330. Intuition 310 may also be referred to as a "spirit quotient" or SQ, and may be thought of as "sensing". Emotion 320 may also be referred to as an "emotion quotient" or EQ, and may be thought of as "feeling". Likewise, Logic 330 may also be referred to as an "intellectual quotient" or IQ, and may be thought of as "thinking".

A typical individual focuses their primary attention in a single intelligence, yet underutilizes the others. Underutilization of one or more of the intelligences effectively handicaps the individual's ability to communicate and perform. Thus, fostering a balance between intelligences is very useful. Likewise, by understanding one's intelligence strength, and the ability to recognize the intelligence strengths in others, one may engage in effective "cross intelligence" communications.

As mentioned earlier, the motivations of the Four Secrets 102 correspond to particular intelligences. For example, Power 222 or power of love applies to Emotion 320. Otherwise stated, Emotion 320 acts as a "pipeline" to deliver Power 222. This motivation inspires the individual with a strong Emotion 320 intelligence to act, and guides her. Likewise, Exhilaration 224 of elegant logic and bold action serves to motivate Logic 330 and those strong in Logic 330 intelligence. Otherwise stated, Logic 330 acts as a pipeline for Exhilaration 224. Lastly, Passion 226 drives Intuition 310; without Passion 226 there is no sense of the human "spirit". Again, Intuition 310 is a pipeline for Passion 226.

Figure 4A:
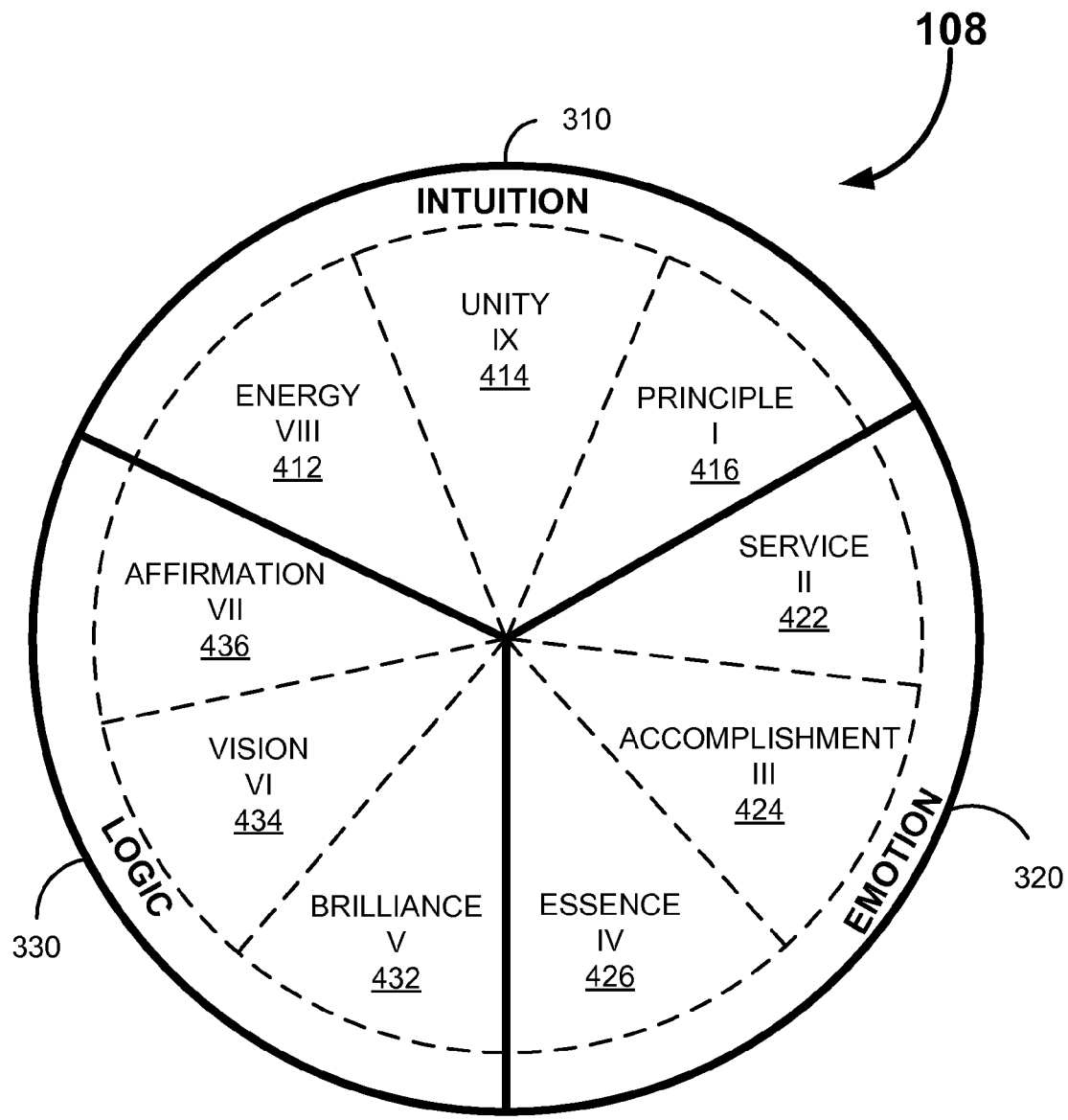
FIG. 4A shows a first exemplary illustration of the Nine Doors in accordance with the turbo evolution machine toolkit of FIG. 2A.

FIG. 4A shows a first exemplary illustration of the Nine Doors 108 in accordance with the Turbo Evolution Toolkit 100. Again the Three Intelligences 104 may be seen; however, each intelligence is subdivided to incorporate each "doorway", or "portal", of the Nine Doors Enneagram system. Each door, additionally, is associated with either introversion or extroversion. The doorways have historically been labeled as a number, starting with I and progressing through IX. Nine Doors Enneagram viewpoint doors serve as one's perspective on reality that helps to master survival needs, and move towards an evolutionary mode of functioning that is the foundation of all human success.

Introversion, or an introvert, is a self-directed personality aspect where one's primary way of experiencing themselves is through the relationship with themselves. Contrarily, extroversion, or extrovert, is an other-directed personality aspect. Thus, the extrovert's primary way of experiencing themselves is through the relationship with others.

The key theme of the Nine Doors model is that of Perceptual Orientation. This implies that the individual has a unique way of perceiving reality that translates into their life experience and overall state of being. This includes their self-awareness capabilities, and their personality style. Personality is the system of mechanical patterns that humans learn during life, especially in early childhood. These mechanical patterns serve as a type of "body" which has the "DNA" of the historic behavioral and attitudinal patterns passed on by family of origin, ethnic group, and the general human condition.

The first door (I) corresponds to Principle Perception Orientation 416. Whereas the eighth door (VIII) corresponds to Energy Perception Orientation 412, and the ninth door (IX) corresponds to Unity Perception Orientation. 416. Energy Perception Orientation 412, Unity Perception Orientation 414 and Principle Perception Orientation 416 are all Perception Orientations driven by Intuition 310 intelligence.

Figure 4B:
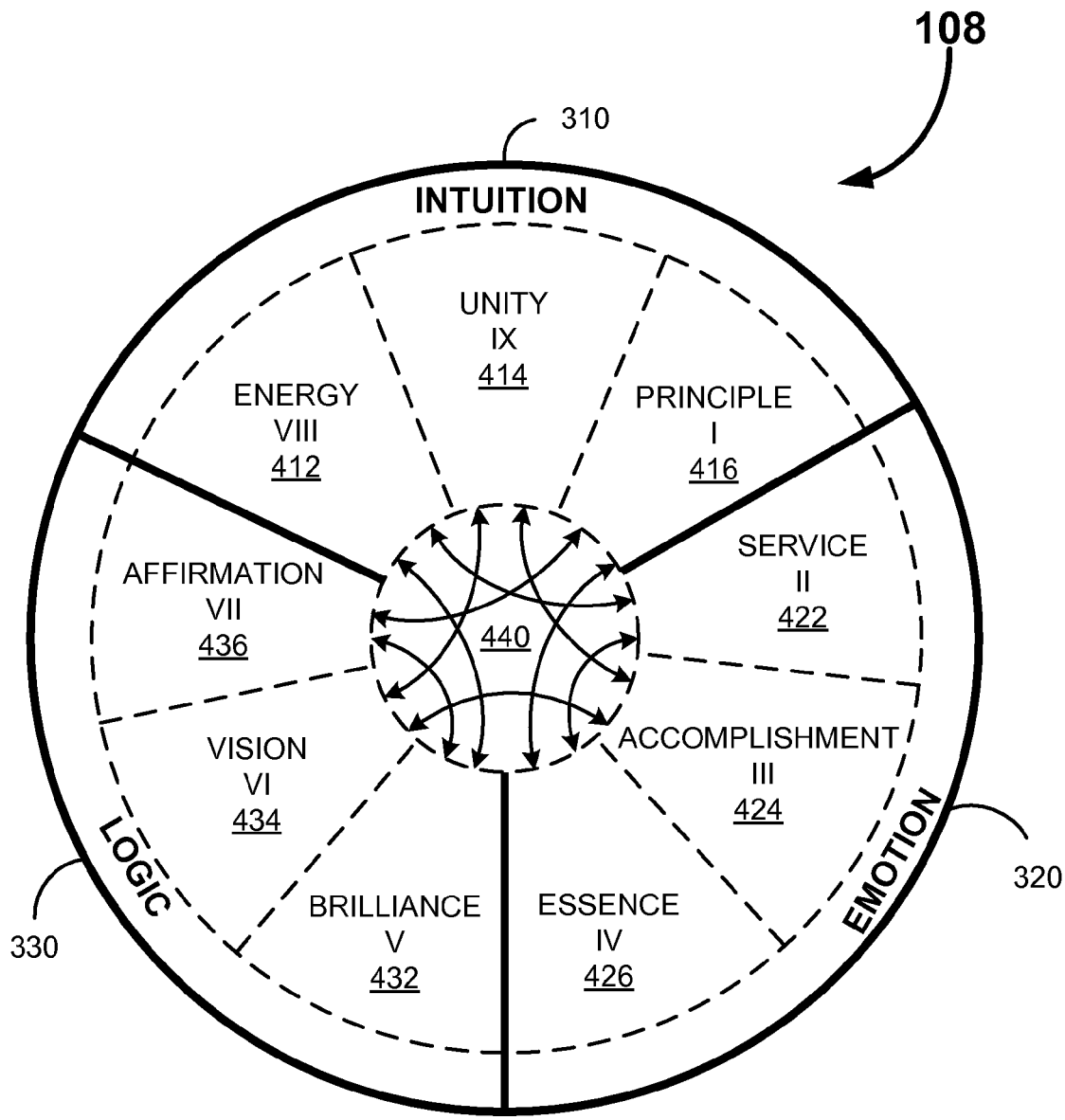
FIG. 4B shows a second exemplary illustration of the Nine Doors in accordance with the turbo evolution machine toolkit of FIG. 2A.
Figure 4C:
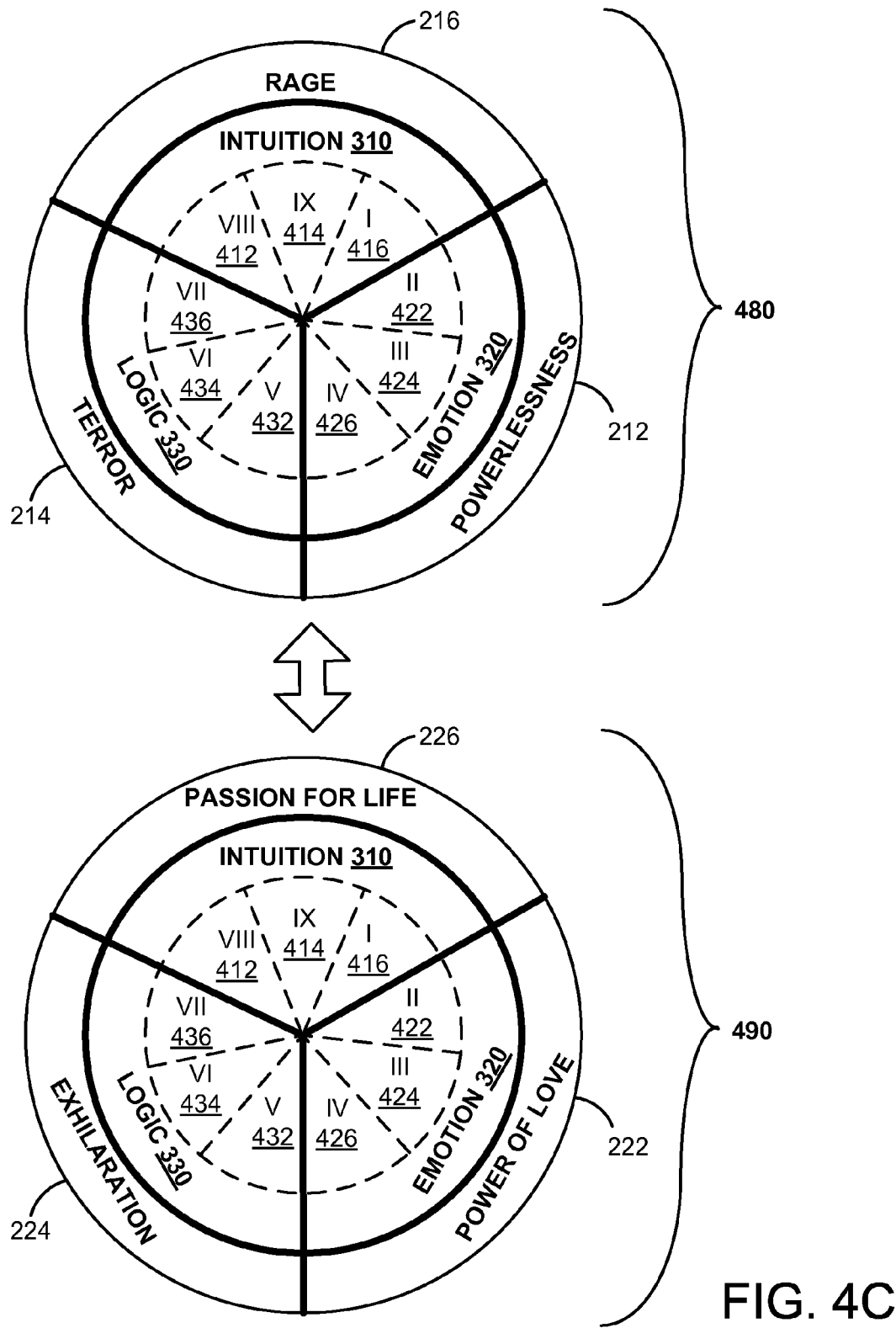
FIG. 4C shows an exemplary illustration of the Nine Doors motivators in a survival state and an evolution state accordance with the turbo evolution machine toolkit of FIG. 2A.

Turning briefly to FIG. 4C, the blocked motivators are shown in the Survival State Nine Doors Enneagram 480. These blocked motivators are freed when the individual transfers to an Evolved State Nine Doors Enneagram 490. As mentioned before, Passion 226 drives Intuition 310; since without Passion 226 there is no sense of human "spirit" and life energy. Likewise, the motivator Passion 226 and its blocked counterpart Rage 216 apply most directly to Energy Perception Orientation 412, Unity Perception Orientation 414 and Principle Perception Orientation 416.

The second door (II) corresponds to Service Perception Orientation 422. The third door (III) corresponds to Accomplishment Perception Orientation 424. The fourth door (IV) corresponds to Essence Perception Orientation 426. Service Perception Orientation 422, Accomplishment Perception Orientation 424 and Essence Perception Orientation 426 are all Perception Orientations driven by Emotion 320 intelligence. As mentioned before, Power 222 of love guides and inspires the individual with a strong Emotion 320 intelligence to act. Likewise, the motivator Power 222 and its blocked counterpart Powerlessness 212 also apply most directly to Service Perception Orientation 422, Accomplishment Perception Orientation 424 and Essence Perception Orientation 426.

The fifth door (V) corresponds to Brilliance Perception Orientation 432. The sixth door (VI) corresponds to Vision Perception Orientation 434. The seventh door (VII) corresponds to Affirmation Perception Orientation 436. Brilliance Perception Orientation 432, Vision Perception Orientation 434 and Affirmation Perception Orientation 436 are all Perception Orientations driven by Intuition 310 intelligence. As mentioned before, Exhilaration 224 of action motivates the individual with a strong Logic 330 intelligence. Likewise, the motivator Exhilaration 224 and its blocked counterpart Terror 214 also apply most directly to Brilliance Perception Orientation 432, Vision Perception Orientation 434 and Affirmation Perception Orientation 436.

Each Perception Orientation includes "gifts" and "challenges". The gifts of the Perception Orientation may be accessed when the motivator which drives the Perception Orientation is freed. However, when the motivator to the Perception Orientation is blocked, the individual expresses the challenges of the Perception Orientation. Since the turbo evolution machine enables the individual to progress from a survival to evolution state, the individual may utilize the turbo evolution machine to free her motivators. This, in turn, enables the individual to choose to use the gifts of the Perception Orientation and bypass the challenges.

Principle Perception Orientation 416 is an introverted viewpoint. The primary motivator for the Principle Perception Orientation 416 is Passion 226. The Principle Perception Orientation 416 strives for the "ideal outcome". However, when motivations are blocked by Rage 216, the Principle Perception Orientation 416 may become judgmental and obsessive. The key area of awareness opportunity for the Principle Perception Orientation 416 is to realize that this drive for relative perfection is actually an inner focus on dissatisfaction with one's own lot in life.

When Passion 226 is freed, the Principle Perception Orientation 416 is gifted with being practical, and hard working, with a strong push for excellence and passion for performance. This "drive for excellence" is an exhilarating and deeply meaningful experience for the Principle Perception Orientation 416. Moreover, the Principle Perception Orientation 416 is a dependable and inspired worker with high-level morals and ethics. An individual with a Principle Perception Orientation 416 also likes others in their milieu to follow the same high-level standards. If they fail in these standards, the Principle Perception Orientation 416 may become frustrated that others are letting them down. The Principle Perception Orientation 416 individual is also self-disciplined and oriented towards personal improvement since they are focused on the highest standards of performance. Likewise, the Principle Perception Orientation 416 is willing to be engrossed with detail because it is important in order to create a deeper sense of satisfaction for thoroughness, self-mastery, and a commitment to "doing it the right way." The Principle Perception Orientation 416 is well organized, and serve as a beacon for order to others to follow as examples of our "best effort."

However, when Passion 226 is blocked the Principle Perception Orientation 416 may also be easily susceptible to shaming or criticism from others because it activates his or her own internal judgment process. When under stress, the Principle Perception Orientation 416 individual may become obsessed with detail, overlooking the more strategic approach to problem solving. This causes them to become somewhat obsessive, by which they can inadvertently alienate others. Likewise, the Principle Perception Orientation 416 may be easily irritated, and express frustration by becoming more stubborn and judgmental.

The Service Perception Orientation 422 is an extrovert viewpoint. The primary motivator for the Service Perception Orientation 422 is Power 222. The Service Perception Orientation 422 is an expert at anticipating the needs of others. They have a type of internal knack that comes so naturally that the Service Perception Orientation 422 may inadvertently focus so much on other's needs that they overlook their own. Thus, when Power 222 is freed, the Service Perception Orientation 422 is gifted with inspiration, and a loving, helpful, energetic and uplifting interactional style with others. The Service Perception Orientation 422 serves as a "professional angel", meaning that they are absolutely expert in supporting and anticipating the needs of those whom they love. The Service Perception Orientation 422 easily understands other's needs, hurts and disappointments. Likewise, the Service Perception Orientation 422 individual may be hard working and committed to making things better for all. They may also have high energy, feeling of excitement and meaning when "on a mission" to be helpful in every way.

However, when Power 222 is blocked, the Service Perception Orientation 422 may also over-focus on other people's needs, and exhibit a co-dependent style based on a deep need for love and support. Co-dependency may include becoming overly involved with others in a way that is ultimately not healthy for the Service Perception Orientation 422. Additionally, the Service Perception Orientation 422 individual may tend to use guilt and become overly assertive as a way to try to gain respect by helping others. The Service Perception Orientation 422 makes a commitment of love and support, but when feeling more vulnerable, they can use this approach as a manipulative strategy to gain attention from others. When stressed, the Service Perception Orientation 422 individual may be seen as meddling due to their desire to try to make a difference and be seen as valuable. Service Perception Orientation 422 may become somewhat obsessive in this meddling style, and inadvertently alienate others for becoming overly involved in their more private realms.

The Accomplishment Perception Orientation 424 is an extrovert viewpoint. The primary motivator for the Accomplishment Perception Orientation 424 is Power 222. The Accomplishment Perception Orientation 424 wants to be seen as not only successful, but also as desirable and positive. Thus, when Power 222 is freed, the Accomplishment Perception Orientation 424 is gifted as being genuinely energetic and often quite enthusiastic. They can both inspire themselves and others with positive energy and a sense of achievement. Thus, they often assume leadership roles, or become high-level contributors, such as sales professionals. The Accomplishment Perception Orientation 424 may exhibit a "motivational" style and have a strong commitment to success and a powerful willingness to put in hard work. The work is both an achievement opportunity, and a change to distract themselves from the scary aspects of life. The Accomplishment Perception Orientation 424 tends to participate in exciting, fun and challenging activities, such as personal sports (e.g., skiing), as an environment to celebrate their inherent desire to win. The Accomplishment Perception Orientation 424 is generally optimistic, unless thwarted by others.

However, when Power 222 is blocked, the Accomplishment Perception Orientation 424 may become obsessed with "doing" as a way to stay busy and avoid emotional experience. This can inhibit their ability to create a more "being" intimate style. "Doing" appears safer to the Accomplishment Perception Orientation 424, but ultimately inhibits their ability to create a sense of real connection and trust with others, both in their personal and professional lives. Moreover, real feelings are hard for the Accomplishment Perception Orientation 424 to access because of their strategy to repress. This can lead to a more superficial style, which may frustrate those looking for genuine intimacy. The Accomplishment Perception Orientation 424 is often "out of touch" with their emotions as a result. Likewise, the Accomplishment Perception Orientation 424 may appear insensitive to others as a result of an over focus, even narcissistic, commitment to their own goals and pathways. Accomplishment Perception Orientation 424 individuals may alienate others who may see them as selfish or self-centered. Moreover, the Accomplishment Perception Orientation 424 may over-rely on false optimism and denial. This can lead to a tendency to avoid the reality of situations. Task orientation may lead to a more tactical and reactive style. The Accomplishment Perception Orientation 424 individual may become so oriented towards tasks that they miss the subtle interpersonal messages. This may lead to surprising and unexpected feedback, such as poor performance issues perceived by their boss.

The Essence Perception Orientation 426 is an introvert viewpoint. The primary motivator for the Essence Perception Orientation 426 is Power 222. The Essence Perception Orientation 426 individual is most at home in the relationship with themselves. They find this internal world to be very rich and also safe. The self-relationship serves as an internal reference point that Essence Perception Orientation 426 may trust, and which is also quite accurate in their perception of the deeper essence of what life is about. Thus, when Power 222 is freed, the Essence Perception Orientation 426 is gifted as being deeply sensitive, creative and artistically inclined people who look for beauty and the deep essence of life in all their activities and interactions. This search for beauty and love is a type of internalized mission that motivates the Essence Perception Orientation 426 at a very deep level. One reason that the Essence Perception Orientation 426 will turn their focus of intimacy towards the relationship with themselves is that they may feel it is "impossible" to find the ideal quality of loving relationship they imagine and expect in the external reality. The Essence Perception Orientation 426 maintains a strong love for the soulful and loving connections that are inherent to a pathway to the deeper intimacy that inspires and draws people in to the deeper mysteries of life. Their art often serves as a way to express this "hope for humanity." The Essence Perception Orientation 426 individual is able to experience intense emotional feelings and not be threatened by them. Moreover, the Essence Perception Orientation 426 individual recognizes the value of emotion as a legitimate form of understanding life. The Essence Perception Orientation 426 is willing to be unconventional and find their own way of living that has deep purpose and serves as a beacon for others to build a more "creative" life style that is based on strong humanistic and humanitarian values.

However, when Power 222 is blocked, the Essence Perception Orientation 426 may also be overly introverted and miss opportunities to connect with others. This leads to an ambivalent relationship style where the Essence Perception Orientation 426 individual is always testing to make sure that there is a real "juice" in the relationship. The Essence Perception Orientation 426 may also tend to appear "moody," which may create the impression that the Essence Perception Orientation 426 individual may not be reliable as a worker or friend. Others can misinterpret these moods as being a constant style of the Essence Perception Orientation 426. In fact, the moods are not constant, but when they do occur they may be quite strong and therefore obvious to others. The Essence Perception Orientation 426 individual may become stuck in deeper feelings of melancholia, or even depression, when the Essence Perception Orientation 426 individual becomes overly identified with their own internal life experience. Moreover, the Essence Perception Orientation 426 may be overly fearful of being abandoned and hurt by others, and may become judgmental as a self-protective strategy. Lastly, the Essence Perception Orientation 426 may have trouble working in group settings because they have their own unique perspective, which is generally not shared by others.

The Brilliance Perception Orientation 432 is an introvert viewpoint. The primary motivator for the Brilliance Perception Orientation 432 is Exhilaration 224. The Brilliance Perception Orientation 432 enjoys celebrating the brilliance of their thinking process. Thus, they work hard to develop their logical capacity and overall intellectual rigor. They love to find out how things work, either in the practical mode, or in the abstract arenas, such as theory. The abstraction-oriented territory of thought and wisdom is relatively safe for the Brilliance Perception Orientation 432 for two reasons. They are usually very skilled in their understanding of how things work, and they learned that this "retreat" into their intellects was a way to feel safe during vulnerable periods of their lives, such as during childhood.

Thus, when Exhilaration 224 is freed, the Brilliance Perception Orientation 432 individuals fine-tune their intellectual ability by enjoying a deep power of concentration and focus on that which they want to learn about. This builds a very high level of understanding about a range of topics. The Brilliance Perception Orientation 432 may appear very thoughtful and deep thinking about life, and about the situations they face. They serve as valuable consultants in the arenas they know well. Their wisdom is hard-won through the intensity of their study process. Moreover, the Brilliance Perception Orientation 432 has a strong empathy for others' personal and private needs because they are very aware of their own privacy needs. This builds a deep understanding of the situations of others that may help the Brilliance Perception Orientation 432 individual create a sense of connection with others. The Brilliance Perception Orientation 432 individual is dependable because they are very thorough in their commitment to detail. When they are inspired, the Brilliance Perception Orientation 432 individual is an excellent work partner and can work well autonomously because they develop a fascination with learning more about their project.

However, when Exhilaration 224 is blocked, the Brilliance Perception Orientation 432 may have an inordinate need for isolation and may be experienced by others as being emotionally unavailable. This makes it hard for the Brilliance Perception Orientation 432 individual to easily affiliate with others. The Brilliance Perception Orientation 432 individual's commitment to using logic as their primary reality access tool leads to them often being seen as too "heady," and even "preachy" at times because of their commitment to communicating high level detail through logic. They can talk over the heads of others, and get caught up in a celebration of "argument for argument's sake." Likewise, these individuals may appear overly objective in intimate settings that require a greater emotion contact. This may lead to them being misjudged as being aloof, disinterested, or even "stuck up." Likewise, when stressed or feeling vulnerable, the Brilliance Perception Orientation 432 individual may become emotionally hypersensitive and pull back if they feel that others are pressuring them for interpersonal contact. They can move into a more "nitpicking" style if they feel threatened by others. At these times, they tend to use their logic skills to compete or argue with others and attempt to win by "being right." The Brilliance Perception Orientation 432 individual may feel frustrated in not being able to be more spontaneous "like others." They may even feel a type of "inner emotional vacuum" where they feel out of touch with themselves and others. Lastly, these individuals may become dependent on trying to make sense of things when they do not have all the facts. This may include either reaching out to others to get the information needed, or moving into a more isolating, autonomous "research" mode of trying to get the necessary information.

The Vision Perception Orientation 434 maintains both introvert and extrovert viewpoints. The primary motivator for the Vision Perception Orientation 434 is Exhilaration 224. The Vision Perception Orientation 434 individuals are experts at scanning their internal and external reality for both positive possibilities, and also possible problems. Thus, when Exhilaration 224 is freed, this "scanning" style is a type of internal mastery that provides the Vision Perception Orientation 434 with a wide range of information, which is usually oriented towards compiling wide-ranging logical facts. As a result, the Vision Perception Orientation 434 individual generally amasses a cache of in-depth information about reality, and may serve as literal experts and mavens in their areas of interest. They differ from the Brilliance Perception Orientation 432 individuals in this information gathering approach by having a more wide-ranging intellectual mastery, which they use in a more extroverted fashion, often using the information to inspire others to take action.

The Vision Perception Orientation 434 individual tends to be very loyal and loving. They prefer consistency in their relationships because this reduces the possibility of surprise from the unknown. This provides a zone of safety where they can feel safe in their close relationships. These individuals may be quite perceptive, especially related to those more "invisible" territories that lie below the surface of events and interpersonal style. This talent includes being able to read people quickly and accurately. Individuals with the Vision Perception Orientation 434 are thoughtful and understanding, especially towards those who have experienced survival situations that elicit strong fear. Moreover, the Vision Perception Orientation 434 tends to be protective, dutiful, and willing to support their friends. Camaraderie is important for individuals with this Perception Orientation because this provides an environment of safe mutual support, especially if they fear for their own security. The Vision Perception Orientation 434 individual is an expert at seeing the strategic view, and has a range of perspective and possible solutions to any situation that might occur. When in an objective mode, the Vision Perception Orientation 434 individuals are good at reading subtle interactional styles that are in the political territories. This allows them to predict and anticipate how people might respond to certain circumstances. This may become a solid leadership asset as these individuals learn to manage their own insecurities and to trust their ability to perceive and predict.

Ironically, when Exhilaration 224 is blocked, despite their "doubting style," individuals with the Vision Perception Orientation 434 may inadvertently over-trust some people and be taken advantage of due to their strong penchant for loyalty. As a result, they tend to not "cut bait" when a relationship is unhealthy. This may appear to others as inconsistent because in other, more practical, life circumstances such as work, the Vision Perception Orientation 434 individual may be quite precise and clinical in their approach of taking bold action to cut losses. Moreover, the Vision Perception Orientation 434 active scanning process may backfire to the point where they can become overly focused on what is going wrong, and cannot see the "forest for the trees." This builds an overly fearful style where the Vision Perception Orientation 434 can lose their objective perspective.

The Vision Perception Orientation 434 may be both introverted and extroverted, although they often default to one approach. An introverted Vision Perception Orientation 434 may become overly fearful, hesitant and mistrustful of themselves and others. They may take a long time to develop trusting relationships with others. However, when trust is built they can become quite loyal. The tendency to go inward may lead to an overly analytic style, where the Vision Perception Orientation 434 individual will "hide out" and not allow themselves to be clearly perceived by others. This can lead both to an analysis paralysis, and also to being misunderstood. Their secretiveness can threaten others who don't know how to read this Vision Perception Orientation 434 style. Conversely, an extroverted Vision Perception Orientation 434 may overcompensate for fearfulness by appearing aggressive while pushing for information. At these times, the Vision Perception Orientation 434 may also appear hypersensitive to criticism and become angry when they feel misjudged or at risk. This extroverted style can appear abrasive or opinionated. This is not the intention of the Vision Perception Orientation 434, but they often "think out loud" and "fill the space" when they are trying to figure out what is going on around them. At times the Extroverted Vision Perception Orientation 434 may become not only abrasive, but appear judgmental and impatient when others do not make sense to them. They may inadvertently alienate others through their impatience, or through an invalidation of others' point of view. Even though the Vision Perception Orientation 434 individual may be right in their perspective, they can eviscerate others' self-esteem with a searing, critical, ironically accurate assessment of the weakness of the others' position.

The Affirmation Perception Orientation 436 is an extrovert viewpoint. The primary motivator for the Affirmation Perception Orientation 436 is Exhilaration 224. The Affirmation Perception Orientation 436 individual is a genuinely positive person who appreciates the goodness of life, and loves to stay focused on the overall goodness of life. This style leads to a type of self-fulfilling prophecy, which the Affirmation Perception Orientation 436 celebrates by always staying optimistic. Generally, this approach works well, and also fits the environment of positive relationship and work that the Affirmation Perception Orientation 436 builds around them. As a result, the Affirmation Perception Orientation 436 individual tends to create situations where they can feel a sense of control, that appears inherently positive, and which provides access to people who will generally not challenge their highly positive focus. This is why these individuals often function in roles that promote positive products and services, and they tend to stay in an excited extroverted interactional mode.

When Exhilaration 224 is freed, the Affirmation Perception Orientation 436 is gifted with a childlike and pure focus on the joy and beauty of life. Their style can be infectious because they remind all of us of the beauty and inherent positivity of life. Moreover the Affirmation Perception Orientation 436 individual has a very active mind, and is able to project rapidly into the future with their exhilarating logical style. As a result, these individuals may be quite strategic, and are drawn towards positive possibilities in the future. The Affirmation Perception Orientation 436 is naturally energetic as a way to stay positive and moving. They often have a very active lifestyle where they like to stay busy doing things that are mentally stimulating, including learning new things, traveling, and taking varied adventures. Additionally, the Affirmation Perception Orientation 436 individual's optimism provides an infectious and stimulating quality of introducing "new and exciting" opportunities or people into their milieu. Thus, the Affirmation Perception Orientation 436 may promote new ideas, possibilities, groups, or people as a way to both create stimulation in their relationships, and also add value to others.

However, when Exhilaration 224 is blocked, the Affirmation Perception Orientation 436 often has problems finishing what they begin because they want to quickly move on to the next "cause." These individuals have a freewheeling style so they do not like to be "tied down" by too many responsibilities or expectations from others. This allows them to continually shift their options and have the freedom to never feel stuck. This may make it difficult for the Affirmation Perception Orientation 436 to make long-term commitments because they would feel too confined. Likewise, the Affirmation Perception Orientation 436 may appear as a narcissist because they can be overly committed to a superficial style. The Affirmation Perception Orientation 436 individual may appear as being less empathic and emotionally connected with others. This may lead them to be viewed as superficial and somewhat blind to others' needs, pain, and deeper hurts. Boredom is a key challenge for the Affirmation Perception Orientation 436 individual because of their commitment to stay stimulated and fast moving, even though this process may lead them to be superficial in their style. Their ongoing commitment to find fun and "good times" may make it hard for the Affirmation Perception Orientation 436 to stay present with difficulties, to persevere, and to learn from the experience of managing their life challenges and responsibilities. Lastly, this Perception Orientation has deep feelings and concerns, but has little skill set available to deal with them. As a result, the Affirmation Perception Orientation 436 may become combative, irritable, frustrated, impatient, and judgmental if they feel that they are being confined by another person's need to deal with the "deeper issues." As a result, relationships may be difficult for the Affirmation Perception Orientation 436 because their commitment to shutting out the tough issues can lead others to either repress their own needs, which will come out later in a more negative extroverted interactional blow-up, or to abandon the Affirmation Perception Orientation 436 individual altogether.

Energy Perception Orientation 412 is an extroverted viewpoint. The primary motivator for the Energy Perception Orientation 412 is Passion 226. The Energy Perception Orientation 412 individual is very conscious of the relative injustices of life, and have usually experienced them directly themselves. As a result, these individuals are often protectors of those who are underdogs, which include themselves since they were usually underdogs at some point earlier in their own lives. The Energy Perception Orientation 412 is an expansive, extroverted type who has a commitment to service and a desire for everyone to be treated fairly and to be able to contribute to their own and others' success in a fair, powerful, and manageable way. This perspective gives the Energy Perception Orientation 412 a natural leadership orientation, as well as the ability to generate loyalty among their teams because the underlying principle for the Energy Perception Orientation 412 is very clearly defined as "fairness and opportunity for all."

When Passion 226 is freed, the Energy Perception Orientation 412 is gifted with a tremendous vitality and passion for life. This energy helps them move forward and overcome obstacles that could leave others feeling overwhelmed. This energy drives the Energy Perception Orientation 412 into leadership positions. Individuals with Energy Perception Orientation 412 are courageous people who are extremely passionate about their chosen direction and mission in life and work. Their passion is especially powerful when they feel that their mission is a "just cause," and where an underdog, or disadvantaged person, may be harmed by the larger and more inhumane "powers that be." And while Energy Perception Orientation 412 breeds natural leaders, their aspirations to leadership are often somewhat unconscious. They will naturally "fill the vacuum" of leadership if others do not step forward. They will also challenge the existing leadership to make sure that all are moving forward in the right direction, and with maximum speed. Thus, the Energy Perception Orientation 412 "pushes the envelope" to make sure everyone maximizes their progress toward the established goal. These individuals may be fun to be around because of their strong personalities, energetic gusto, and passion for life. They enjoy parties and events where people come to enjoy and celebrate life. Moreover, an individual with an Energy Perception Orientation 412 is a loyal and trusted friend. They also respect those traits in others because the loyalty serves as a resource, especially in times of challenge. These individuals are especially appreciative of others who support them when they are in adversarial situations.

However, when Passion 226 is blocked, the "passion for life" energy of the Energy Perception Orientation 412 is so strong that they may appear angry to others when their passion is blocked. The Energy Perception Orientation 412 does not experience the anger directly, but instead impulsively pushes harder to get their result or point across. This is one of the more frustrating dilemmas that the Energy Perception Orientation 412 experiences. People think they are angry, but the individual with the Energy Perception Orientation 412 does not really experience anger, only a strong desire to push through resistance and get their result. Moreover, the Energy Perception Orientation 412 has little moderation of behavior. They tend to be "all or nothing." This is a powerful trait, but can overwhelm those who are more moderate in their approach, and thus less orientated to strong impulse, and apparent risk taking. It is often difficult for the Energy Perception Orientation 412 to "turn off" their high intensity passion for performance and results. Thus, they can find it somewhat difficult to be in a "play" mode when not working because their passion is so strong they like to keep focused on their results orientation at all times. The Energy Perception Orientation 412 may appear controlling, partially because they want to get their result. However, they may also appear controlling if they feel threatened by others. This approach may appear as a threat to others, or in a more dangerous situation, it could actually be a threat. Perhaps the biggest challenge the Energy Perception Orientation 412 has in day-to-day interaction with others is their "large footprint." Their passion energy is so intense that they may appear as "bulls in a china shop" and inadvertently "knock" others over with their intense energy. This may include having a loud voice, being larger in physical stature, and having a strong extroverted personality style. These individuals may be over-reactive at times, and thus may function as rebels, breaking the rules as a way to free themselves from all restrictions to their passion. Their rule breaking is not designed for malevolent intent, but instead is a powerful urge to break free of all inhibitions. This may lead them to be seen as troublemakers by others. When threatened, the Energy Perception Orientation 412 may either attack or withdraw. Others more easily see the attack mode. However, when the Energy Perception Orientation 412 withdraws it may also be very noticeable because they become introverted and self-protective. When individuals with the Energy Perception Orientation 412 are in a major withdrawal mode they may "write off" certain people, and never risk being open with them again.

Unity Perception Orientation 414 is an introverted viewpoint. The primary motivator for the Unity Perception Orientation 414 is Passion 226. The Unity Perception Orientation 414 individual is a natural expert at sensing what is happening at the less obvious, and subtler, intuitive level. However, in their relationships, this intuiting ability may serve as a seduction to the Unity Perception Orientation 414 because they can become so engrossed in the internalized process that they miss opportunities to be more open, assertive, and interactive with others. Their introverted and often blending interactional approach may serve as a valuable tool for the Unity Perception Orientation 414 to show up with others as being friendly, effusive, and generally conflict avoiding. However, the Unity Perception Orientation 414 individual's gift of being conscious of the deeper issues that exist in their relationships may be inhibiting because they often do not know how to talk about their own experience. As a result, the Unity Perception Orientation 414 may enter into a dissociative state where they may lose their own self-awareness, and play a role of being "nice," but become disconnected with the deeper "juice" of their intuitive knowledge of themselves and others.

When Passion 226 is freed, the Unity Perception Orientation 414 is gifted as having a natural caring style based on being able to intuitively read what others want in their lives. This intuitional style can create a very smooth and seamless interactional approach, which includes a particular elegant style of loving and serving others. Compromise comes naturally to the Unity Perception Orientation 414 because they can naturally see everyone's point of view. This expansive perspective comes from both the Unity Perception Orientation 414 individual's intuitive skills, as well as their innate desire to be fair, to avoid conflict, and avoid misunderstandings. The Unity Perception Orientation 414 usually evidences an unconditional and very open loving style because they can quickly see why people do what they do. When in this mode, the Unity Perception Orientation 414 is able to connect even with those whom society might reject, such as criminals or corrupt people of various types. The Unity Perception Orientation 414 individual is able to see below the external "act" of someone who has done wrong, and still connect with their essential humanity. The Unity Perception Orientation 414 often has a creative style, especially in relationships, because they can intuitively sense what other people are thinking or what they need at a visceral level. These individuals enjoy working with teams because of their natural desire to avoid conflict and build creative compromise for the better of the larger whole.

However, when Passion 226 is blocked the Unity Perception Orientation 414 may lose themselves in relationships because of the seduction of paying too much attention to others and their needs, rather than to their own. If the Unity Perception Orientation 414 individual has repressed their own needs for a long time, they can begin to evidence a deeper and smoldering resentment, which lies far below the surface of their regular personality presentation. The key dilemma is that the Unity Perception Orientation 414 usually does not experience this resentment consciously, and may act it out in more unconscious ways, which usually include passive-aggressive acts. These acts can include symptoms such as forgetting things that others want, or "spacing out" and forgetting important appointments or dates such as anniversaries. The Unity Perception Orientation 414 is quick to avoid conflict, and may jump to agreement without checking in with themselves. Unless these individuals have learned to deal with conflict in a formal manner, their only tool is to "agree and capitulate." This approach may breed resentment as the Unity Perception Orientation 414 realizes, at least at the unconscious level, that they missed an opportunity to take care of themselves. Lastly, commitment may be a challenge for the Unity Perception Orientation 414 individuals, primarily because they are not sure of what they want for themselves. As a result, these individuals may generate an internal experience of "vagueness," and uncertainty of what works for them. This may inhibit relationships because the Unity Perception Orientation 414 may have to resort to stubbornness and intransigence because they are afraid to do something that would violate their own needs.

FIG. 4B shows a second exemplary illustration of the Nine Doors 108 in accordance with the Turbo Evolution Toolkit 100. In this exemplary illustration, Temporary Transformation 440, commonly called "Arrows", between the Nine Doors Enneagram doorways are shown, whereby when under particular conditions, the personality of an individual shifts from the normal door to another Perception Orientation. For example, it may be seen that the Service Perception Orientation 422 may become an Energy Perception Orientation 412 or an Essence Perception Orientation 426 under particular circumstances.

Such shifts in personality Nine Doors Enneagram are temporary transformations of perceptual and personality style. Likewise, there is some bleed over in one's personality from the Nine Doors Enneagram doorways directly adjacent one's primary door. These are referred to as "wings" of the Perception Orientation, which "flavor" the individual's personality. Thus, following the previous example, the wings of Service Perception Orientation 422 are Principle Perception Orientation 416 and Accomplishment Perception Orientation 424. Ultimately, the Nine Doors Enneagram is a circle, which implies that individuals have access to all of the doorways. Below is Table 1, which further illustrates the connectivity of the doorways in the Nine Doors system 108.

TABLE 1

Nine Doors System Summary

| Door # | Doorway Name | Focus | Intelligence | Motivation | Wings | Temp. Transform |
|---|---|---|---|---|---|---|
| I | Principle | Introvert | Intuition | Passion | II, IX | IV, VII |
| II | Service | Extrovert | Emotion | Power | I, III | IV, VIII |
| III | Accomplishment | Extrovert | Emotion | Power | II, IV | IX, VI |
| IV | Essence | Introvert | Emotion | Power | III, V | I, II |
| V | Brilliance | Introvert | Logic | Exhilaration | IV, VI | VII, VIII |
| VI | Vision | Introvert/Extrovert | Logic | Exhilaration | V, VII | III, IX |
| VII | Affirmation | Extrovert | Logic | Exhilaration | VI, VIII | V, I |
| VIII | Energy | Extrovert | Intuition | Passion | VII, IX | V, II |
| IX | Unity | Introvert | Intuition | Passion | VIII, I | III, VI |

Figure 5A:
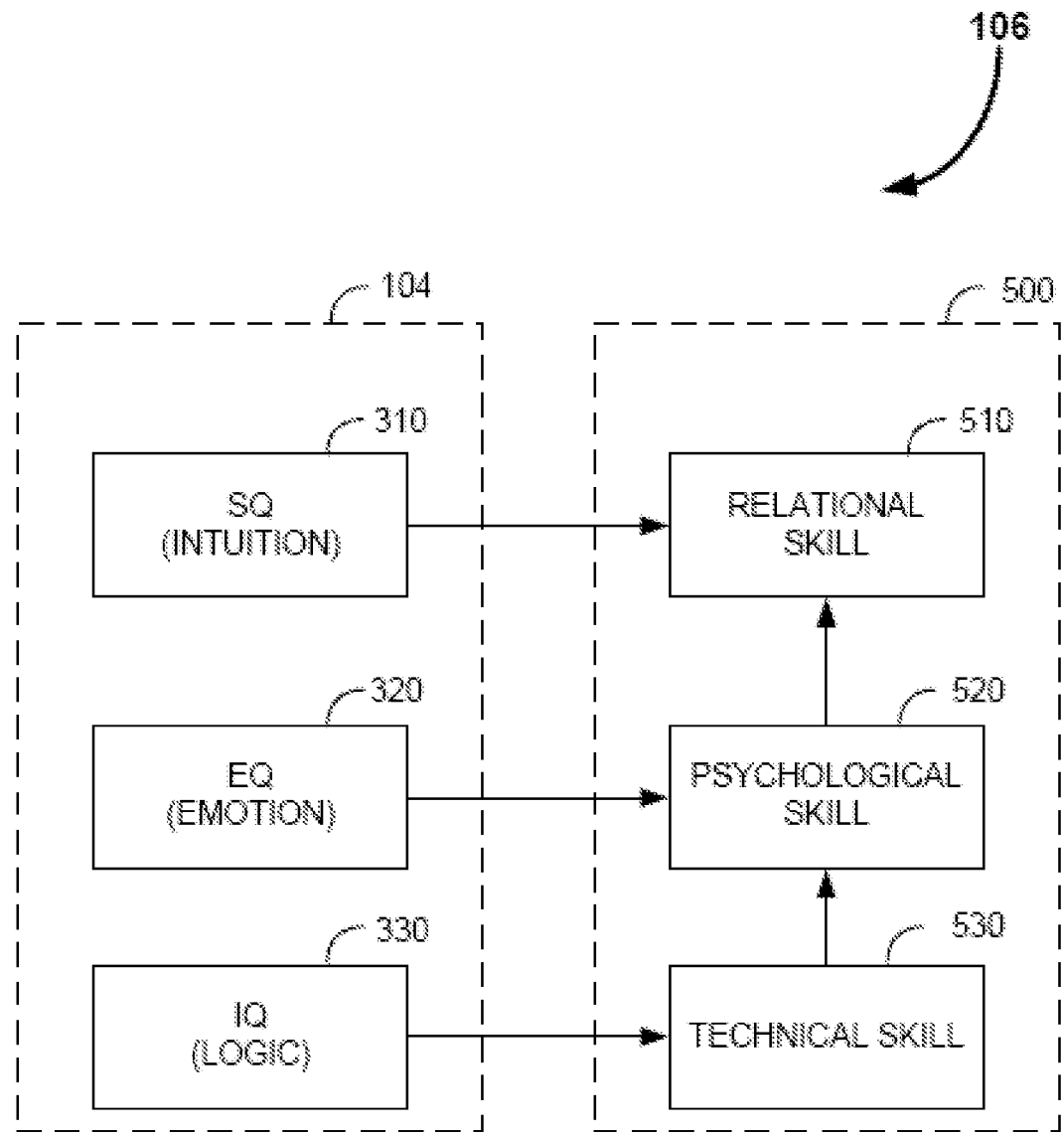
FIG. 5A shows a first exemplary functional block diagram of the Three Assets in accordance with the turbo evolution machine toolkit of FIG. 2A.

FIG. 5A shows a first exemplary functional block diagram of the Three Assets 106 in accordance with the Turbo Evolution Toolkit 100. The Three Assets 106 outlined in this figure has particularly potent impact upon job relationships, and other scenarios where problem solving is crucial. Thus, for a successful business career, development of the Three Assets 106 is imperative. Such success may include promotion and excellence in one's given field, but may also include the subjective experience of helping oneself and others.

The Three Assets 106 includes a Relational Skill 510, a Psychological Skill 520 and a Technical Skill 530. Intuition 310 relates to the Relational Skill 510. Likewise, Emotion 320 relates to the Psychological Skill 520 and Logic 330 relates to the Technical Skill 530.

Technical Skill 530 is the foundation of success. As noted, Technical Skill 530 requires input from Logic 330 in that Technical Skill 530 is basically applied logic. The Technical Skill 530 is typically the "entry ticket" or "price of admission" required for any particular job or problem solving scenario. However, realistically, the demands upon Technical Skill 530 develop over time, thus any one individual's Technical Skill 530 may become obsolete. Constant training is required to maintain an edge in one's Technical Skill 530. However, due to the "cheaper-younger-better" phenomenon, one's Technical Skill 530 is a short term tool for satisfying basic survival needs. Evolution beyond Technical Skill 530 is required for further success.

For success in business and any advanced life setting, one must evolve from reliance purely upon Technical Skill 530 and develop Psychological Skill 520. Psychological Skill 520 includes the ability to observe one's own and others' behavioral patterns in order to learn how to negotiate the wane and waft of interpersonal relationships. This is critical to business and life success since, in the modern era, work is done through relationships. By developing one's Psychological Skill 520, which relies upon one's Emotion 320, patterns in relationships may be identified and future relationship reactions may be predicted. These predictions in reactions may be leveraged to avoid destructive relational patterns.

Continuing the evolution process in a business setting, one must further evolve from reliance upon Psychological Skill 520 and develop Relational Skill 510. This is particularly true when in the upper echelons of a business organization, since at such elevated levels feedback is a scarcer commodity. With less feedback, intuitive self assessment, Relational Skill 510, and relying upon one's Intuition 310, becomes crucial to continued success.

A corporation's "spirit" may be defined as the key of a customer experience, the company brand, employee morale and the buzz in the marketplace. This corporate spirit has an enormous impact upon business success. A healthy spirit may vault a corporation into the limelight. An example of healthy spirit may be seen in the rise of Microsoft® in the late 1980's and early 1990's. However, as powerful as a strong spirit may be, it is also a fragile entity. Reductions in work force, lower than anticipated revenues, as well as interpersonal problems in the organization may quickly erode spirit.

When leaders know how to connect with their employees, customers and the public, spirit may be regained and increased. This talent is required of successful leaders and relies upon Relational Skill 510, as Relational Skill 510 enables an individual to perceive shifts in spirit, and react accordingly.

Using all of the Three Assets together provides the key foundation for a type of evolutionary leadership. This means that one who is skilled at all three, constantly growing technical expertise, advanced psychological self-awareness of self and others, and the intuitive savvy of relational skill, will prove to be a very adept leader. Since the key role of one who is turbo evolving is that of a leader, the Three Assets are required to be in balance and in a state of constant improvement in order to be masterful in the leadership role. Turbo evolution leadership implies that those leaders are leading by their examples, and inspiring others to also initiate a turbo evolution lifestyle. This leads to a rapid advancement of human society. This ongoing societal evolution is required in this era because as a species and as part of the general organic nature of life on earth, we are all changing very quickly. Constructively harnessing and guiding this process rapid change by being able to turbo evolve facilitates one's ability to serve as a leader during this time of rapid and dynamic planetary change. Without turbo evolving leaders we face even more difficulty in being able to successfully navigate the dynamic and rapidly changing world we currently inhabit.

Figure 5B:
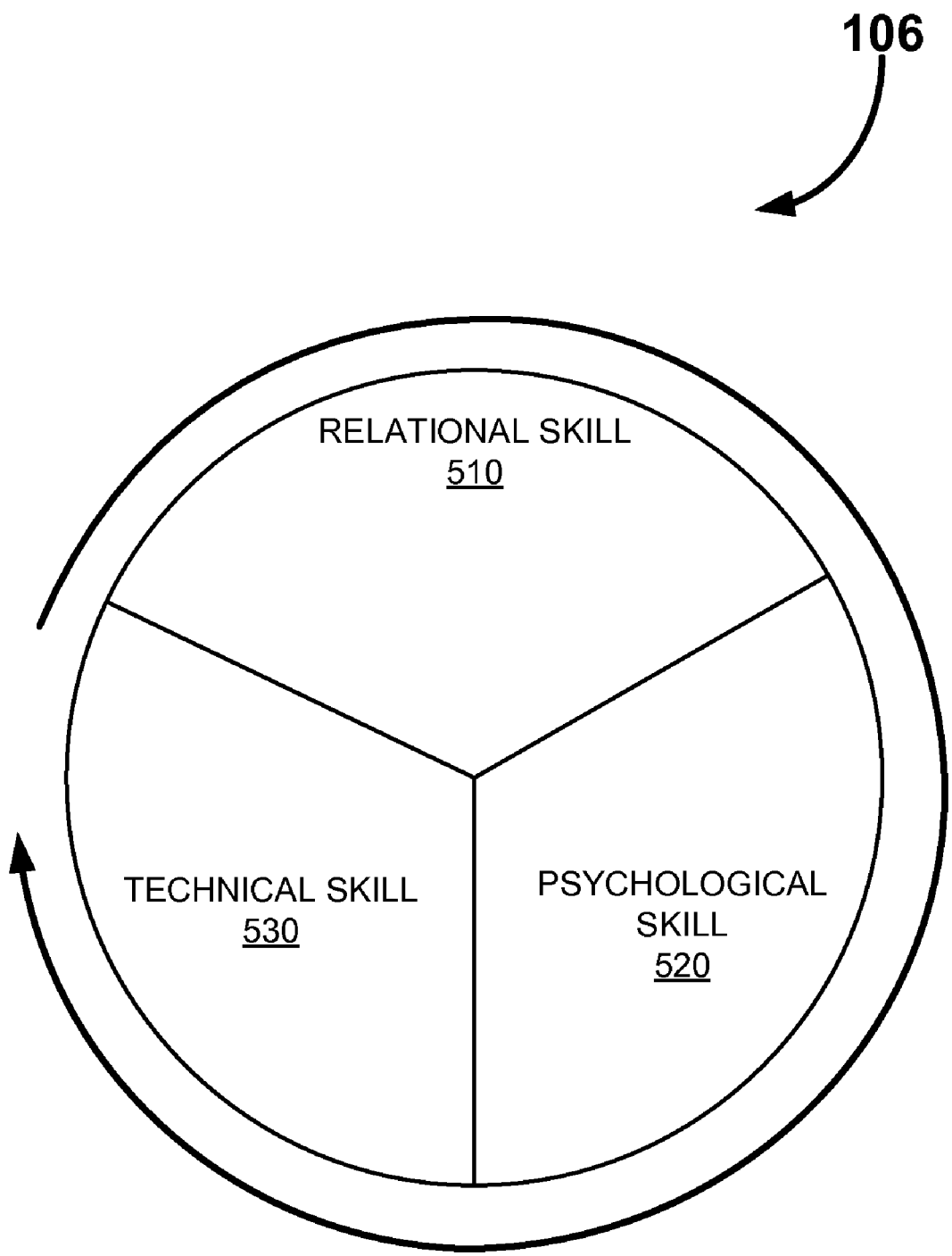
FIG. 5B shows a second exemplary functional block diagram of the Three Assets in accordance with the turbo evolution machine toolkit of FIG. 2A.

FIG. 5B shows a second exemplary functional block diagram of the Three Assets 106 in accordance with the Turbo Evolution Toolkit 100. As noted above, the Three Assets 106 outlined in this figure has particularly potent impact upon job relationships, and other scenarios where problem solving is crucial. The Three Assets 106 include a Relational Skill 510, a Psychological Skill 520 and a Technical Skill 530.

In FIG. 5B a simpler version of the Three Assets model 106 is provided, which is based on the same type of graphic as the Three Intelligences. In fact, the Three Intelligences triads are intact, and demonstrate that each of the Assets correlates directly with the Intelligence that inhabits that triad. Thus, Relational Skill 510 correlates with Intuition 310.

The circular graphic simplifies the Three Assets model 106 for those who desire an easier system to grasp, and who require a more basic approach so that they can apply the principles easily, and not become confused. The original model as described above in relation to FIG. 5A requires more time and a type of readiness to explore the subtleties and deeper insights embedded in the more complex model.

The circular arrow around the Three Assets represents an ongoing dynamic movement. This implies a range of dynamics including the assumption that we often start with Technical Skill 530 in our work. However, since there is a circular model, we can also start with any of the other two (Relational Skill 510 and Psychological Skill 520). The circular model also implies the equal nature of all Three Assets 106, and that an individual may start anywhere in the circle. The circular model also makes it easier to correlate the intelligence with the asset since they are in the same sections of the circle. Finally, the circular model shows that one's job is to keep going around the circle in order to become more masterful at manifesting all Three Assets in an ongoing manner.

This simpler model may be utilized in seminars that include the Three Intelligences 104. Also the circular Three Assets model 106 may still utilize the Three Assets Self-Assessment tool. Both the original and circular model may use that tool to measure the overall balance of the Three Assets of each individual.

II. Turbo Evolution Machine

Figure 1A:
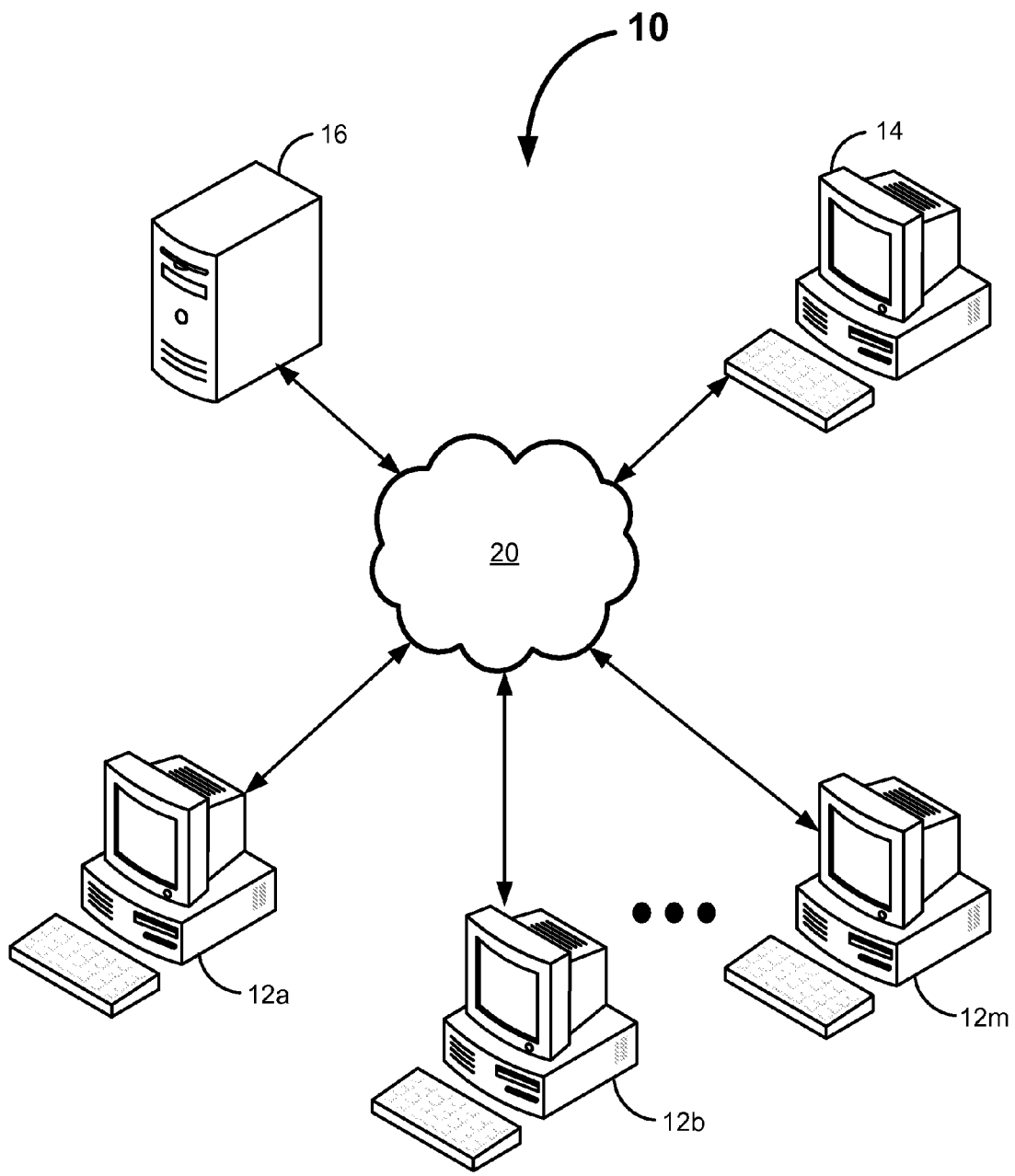
FIG. 1A shows an exemplary illustration of a turbo evolution machine in accordance with some embodiments of the present invention.

FIG. 1A shows an exemplary illustration of a turbo evolution machine computer structure, shown generally at 10. A server 16 couples to a Trainer Computer System 14, and more than one Trainee Computer Systems 12a, 12b and 12m. The coupling may be through a Wide Area Network (WAN) 20. In some embodiments the WAN 20 may include the internet, a corporate network, a local area network, a virtual network, or other private network.

Figure 1B:
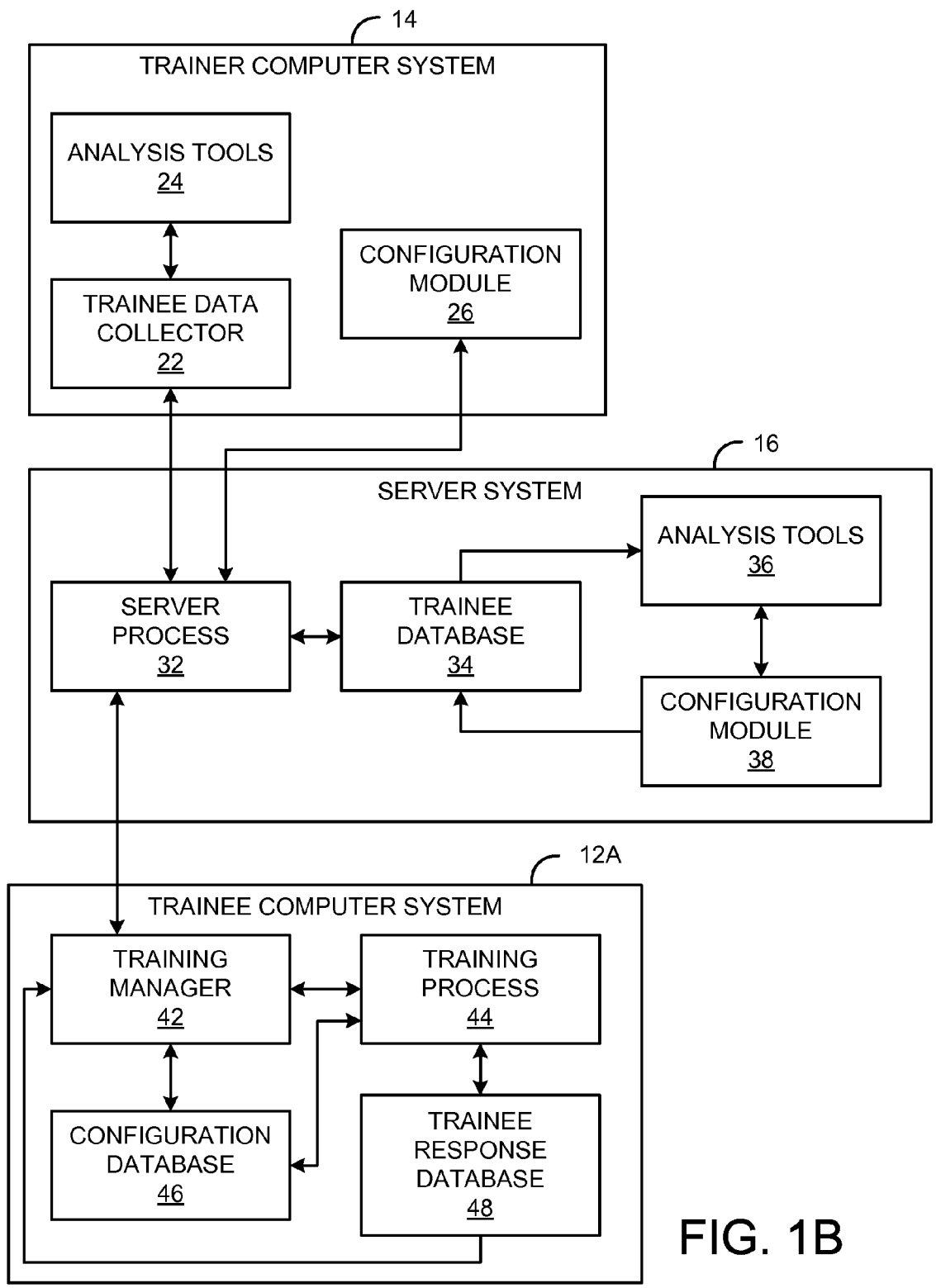
FIG. 1B shows an exemplary illustration of the system architecture for the turbo evolution machine of FIG. 1A.

FIG. 1B shows an exemplary illustration of the system architecture, for the turbo evolution machine computer structure. Here the Trainer Computer System 14 may be seen coupled to the Server System 16, which in turn may be coupled to an exemplary Trainee Computer System 12a. The Trainer Computer System 14 may include an Analysis Tool 24 coupled to a Trainee Data Collector 22. Additionally, the Trainer Computer System 14 may include a Trainer Configuration Module 26. The Trainer Configuration Module 26 may enable the trainer to specify adaptations in the training process and may include an interface. The Trainer Configuration Module 26 and Trainee Data Collector 22 may couple to a Server Process 32 of the Server System 16.

The Server System 16 may also include a Trainee Database 34, a Server Analysis Tool 36 and a Server Configuration Module 38. The Server Analysis Tool 36 may couple to the Server Configuration Module 38 and Trainee Database 34. Information from the Trainee Database 34 may be sent to the Server Analysis Tool 36, where the information may be analyzed for development of kernel insights or other assessor matrices. This processed information may be provided to the Server Configuration Module 38 where decisions as to the assessors and feedback for the trainee may be configured. These configurations may then, in turn be provided to the Trainee Database 34. The Trainee Data Collector 22 may access these configurations via the Server Process 32.

The Trainee Computer System 12a includes a Training Manager 42, a Training Process 44, a Trainee Configuration Database 46 and a Trainee Response Database 48. The Training Manager 42 includes an interface and provides connectivity between the trainee, the Trainee Computer System 12a and the 16. The Training Process 44 couples to the Training Manager 42 where output from the Training Process 44 may populate the Trainee Response Database 48. The Training Manager 42 may be configured using data from the Trainee Configuration Database 46. The Trainee Configuration Database 46 may be populated by output from the Server Configuration Module 38 of the Server System 16. Information from the Trainee Response Database 48 may be supplied to the Trainee Database 34 via the Training Manager 42.

Figure 6:
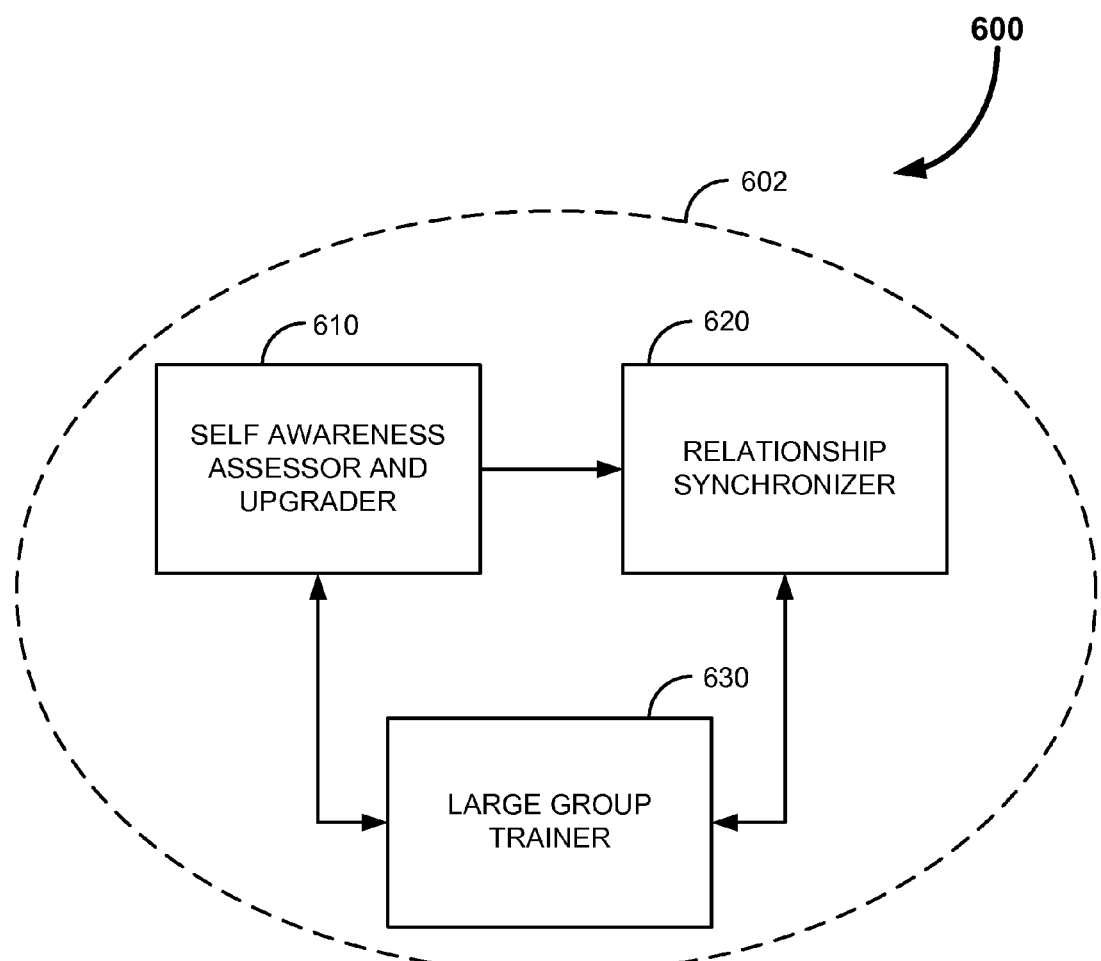
FIG. 6 shows an exemplary functional block diagram of the turbo evolution machine in accordance with some embodiments of the present invention.

FIG. 6 shows an exemplary functional block diagram of the Turbo Evolution Machine 600 in accordance with some embodiments of the present invention. The Turbo Evolution Machine 600 includes a Cultural Evolver 602. Within the Cultural Evolver 602 exists a Self Awareness Assessor and Upgrader 610, a Relationship Synchronizer 620 and a Large Group Trainer 630, each coupled to one another. The output from the Self Awareness Assessor and Upgrader 610 may be processed through the Relationship Synchronizer 620 or the Large Group Trainer 630. Likewise, output from the Large Group Trainer 630 may be processed through either Self Awareness Assessor and Upgrader 610 or Relationship Synchronizer 620. However, Relationship Synchronizer 620 output may be processed by the Large Group Trainer 630. Any module, Self Awareness Assessor and Upgrader 610, Relationship Synchronizer 620 or Large Group Trainer 630, may be utilized alone or in any combination in order to advance the individual and group to a turbo evolved state. Likewise, a secondary result of the Turbo Evolution Machine 600 is to modulate group culture. In most circumstances turbo evolution of the individual has a secondary and direct effect upon the group culture without the implementation of any additional group modulation tools. However, when an individual is engaged in turbo evolution, and cultural modulation tools such as Creative Partnership 110 and Conflict to Creativity 112 are implemented, the Cultural Evolver 602 may more effectively alter the group culture to reflect a "cultural turbo evolved state".

Figure 7:
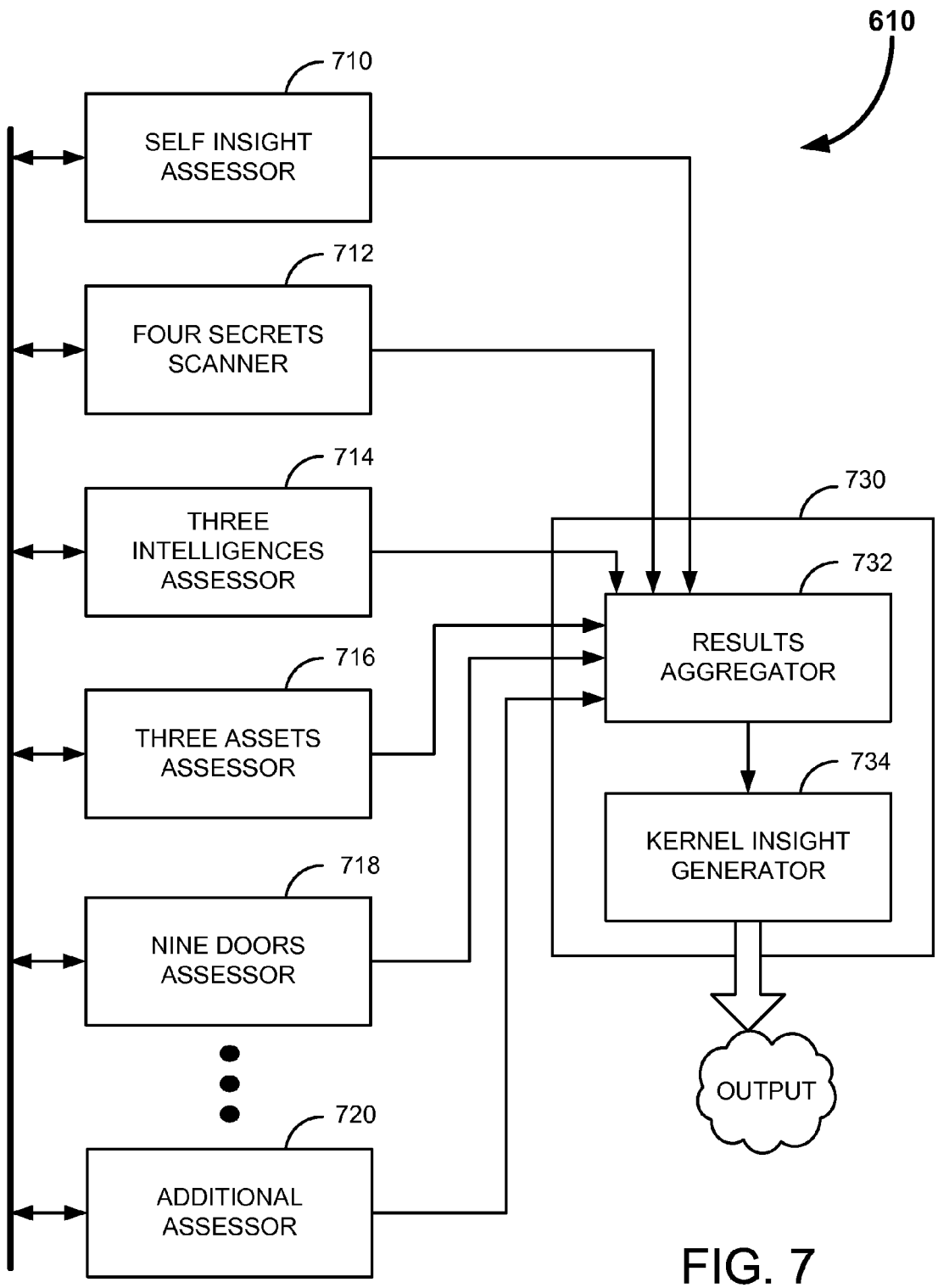
FIG. 7 shows an exemplary functional block diagram of the self-awareness assessor and upgrader in accordance with the turbo evolution machine of FIG. 6.

FIG. 7 shows an exemplary functional block diagram of the Self Awareness Assessor and Upgrader 610 in accordance with the Turbo Evolution Machine 600. The Self Awareness Assessor and Upgrader 610 may include any number of assessors. Some possible assessors include a Self Insight Assessor 710, a Four Secrets Scanner 712, a Three Intelligences Assessor 714, a Three Assets Assessor 716, a Nine Doors Assessor 718 and any other Additional Assessor 720.

In some embodiments, each assessor may be coupled to one another. In some alternate embodiments, only particular assessors may be included in the Self Awareness Assessor and Upgrader 610. An individual being processed through the Self Awareness Assessor and Upgrader 610 will engage in some battery of assessments. In some embodiments, an initial test may be given to determine the required assessments that are necessary to meet the individual's goals.

The Self Insight Assessor 710 may include a series of subjectively answered questions that the individual completes. The questions may then be scored and the results may be provided to the Results Aggregator 732 of the Assessment Reporter 730.

The Self Insight Program (SIP) includes a range of assessments and reports. The reports include the Goals and Existing Self-Awareness Report which serves as a personal strategic plan that is generated in the first SIP session. The Self Insight Program Report may include results from existing psychological tests, but these results are interpreted through the lens of the Turbo Evolution machine. Nine Doors and other Trimergence facilitator's feedback is also included in this extensive report. Each of the sessions has a specific purpose. The first is the strategic planning session, second is the report feedback session, third is the course correction, and the final session is the action implementation. The individual who is gaining rapid insight to drive his/her turbo evolution capability has homework and reflection between the sessions, which usually occurs over a period of 4-6 weeks. The entire insight development process usually occurs in about 5 months. This rapid Self Insight upgrade also utilizes the tools the turbo evolution machine, most of which are taught to the individual through 1:1 interaction, rather than in a group. A key next step to the SIP process is the relationship synchronizing sessions with key work or personal partners. This drives the value of the SIP by creating a practical relationship upgrade. In some embodiments, all members of relationship synchronizing sessions are SIP graduates. In some embodiments, all relationship synchronizing partners use the one page personality resume, the Kernel Insight.

The Self Insight Assessor 710 may be performed through standard "pen and paper" techniques or may be a computerized assessment program. In some embodiments, the assessment may be facilitated by a professional trainer, such as a Trimergence facilitator. Likewise, assessment scoring may be a self scoring technique, may be machine scored, or may be scored by a facilitator.

In some embodiments, the assessment score may be weighted by question "potency", assessment type, the kind of business the individual is engaged in, or by any additional factor. Moreover, in some embodiments, the questions utilized in the Self Insight Assessor 710 may be configured, dependent upon business type, personal data such as age or gender, or employer criteria.

The Four Secrets Scanner 712 may include a series of subjectively answered questions that the individual completes. The questions may then be scored and the results may be provided to the Results Aggregator 732 of the Assessment Reporter 730. In some alternate embodiments, the Four Secrets Scanner 712 includes a multistep process for "tranceformance" of the Four Secrets into the four insights, i.e., freeing blocked motivators. Of particular importance to the Four Secrets Scanner 712 is the ability to 'save' and 'recall' the key secrets to tranceformance, thereby enabling an 'emotional tonic'.

The Four Secrets Scanner 712 may be performed through standard "pen and paper" techniques or may be a computerized assessment program. In some embodiments, the assessment may be facilitated by a professional trainer, such as a Trimergence facilitator. In some alternate embodiments, the Four Secrets Scanner 712 may include a pure mental exercise with reflective output, thereby enabling the Four Secrets Scanner 712 to be performed, as needed, on the fly. Likewise, assessment scoring may be a self scoring technique, may be machine scored, may include reflective output, or may be scored by a facilitator.

In some embodiments, where an assessment score is given for the Four Secrets Scanner 712, the score may be weighted by question "potency", assessment type, the kind of business the individual is engaged in, or by any additional factor. Moreover, in some embodiments, the questions utilized in the Four Secrets Scanner 712 may be configured dependent upon business type, personal data such as age or gender, or employer criteria.

In some embodiments, the Three Intelligences Assessor 714 may include a series of subjectively answered questions that the individual completes. The questions may then be scored and the results may be provided to the Results Aggregator 732 of the Assessment Reporter 730. In some alternate embodiments, the Three Intelligences Assessor 714 includes a series of questions, each targeting one or more of the Three Intelligences. By compiling the answers to the questions targeting each of the intelligences, the relative strengths of each intelligence may be provided.

In some embodiments, the absolute strength of each intelligence may additionally be determined. In some of these embodiments, the test may include a bifurcated question set. The initial questions may target the individual's relative strengths in intelligences. This result may aid the individual in a strategic plan to better exploit underutilized intelligences. The second question set may then test absolute ability in each of the Three Intelligences. This absolute strength score may then enable advanced employee screening, strategic planning for three asset development, career advice and general understanding of one's capabilities. Of course, in some alternate embodiments, the absolute scores for each intelligence may be compared to generate a relative intelligence matrix. This eliminated the need for a bifurcated test; however, nuances of relative strengths may be difficult to distinguish when relying on said technique.

Like other assessors, the Three Intelligences Assessor 714 may be performed through standard "pen and paper" techniques or may be a computerized assessment program. In some embodiments, the assessment may be facilitated by a professional trainer, such as a Trimergence facilitator. Moreover, assessment scoring may be a self scoring technique, may be machine scored, may include reflective output, or may be scored by a facilitator.

In some embodiments, the assessment score outputted by the Three Intelligences Assessor 714 may be weighted by question "potency", assessment type, the kind of business the individual is engaged in, or by any additional factor. For example, in a technology company, logic intelligence score may be weighted in order to reflect the company's needs. Additionally, in some embodiments, the individual's personal career goals may be considered in the assessment. For example a systems engineer may aspire to a senior engineer level. The needs of a senior engineer will differ over a senior sales manager or CEO position. These goals may be used to customize weighing factors to increase potency of scores. Moreover, in some embodiments, the questions utilized in the Three Intelligences Assessor 714 may be configured to be dependent upon business type, personal data such as age or gender, or employer criteria.

The Three Assets Assessor 716 may include a series of subjectively answered questions that the individual completes. The questions may then be scored and the results may be provided to the Results Aggregator 732 of the Assessment Reporter 730. In some embodiments, the Three Assets Assessor 716 may include analysis of an individual's strengths in each of the Three Assets discussed above. Like with the Three Intelligences Assessor 714, the Three Assets Assessor 716 may be configured to determine relative strengths of the assets, and may additionally determine absolute strengths in each of the Three Assets. In some alternate embodiments, the results from the Four Secrets Scanner 712 and Three Intelligences Assessor 714 may influence the Three Assets Assessor 716 scoring.

As with other assessors, the Three Assets Assessor 716 may be performed through standard "pen and paper" techniques or may be a computerized assessment program. In some embodiments, the assessment may be facilitated by a professional trainer, such as a Trimergence facilitator. Likewise, assessment scoring may be a self scoring technique, may be machine scored, may include reflective output, or may be scored by a facilitator.

In some embodiments, where an assessment score is given for the Three Assets Assessor 716, the score may be weighted by question "potency", assessment type, the kind of business the individual is engaged in, or by any additional factor. Moreover, in some embodiments, the questions utilized in the Three Assets Assessor 716 may be configured dependent upon business type, personal data such as age or gender, or employer criteria. For the Three Assets Assessor 716 dependence upon business type, employment goals and the like are even more pronounced, as the Three Assets is primarily a tool for business success. Thus, configuration of questions and weighting of scores for the Three Assets Assessor 716 may be particularly fruitful.

In some embodiments, the Nine Doors Assessor 718 may include a series of subjectively answered questions that the individual completes. The questions may then be scored and the results may be provided to the Results Aggregator 732 of the Assessment Reporter 730. In some alternate embodiments, the Nine Doors Assessor 718 may combine testing introversion versus extroversion by the primary intelligence from Three Intelligences Assessor 714. This combined matrix may then be tested through questions or observation to differentiate Perception Orientations.

In some embodiments, the doorway, may be provided as a statistical interpretation rather than an absolute categorization. For example, since the Nine Doors Enneagram system is located on a circular spectrum, it is expected that any individual may experience at least some aspects of Perceptual Orientation belonging to each Nine Doors Enneagram doorway. Thus, a percentile breakdown may be generated to provide a more accurate and personalized Nine Doors Enneagram profile for the tested individual.

Like other assessors, the Nine Doors Assessor 718 may be performed through standard "pen and paper" techniques or may be a computerized assessment program. In some embodiments, the assessment may be facilitated by a professional trainer, such as a Trimergence facilitator. Moreover, assessment scoring may be a self scoring technique, may be machine scored, may include reflective output, or may be scored by a facilitator.

Like other assessors, in some embodiments, the assessment score outputted by the Nine Doors Assessor 718 may be weighted by question "potency", assessment type, the kind of business the individual is engaged in, or by any additional factor. Moreover, in some embodiments, the questions utilized in the Nine Doors Assessor 718 may be configured dependent upon business type, personal data such as age or gender, or employer criteria.

An Additional Assessor 720 is illustrated as a place holder for additional skill and personality assessments. The Additional Assessor 720 may be one, or more, assessors as is needed to perform a comprehensive personal assessment. It is understood that there exists a number of lesser utilized assessments that may be beneficially applied in particular scenarios.

For example, a company requiring all new management to engage in a turbo evolution course as a portion of hiring practice may desire a cultural compatibility assessment as a portion of the self-awareness program. Such an assessment could be highly customized to a particular corporate culture, or a general business culture. Such an assessment may provide insight into possible friction points between the individual and the employer's culture and may resolve issues relating to integration before such issues truly arise. This assessment can be customized to meet the need of the organization, but would use the Turbo Evolution machine constructs as the metrics and variables to measure and report on.

Again, output from the Additional Assessor 720 may be provided to the Results Aggregator 732 of the Assessment Reporter 730. Also, like other assessors, the Additional Assessor 720 may be performed through standard "pen and paper" techniques or may be a computerized assessment program. In some embodiments, the assessment may be facilitated by a professional trainer, such as a Trimergence facilitator. Assessment scoring may be a self scoring technique, may be machine scored, may include reflective output, or may be scored by a facilitator. In some embodiments, the assessment score outputted by the Additional Assessor 720 may be weighted by question "potency", assessment type, the kind of business the individual is engaged in, or by any additional factor. Moreover, in some embodiments, the questions utilized in the Additional Assessor 720 may be configured dependent upon business type, personal data such as age or gender, or employer criteria.

Results from all assessments may be sent to the Results Aggregator 732 of the Assessment Reporter 730. The Assessment Reporter 730 includes the Results Aggregator 732 and Kernel Insight Generator 734. Aggregation of results by the Results Aggregator 732 may include compiling all results. In some embodiments, the Results Aggregator 732 may receive results from any number of assessors, dependent upon the number and variety of assessments the individual performs. For example, in some embodiments, the individual may only engage in the Three Intelligences Assessor 714. In this example, the Results Aggregator 732 would only receive results from the Three Intelligences Assessor 714 and the eventual report would reflect data on the Three Intelligences. In another example, the individual may engage in a number of assessments, all of which will provide results to the Results Aggregator 732. The result of engaging in more assessments is the generation of a richer and more complete assessment report. Thus, the level of detail in assessment may be chosen to reflect the goals of the assessment process, and detail level of the report desired.

In some embodiments, results from more dispositive assessments may be weighted against other assessments results. Results may be aggregated in a matrix, and synergetic results may be generated through comparisons. For example, information from the Four Secrets Scanner 712 as to blocked motivations may be combined with results from the Nine Doors Assessor 718 in order to identify attack plans that will most efficiently evolve the blocked motivation into that of a freed motivation given the individual's Nine Doors Enneagram type.

After results from the varying assessments are aggregated, the aggregation may be sent to the Kernel Insight Generator 734 for the generation of a consumable personality report. Such a report may be referred to as a "personality resume", a "kernel insight", a "kernel insight report" or simply a "report". Such a report may provide data from the assessments in a readable and usable format for the individual and other interested parties. Format of the kernel insight may be configured dependent upon downstream uses. In some embodiments, the kernel insight may include a detailed analysis of personality, strengths and challenges. Additionally, in some embodiments, the kernel insight may include strategies for dealing with particular situations, other Perception Orientations, and a plan for accelerated self improvement to achieve a turbo evolved state.

Figure 8:
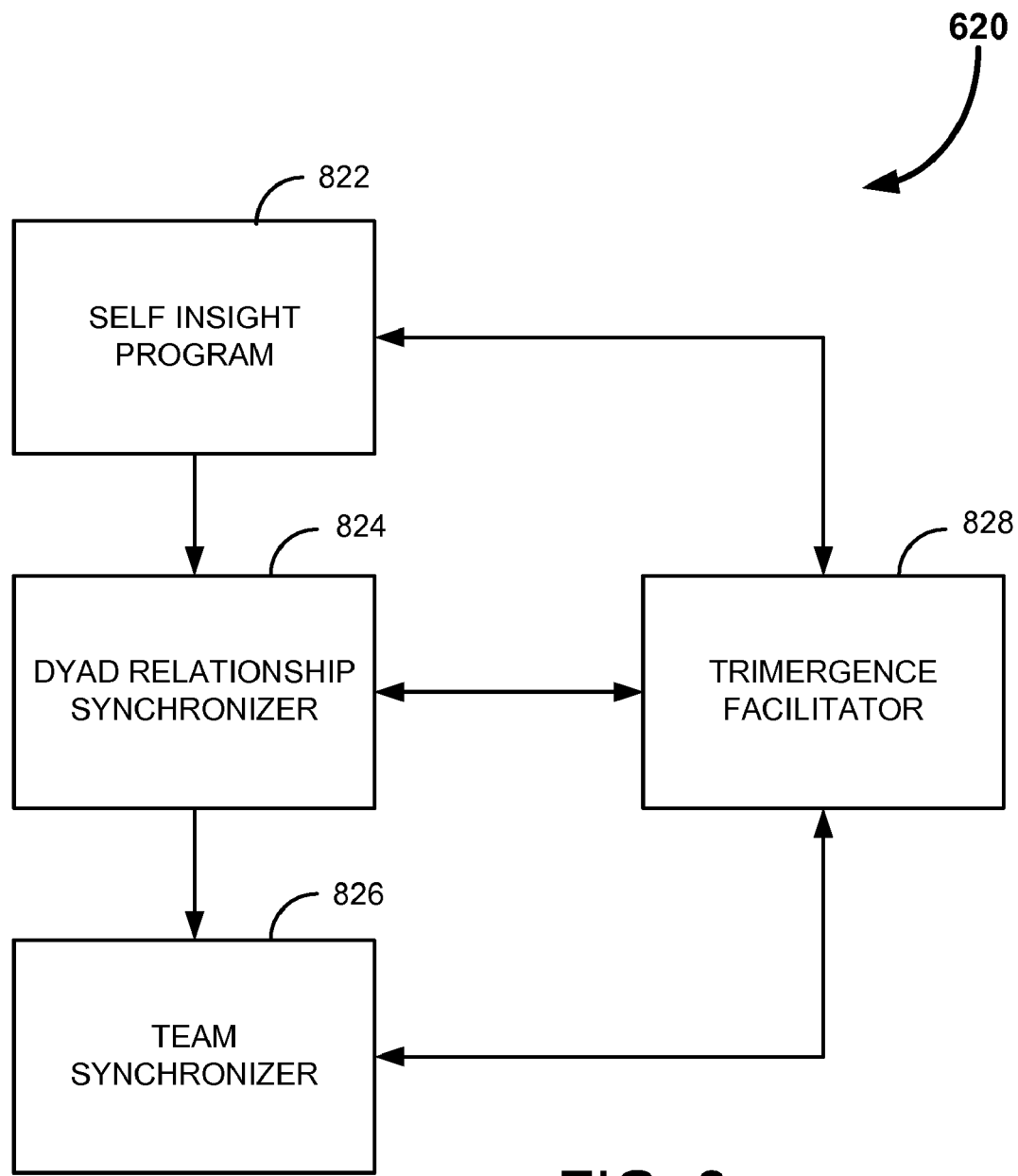
FIG. 8 shows an exemplary functional block diagram of the relationship synchronizer in accordance with the turbo evolution machine of FIG. 6.

FIG. 8 shows an exemplary functional block diagram of the Relationship Synchronizer 620 in accordance with the Turbo Evolution Machine 600. The Relationship Synchronizer 620 includes a Self Insight Program 822 which includes receiving one or more individuals that have been processed through the Self Awareness Assessor and Upgrader 610 or Large Group Trainer 630. These individuals are processed such that they advance to an evolved state of self-awareness. Self-awareness of the participants is integral to the proper function of the Relationship Synchronizer 620.

After engaging in the Self Insight Program 822, individuals are paired in the Dyad Relationship Synchronizer 824, which may also be known as a Dyad Relationship Synchronization or Pair Synchronization, where dyads are formed between the evolved individuals. Through a series of self exposure and sharing of the kernel insight, agreements are generated between the individuals engaged in the Dyad Relationship Synchronizer 824. The agreements may then be implemented and followed up upon.

After the Dyad Relationship Synchronizer 824, the individuals may progress to the Team Synchronizer 826 where team synchronization may occur. The team synchronization involves a larger number of individuals than the dyad Relationship Synchronization. In the team synchronization, a strategy is devised, and each dyad permutation engages in a synchronization akin to the dyad Relationship Synchronization. However, in the team synchronization, in addition to the generation of dyadic agreements, the entire team may also generate agreements that are implemented and followed up upon.

In some embodiments, a Trimergence Facilitator 828 aids in each of the Self Insight Program 822, the Dyad Relationship Synchronizer 824 and the Team Synchronizer 826. In some alternate embodiments, the Trimergence Facilitator 828 may not be required for each component of the Relationship Synchronizer 620, and will only engage in the necessary components.

The Trimergence Facilitator 828 may include a coach, or other instructor trained in the turbo evolution machine technology. Additionally, in some embodiments, the Trimergence Facilitator 828 may include additional material including, but not limited to, video presentations, written materials, workbooks, biometric tests, software programs, web-based interfaces, board games, online games, audio feeds, limited artificial intelligences, or any additional reasonable media.

Figure 9:
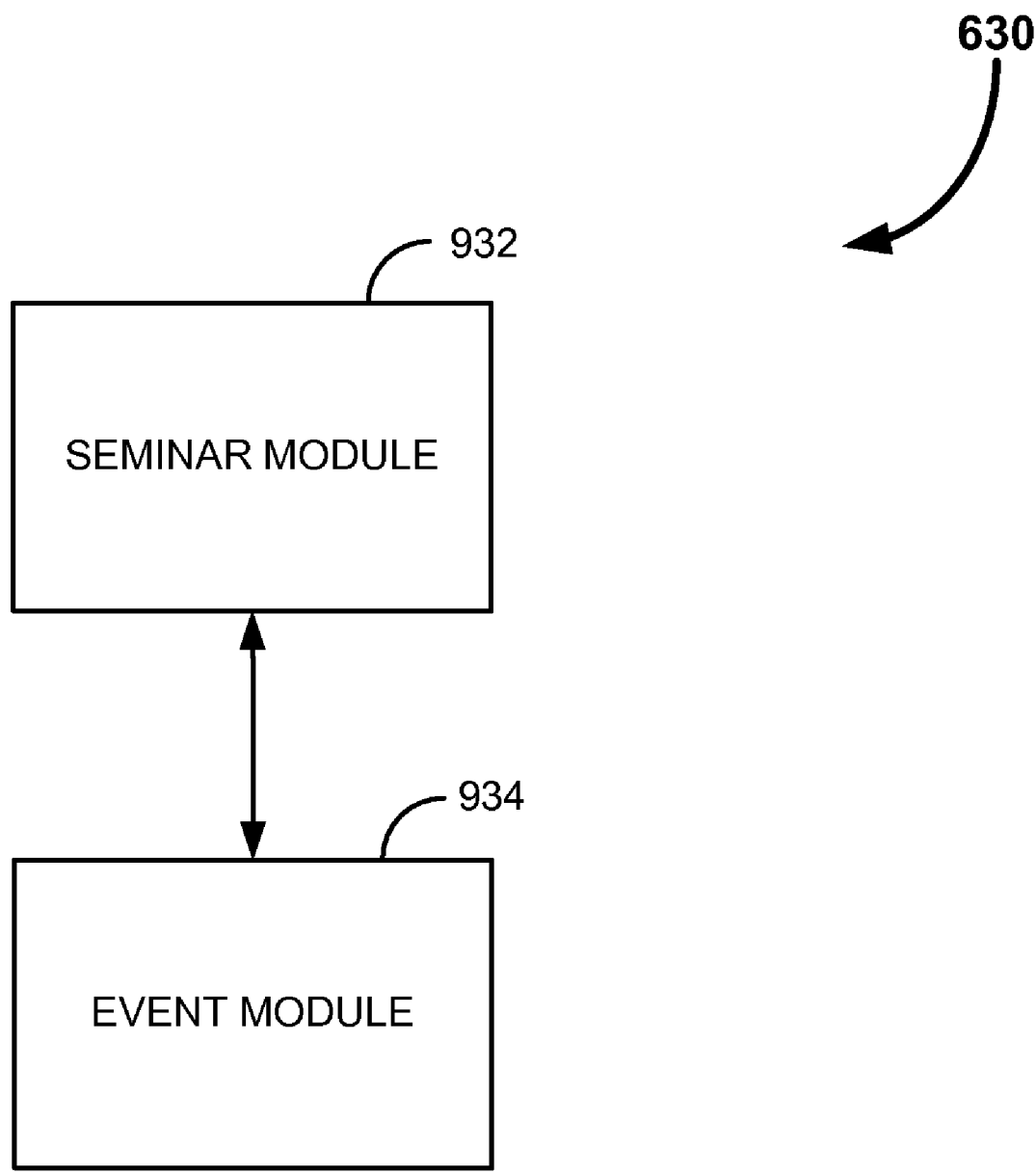
FIG. 9 shows an exemplary functional block diagram of the large group trainer in accordance with the turbo evolution machine of FIG. 6.

FIG. 9 shows an exemplary functional block diagram of the Large Group Trainer 630 in accordance with the Turbo Evolution Machine 600. The Large Group Trainer 630 includes a Seminar Module 932 coupled to an Event Module 934. It should be noted that the Large Group Trainer 630 may include more or fewer components as is desired for functionality and efficiency. The Seminar Module 932 typically includes seminars. The seminar content focuses on the turbo evolution machine components. Seminars include: Three Intelligences, Three Assets, Nine Doors, Conflict to Creativity, the Creative Partnership Game, and group events for self-awareness (Self Insight Program) graduates. In some embodiments, these seminars are usually one half day format with intro and advanced modules. Turbo evolution machine clients can enter through any seminar whether they have participated in the 1:1, the Synchronizing or not. There is a clear pathway of entry into any of the turbo evolution machine components, they all lead to the same outcome which is turbo evolution based on the Four Secrets system. Again, users do not require using the Four Secrets system directly since it underlies all of the turbo evolution machines' components.

The Event Module 934 may include additional group training exercises including online group forums, role-playing sessions, interactive games and themed social events.

III. Methods for Facilitating a Turbo Evolved State

Figure 10:
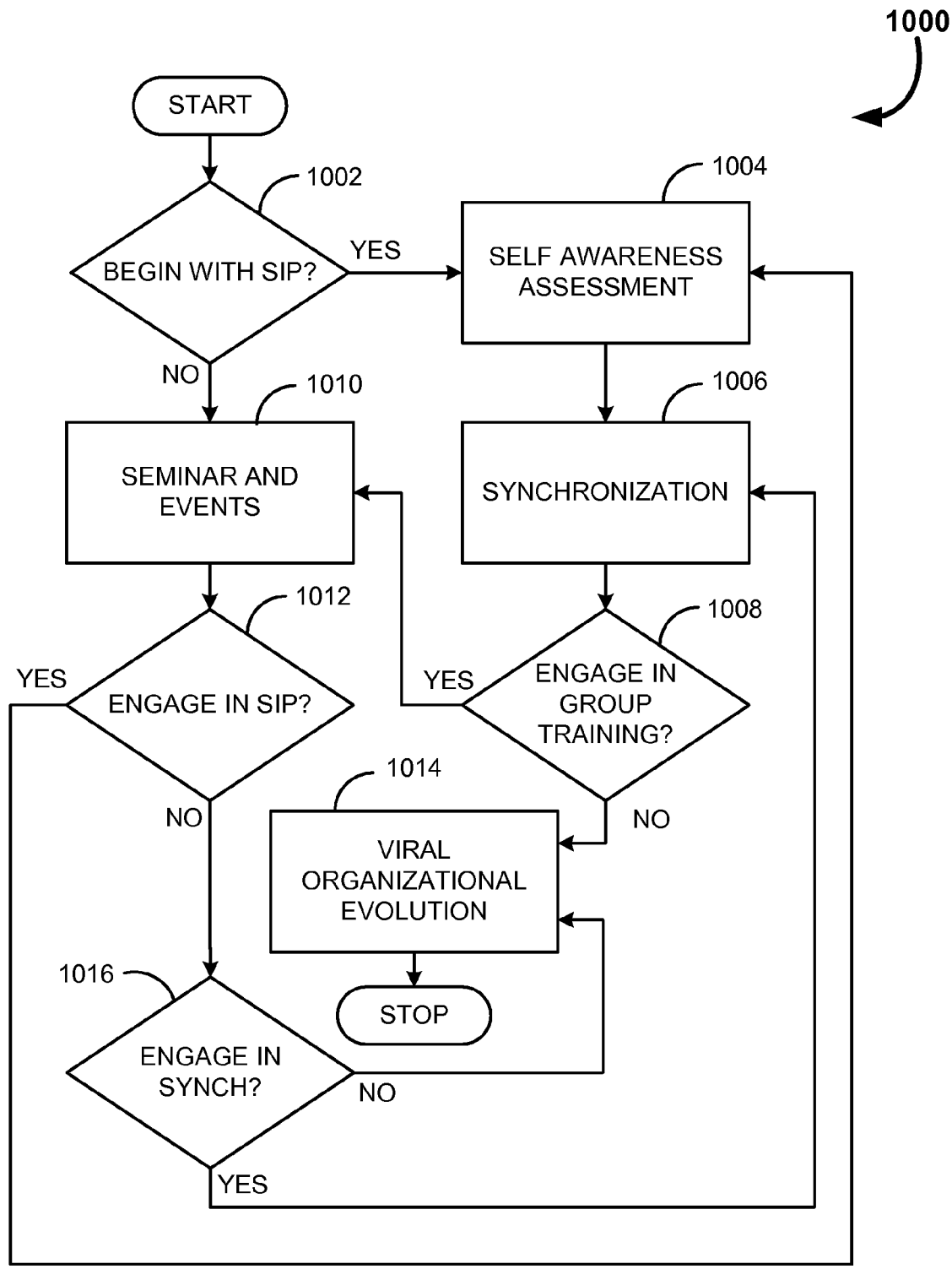
FIG. 10 shows a flow chart illustrating the process for attaining a turbo evolution state for the turbo evolution machine of FIG. 6.

FIG. 10 shows a flow chart illustrating the process for attaining a turbo evolution state, shown generally at 1000. The methods disclosed are intended to be preformed upon at least one embodiment of the Turbo Evolution Machine 600, as disclosed earlier. The process initiates and progresses to step 1002, where an inquiry is made as to whether to begin with a Self Insight Program. If the Self Insight Program is desired, the process then progresses to step 1004 where the individual engages in a self-awareness assessment. This self-awareness assessment may include at least one of an analysis of the individual's self-awareness; diagnosis of the individual's assets, skills and capabilities; and personality assessments.

Output from the self-awareness assessment may include the generation of a kernel insight. The process then progresses to step 1006 where the individual is synchronized through dyad relationship and team synchronizations. After the synchronization process the individual is typically in an evolved state of being to some degree.

The process then progresses to step 1008 where an inquiry is made as to whether the individuals will further engage in seminars and events. Typically, after a Self Insight Program seminars and events primarily aid in honing interpersonal skill sets rather than advance personal awareness. Additionally, seminars and events may include individuals who have not had the benefit of engaging in the Self Insight Program. In such cases, the participation by the evolved individual in the seminars and events may greatly enhance the event effectiveness with non-evolved participants.

If at step 1002, beginning with Self Insight Program is not desired, or at step 1008 engaging in seminars and events is desired, the process then progresses to step 1010 where seminars and events are performed.

As previously noted, the seminar content focuses on the turbo evolution machine components. Seminars include: Three Intelligences, Three Assets, Nine Doors, Conflict to Creativity, the Creative Partnership Game, and group events for self-awareness (Self Insight Program) graduates. In some embodiments, these seminars are usually one half day format with intro and advanced modules. Turbo evolution machine clients can enter through any seminar whether they have participated in the 1:1, the Synchronizing or not. There is a clear pathway of entry into any of the turbo evolution machine components, they all lead to the same outcome which is turbo evolution based on the Four Secrets system. Again, users do not require using the Four Secrets system directly since it underlies all of the turbo evolution machines' components.

The process then progresses to step 1012 where an inquiry is made as to whether to engage in Self Insight Programs. After a seminar event an individual's self-awareness may be increased; however, it is often desired to engage in the full Self Insight process to attain a truly evolved state. If the Self Insight Program is desired the process then progresses to step 1004.

Else, if at step 1012 the Self Insight Program is not desired the process then progresses to step 1016 where an inquiry is made as to whether synchronization is desired. The Self Insight gained from seminars and events may, in some embodiments, be sufficient to prepare an individual for a Relationship Synchronization session. If synchronization is desired the process then progresses to step 1006.

Otherwise, if at step 1016 synchronization is not desired, or at step 1008 group training is not desired, the process then progresses to step 1014 where cultural turbo evolution occurs. The process then ends. However, it should be noted that the cultural and individual turbo evolution is an ongoing process; thus, even though the process as illustrated comes to a definitive conclusion, it should be understood that the enhancement of both the individual and the group continues after the end of the structured process. The turbo evolution process may be reinstituted at a later date based on the evolutionary capacity of the individual, and the cultural need for evolved people. Generally the turbo evolution process is ongoing and requires additional follow up and work.

Figure 11:
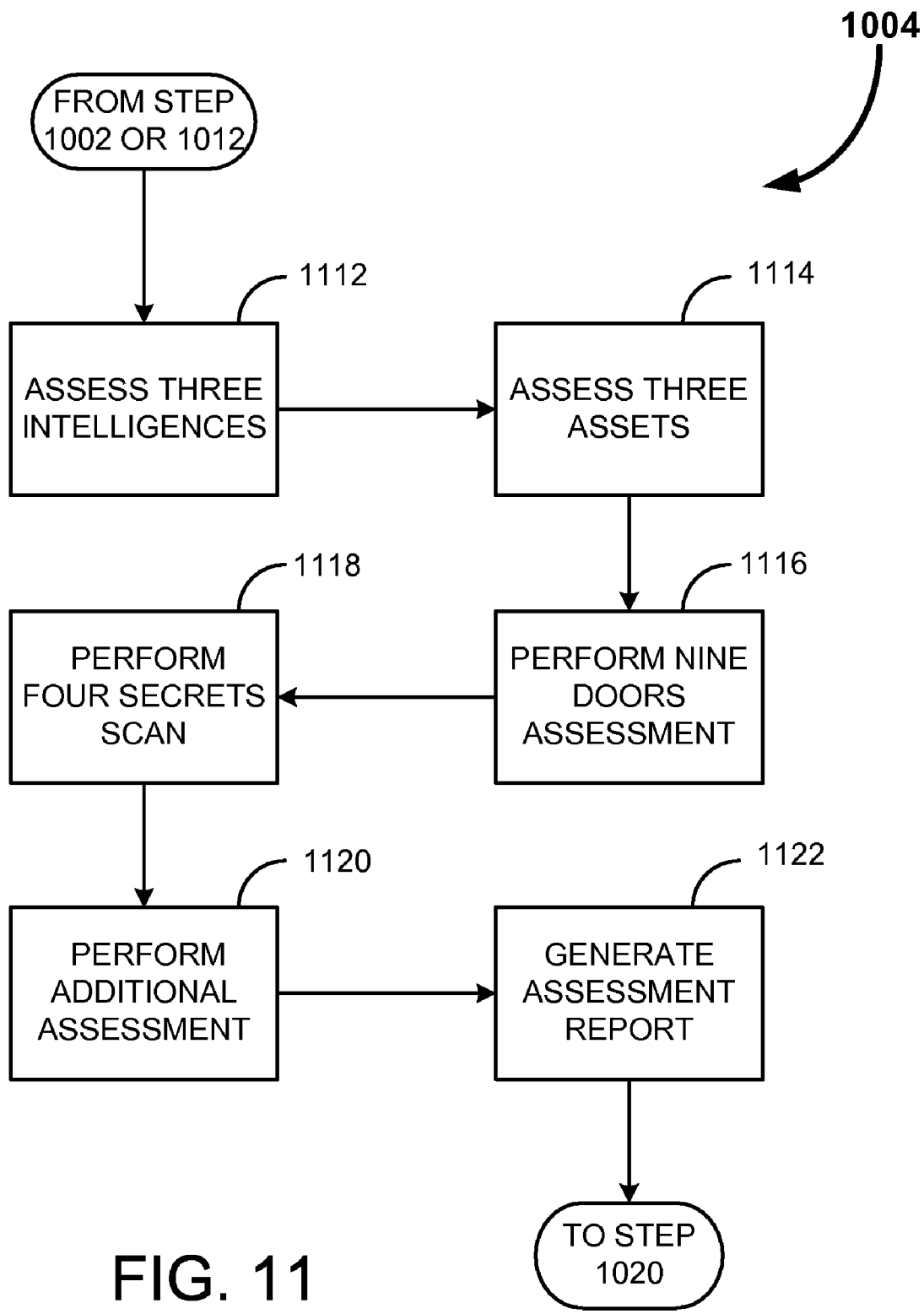
FIG. 11 shows a flow chart illustrating the process for self-awareness assessment for the turbo evolution machine of FIG. 6.

FIG. 11 shows a flow chart illustrating the process for self-awareness assessment, shown generally at 1004. The process begins from either step 1002 or 1012 of FIG. 10. The process then progresses to step 1112 where the Three Intelligences are assessed. The Three Intelligences Assessor 714 may be utilized for this assessment in the manner described above. Then, at step 1114 the Three Assets may be assessed. Here, the Three Assets Assessor 716 may be utilized for this assessment in the manner described above. The process then progresses to step 1116 where the Nine Doors assessment is performed. The Nine Doors Assessor 718 may be utilized for this assessment in the manner described above. Next, the Four Secrets scan may be performed, at step 1118. The Four Secrets Scanner 712 may be utilized to perform the scan. Lastly, the Additional Assessor 720 may be used to perform any additional assessments desired, at step 1120. The process then progresses to step 1122 where an assessment report is generated. The assessment report may contain raw data, compiled aggregate matrices, and/or kernel insight reports. The process then concludes by progressing to step 1020 of FIG. 10. It should be noted that although multiple assessments are illustrated and described regarding the process for self-awareness assessment, fewer or greater assessments may be performed as is desired for functionality, efficiency, or any other legitimate purpose.

Figure 12:
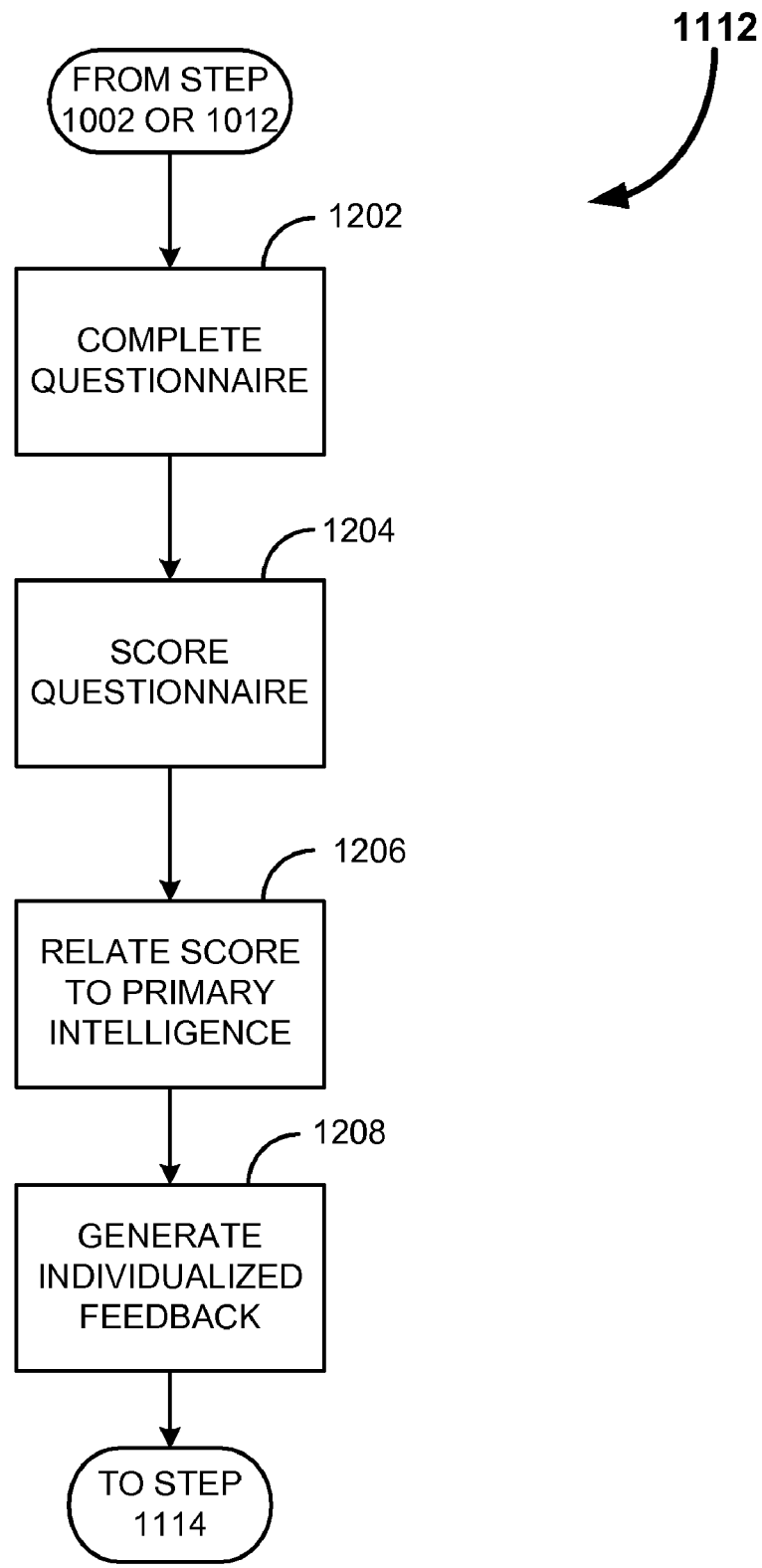
FIG. 12 shows a flow chart illustrating the process for assessing the Three Intelligences for the turbo evolution machine of FIG. 6.

FIG. 12 shows a flow chart illustrating the process for assessing the Three Intelligences, shown generally at 1112. The process begins from either step 1002 or 1012 of FIG. 10. The process then progresses to step 1202 where a questionnaire is completed by the individual being assessed. Then, at step 1204, the question answers may be scored. The score may be related to a primary intelligence at step 1206. In some embodiments, all Three Intelligences may be scored relative to one another, and on an absolute scale. Customized feedback may be generated at step 1208. Such custom feedback may include intelligence types, strategies for achieving a more balanced use of intelligences, and methods for interacting with individuals of different primary intelligences. The process then concludes by progressing to step 1114 of FIG. 11.

All steps of the Three Intelligences assessment may be performed manually, or may be computerized. Additionally, other methods of assessment are contemplated by the present invention. Such assessments include tactile and response based tests, objective analysis including observation, vetting of past tests and background, and self introspection.

Figure 13:
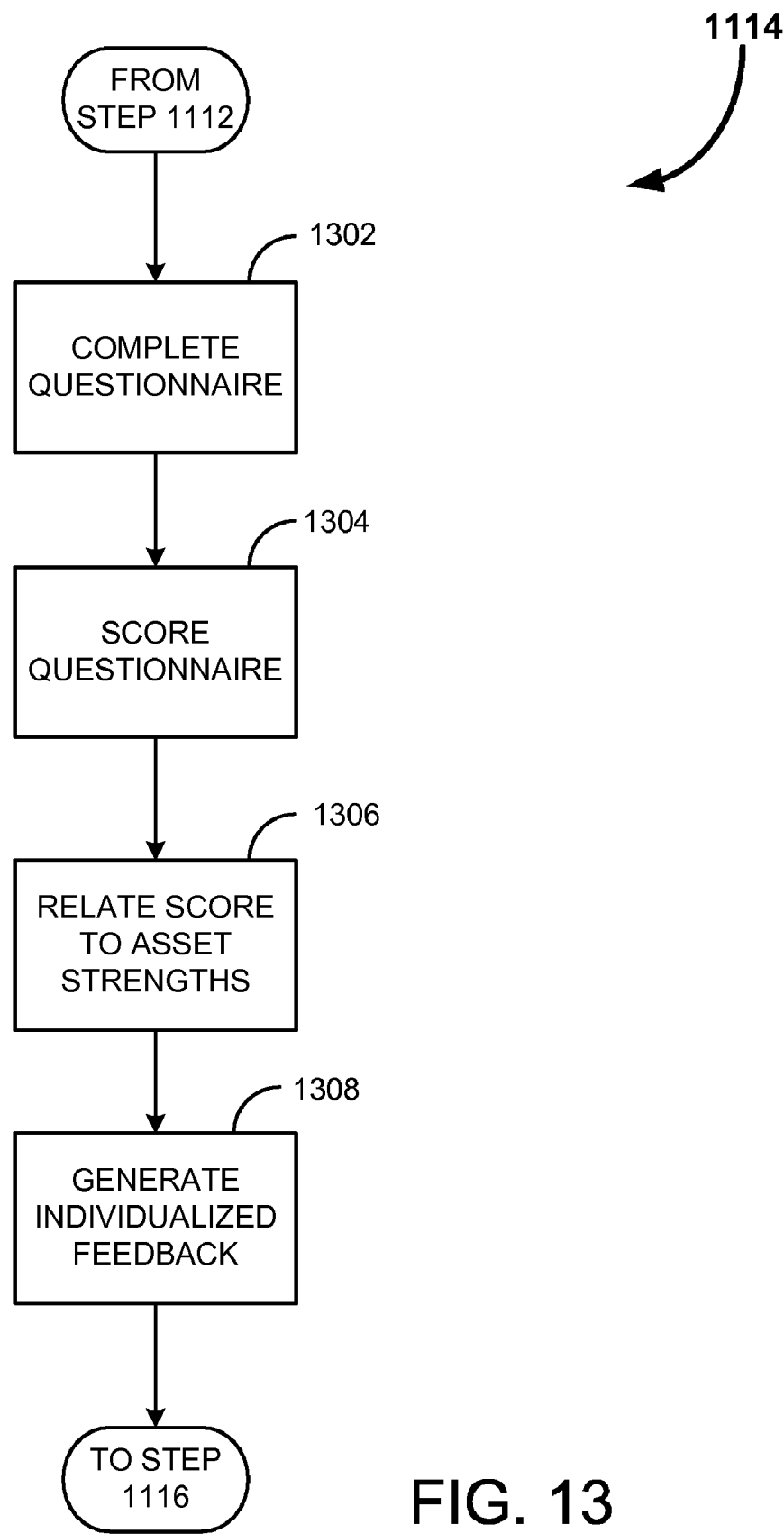
FIG. 13 shows a flow chart illustrating the process for assessing the Three Assets for the turbo evolution machine of FIG. 6.

FIG. 13 shows a flow chart illustrating the process for assessing the Three Assets, shown generally at 1114. The process begins from step 1112 of FIG. 11. The process then progresses to step 1302 where a questionnaire is completed by the individual being assessed. Then, at step 1304, the question answers may be scored. The score may be related to asset strengths at step 1306. In some embodiments, all Three Assets may be scored relative to one another, and on an absolute scale. Customized feedback may be generated at step 1308. Such custom feedback may include asset strengths, and strategies for developing weak assets. The process then concludes by progressing to step 1116 of FIG. 11.

All steps of the Three Assets assessment may be performed manually, or may be computerized. Additionally, other methods of assessment are contemplated by the present invention. Such assessments include tactile and response based tests, objective analysis including observation, vetting of past tests and background, and self introspection.

Figure 14:
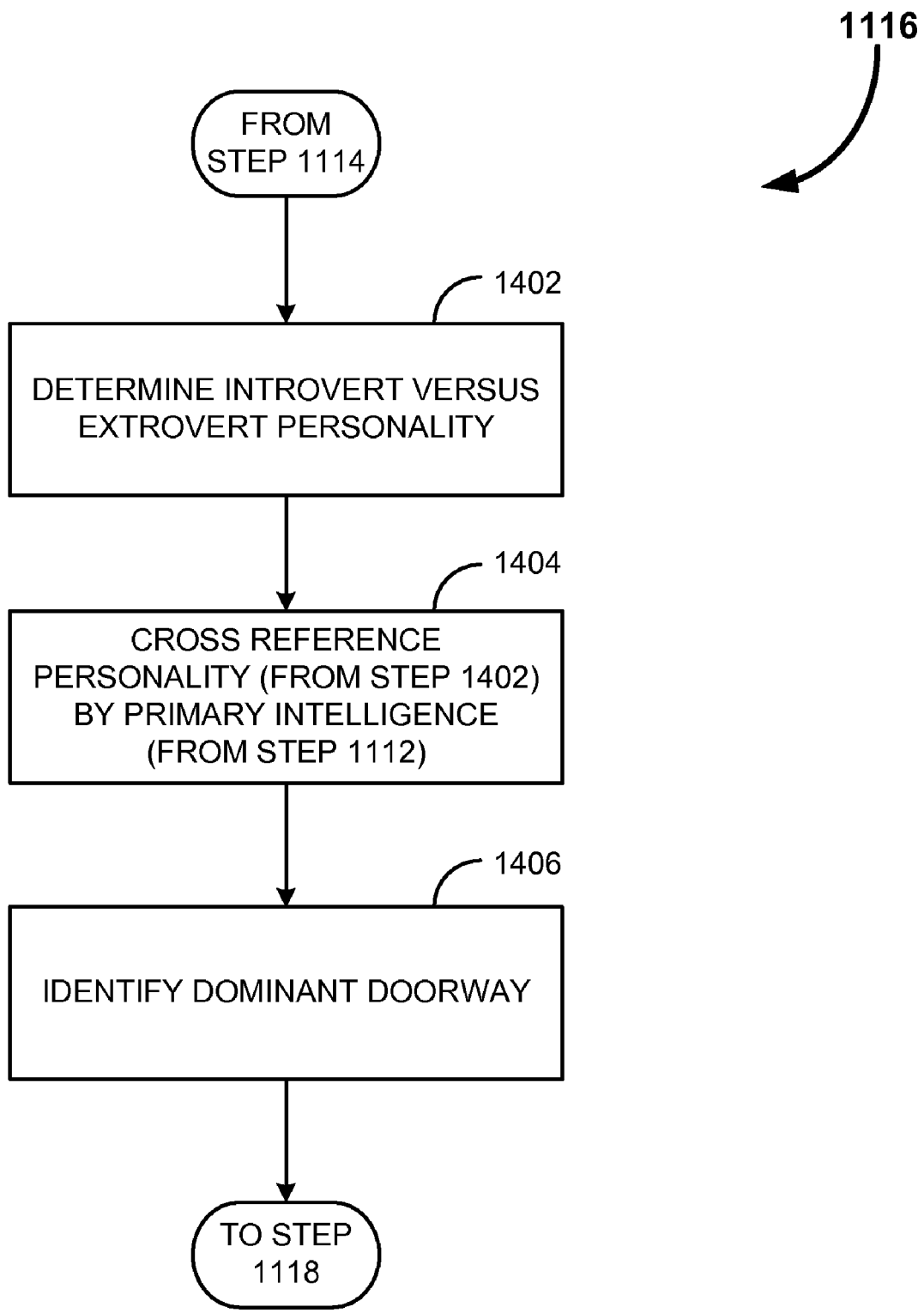
FIG. 14 shows a flow chart illustrating the process for assessing the Nine Doors for the turbo evolution machine of FIG. 6.

FIG. 14 shows a flow chart illustrating the process for assessing the Nine Doors, shown generally at 1116. The process begins from step 1114 of FIG. 11. The process then progresses to step 1402 where the individual being assessed is tested for introversion versus extroversion. Introvert and extrovert personalities are typically readily identifiable, and often the participant may self determine if she is an introvert or extrovert. Alternatively, introversion versus extroversion may be readily identified through facilitator observance or questionnaire. Then, at step 1404, the introversion or extroversion of the participant is cross referenced by primary intelligence type.

In some circumstances, the cross referencing may immediately identify the Nine Doors doorway of the individual. However, in some scenarios there may be ambiguity remaining between two or more Nine Doors Perceptual Orientations. In such circumstances the doorway may be identified at step 1406. This identification may utilize questionnaire assessment, observance by a facilitator, or self assessment by descriptions. The process then concludes by progressing to step 1118 of FIG. 11.

All steps of the Nine Doors assessment may be performed manually, or may be computerized. Additionally, other methods of assessment are contemplated by the present invention. Such assessments include tactile and response based tests, questionnaire tests, objective analysis including observation, vetting of past tests and background, and self introspection.

Figure 15:
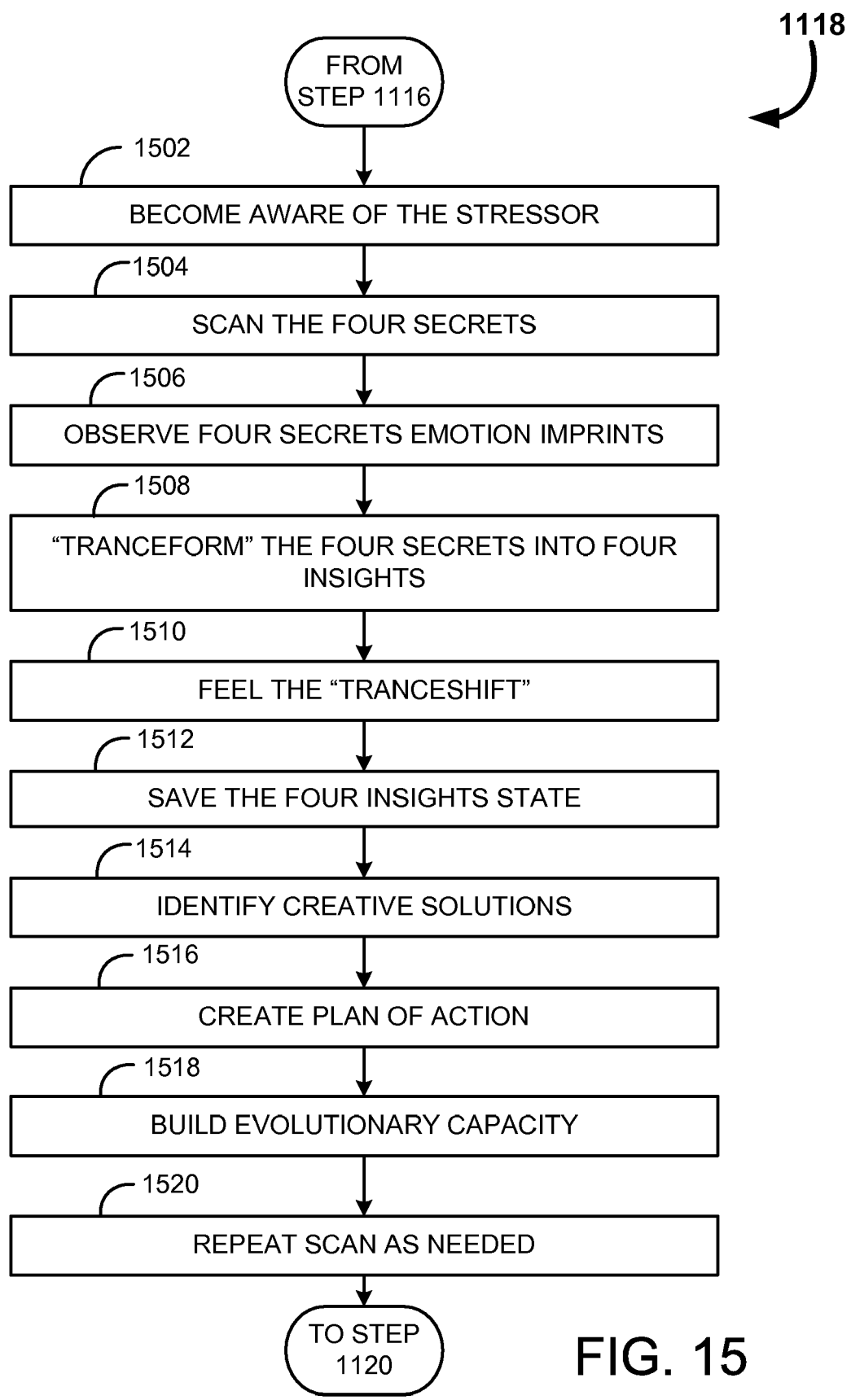
FIG. 15 shows a flow chart illustrating the process for the Four Secrets scan for the turbo evolution machine of FIG. 6.

FIG. 15 shows a flow chart illustrating the process for the Four Secrets scan, shown generally at 1118. The Four Secrets Ten Steps includes at least some of the following ten steps: 1. Become aware of the stressor; 2. Scan the Four Secrets; 3. Observe Four Secrets emotion imprints; 4. "Tranceform" the Four Secrets to the Four Insights; 5. Feel the "tranceshift"; 6. Save the Four Insights state; 7. Identify creative solutions; 8. Create plan of action; 9. Build evolutionary capacity. 10. Repeat scan as needed.

The process begins from step 1116 of FIG. 11. The process then progresses to step 1502 where the challenge is framed in order to become aware of the stressor, or stressors, upon the individual. The Four Secrets are scanned at step 1504. The process then progresses to step, 1506 where the user observes Four Secrets emotion imprints. At step 1508 the Four Secrets are "tranceformed" into four insights. This is done through creating a meditative state whereby the tendency to experience the survival state is considered normal, yet the "tranceshift" from the survival to evolution state is made through adjusting the unconscious mind through using the affirmation process to shift the mind's attention to the evolutionary state which is always available. Then, at step 1510, the individual experiences the evolutionary awareness that accompanies the freeing of one's motivations. Part of this feeling includes reflection upon the experience which accompanies the freeing of ones motivations; discovering and savoring the creativity inherent in tranceformance of secrets into insights. The process then progresses to step 1512 where the Four Insights State is saved for future retrieval on demand. The 'save' is done by affirming and repeating the Four Insights over and over again. This provides the internal emotion and mental state to reinforce the evolutionary trance state. Then, at step 1514, the individual may identify creative solutions to the stressors, and an action plan may be created at step 1516 to implement these solutions. The process then progresses to step 1518 where the individual builds evolutionary capacity. Then, at step 1520 the process is repeated as necessary. The process then concludes by progressing to step 1120 of FIG. 11.

All steps of the Four Secrets scan may be computer facilitated, or some steps may be performed manually. Additionally, other methods of assessment are contemplated by the present invention. Such assessments include tactile and response based tests, questionnaire tests, objective analysis including observation, vetting of past tests and background, and self introspection.

Figure 16:
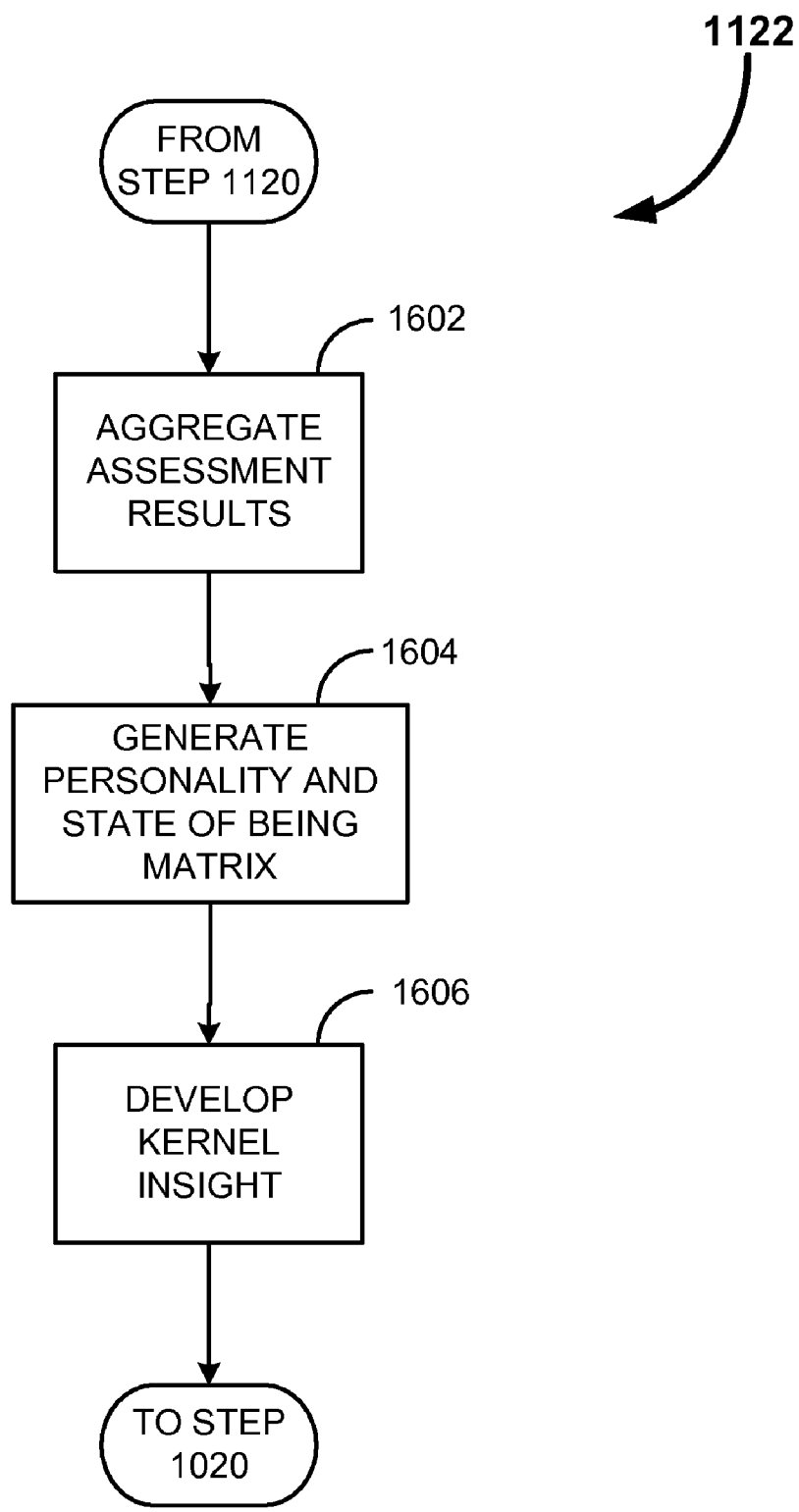
FIG. 16 shows a flow chart illustrating the process for generating an assessment report for the turbo evolution machine of FIG. 6.

FIG. 16 shows a flow chart illustrating the process for generating an assessment report, shown generally at 1122. The process begins from step 1120 of FIG. 11. The process then progresses to step 1602 where the assessment results are collected from each assessor. The results may be aggregated as raw data. The process then progresses to step 1604 where the raw data may be processed into a personality matrix and state of being assessment. In some embodiments, the raw aggregated data may be weighted in the generation of the matrix and assessment. Additionally, inferences and further data may be generated by combining results from the separate assessors. The process then progresses to step 1606 where the personality matrix may be utilized to develop a kernel insight report. The format of such a report may, in some embodiments, be configured depending on the intended downstream application. The process then concludes by progressing to step 1020 of FIG. 10. It should be noted that all steps of the assessment reporting may be performed manually, or may be computerized.

Figure 17:
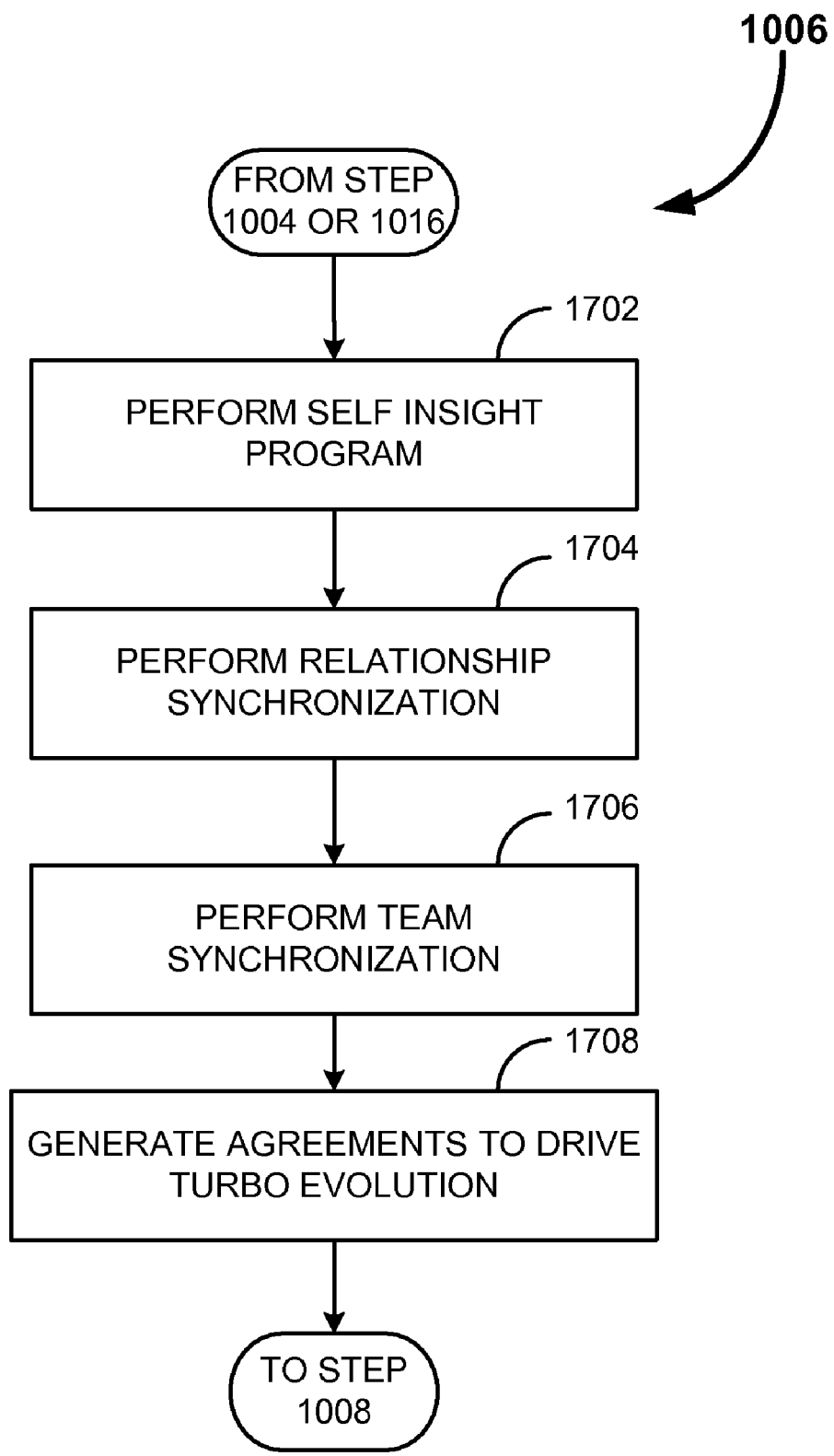
FIG. 17 shows a flow chart illustrating the process for synchronization for the turbo evolution machine of FIG. 6.

FIG. 17 shows a flow chart illustrating the process for Relationship Synchronization, shown generally at 1006. The process begins from step 1004 or step 1016 of FIG. 10. The process then progresses to step 1702 where the Self Insight Program is performed. The Self Insight Program, as previously discussed, takes individuals that have engaged in seminars of self assessment programs. These individuals are processed such that they advance to an evolved state of self-awareness. Self-awareness of the participants is integral to the proper functioning of the synchronization process.

The process then progresses to step 1704 where Relationship Synchronization is performed. Then, at step 1706, team synchronization is performed. The agreements generated at the dyad relationship and team synchronization may be aggregated at step 1708 to generate complete sets of agreements. These agreements function to drive the both individual and group evolution. The process then concludes by progressing to step 1008 of FIG. 10. It should be noted that all steps of the synchronization may be performed manually in person, or may be done through a computer based interface including group forums.

Figure 18:
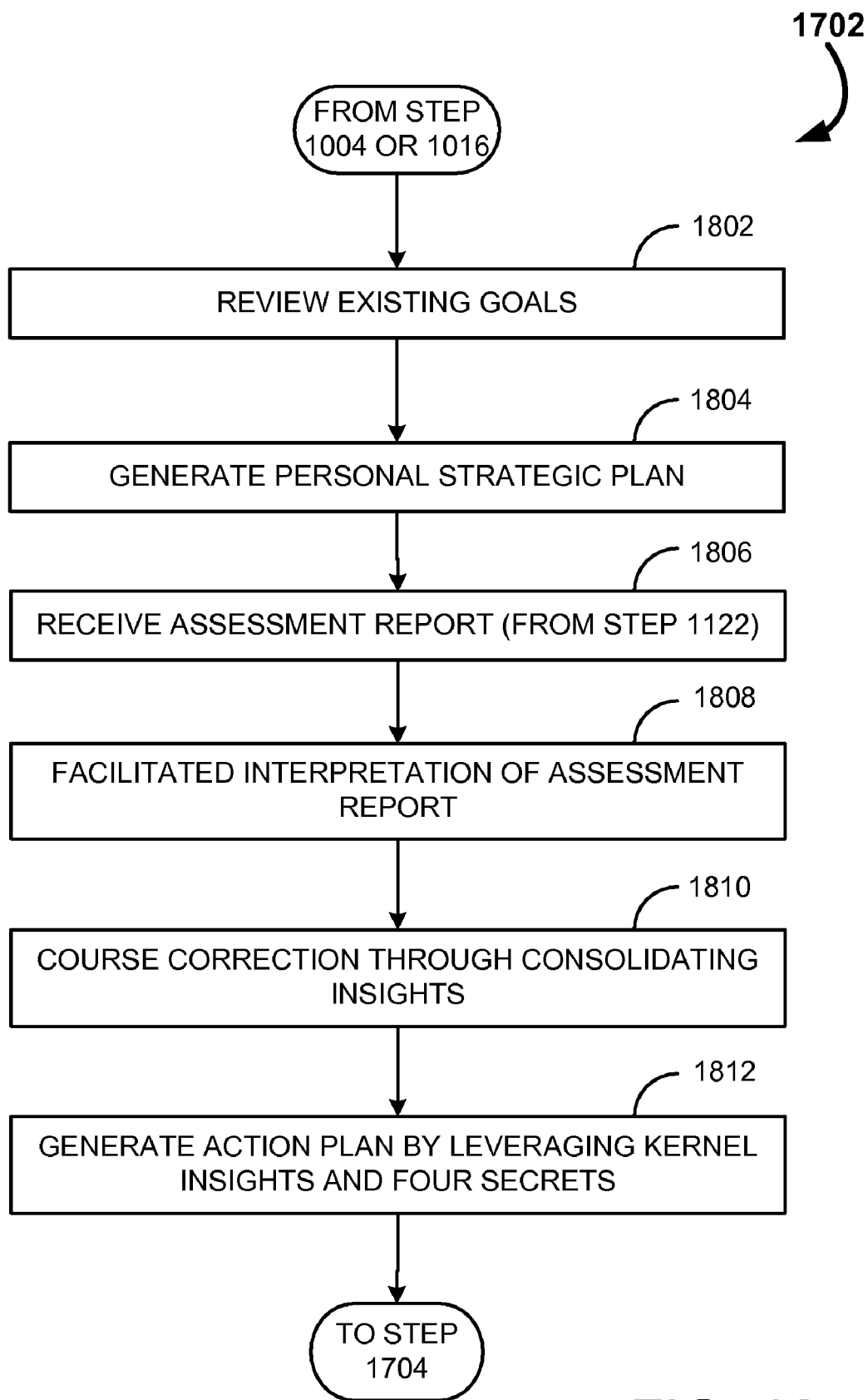
FIG. 18 shows a flow chart illustrating the process for performing the Self Insight Program for the turbo evolution machine of FIG. 6.

FIG. 18 shows a flow chart illustrating the process for performing the Self Insight Program, shown generally at 1702. The process begins from step 1004 or step 1016 of FIG. 10. The process then progresses to step 1802 where the goals and existing Self Insights of the individual are reviewed. A personal strategic plan may be generated at step 1804. Review of personal goals and generation of a strategic plan may include the input of a facilitator. The process then progresses to step 1806 where the assessment report, or kernel insight, developed at step 1122 of FIG. 11, is received. If the assessment was not performed, such as when an individual arrives from a seminar, informal assessments, such as those generated at seminars and events may be received in lieu of the kernel insight. It is possible for a turbo evolution facilitator to generate a kernel insight one page personality resume by interviewing the individual who has not completed the Self Insight Program. However, that individual will require either group or 1:1 training in the Nine Doors system so that he/she can identify her doorway. The kernel insight requires identifying the Nine Doors Enneagram doorway of all participants.

Then, at step 1808, the kernel insight is interpreted with assistance from a facilitator. The facilitator may consolidate insights with the individual, and that individual's course may be corrected at step 1810. An action plan may be generated to enable the course correction, at step 1812. Such an action plan may utilize the kernel insights and the Four Secrets scan. The process then concludes by progressing to step 1704 of FIG. 17. It should be noted that the facilitator of the Self Insight Program may be a coach, trainer, a software package or any other facilitating device.

Figure 19:
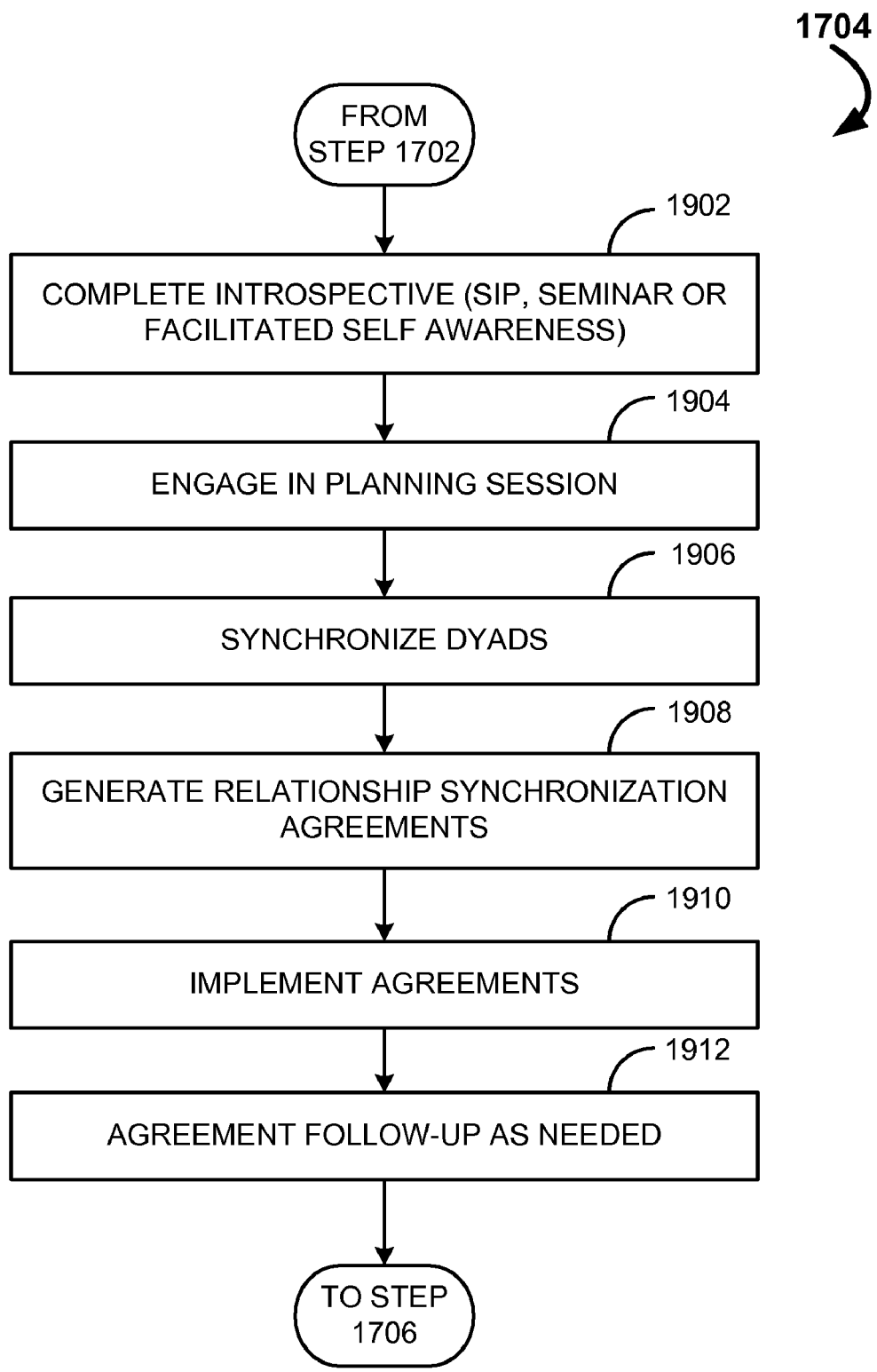
FIG. 19 shows a flow chart illustrating the process for Relationship Synchronization for the turbo evolution machine of FIG. 6.

FIG. 19 shows a flow chart illustrating the process for dyad Relationship Synchronization shown generally at 1704. The process begins from step 1702 of FIG. 17. The process then progresses to step 1902 where two or more individuals who have completed an introspection are collected. An introspective may be any of the foregoing self-awareness enhancing tools, including but not limited to seminars, Self Insight Program or facilitated self-awareness. Then, at step 1904, the participating individuals may engage in a planning session. This planning session may be facilitated. The process then progresses to step 1906 where the dyads are synchronized. During dyad synchronization each pair of individuals reviews her kernel insight with her partner. This acts as a non-threatening method of allowing for criticism and constructive dialog. The dyad partners are also able to compare strategies of cross communication, and aid in understanding the other partner's actions and beliefs. From the dyad synchronization, agreements as to future behavior may be generated at step 1908. Then, at step 1910, these agreements may be implemented. Agreement implementation may occur over a prolonged period of time. As needed, the dyad partners may reconvene, often in the presence of a facilitator, to reaffirm and discuss agreement follow up. Agreement follow-up occurs at step 1912. The process then concludes by progressing to step 1706 of FIG. 17. It should be noted that the facilitator of the Self Insight Program may be a coach, trainer, a software package or any other facilitating device.

Figure 20:
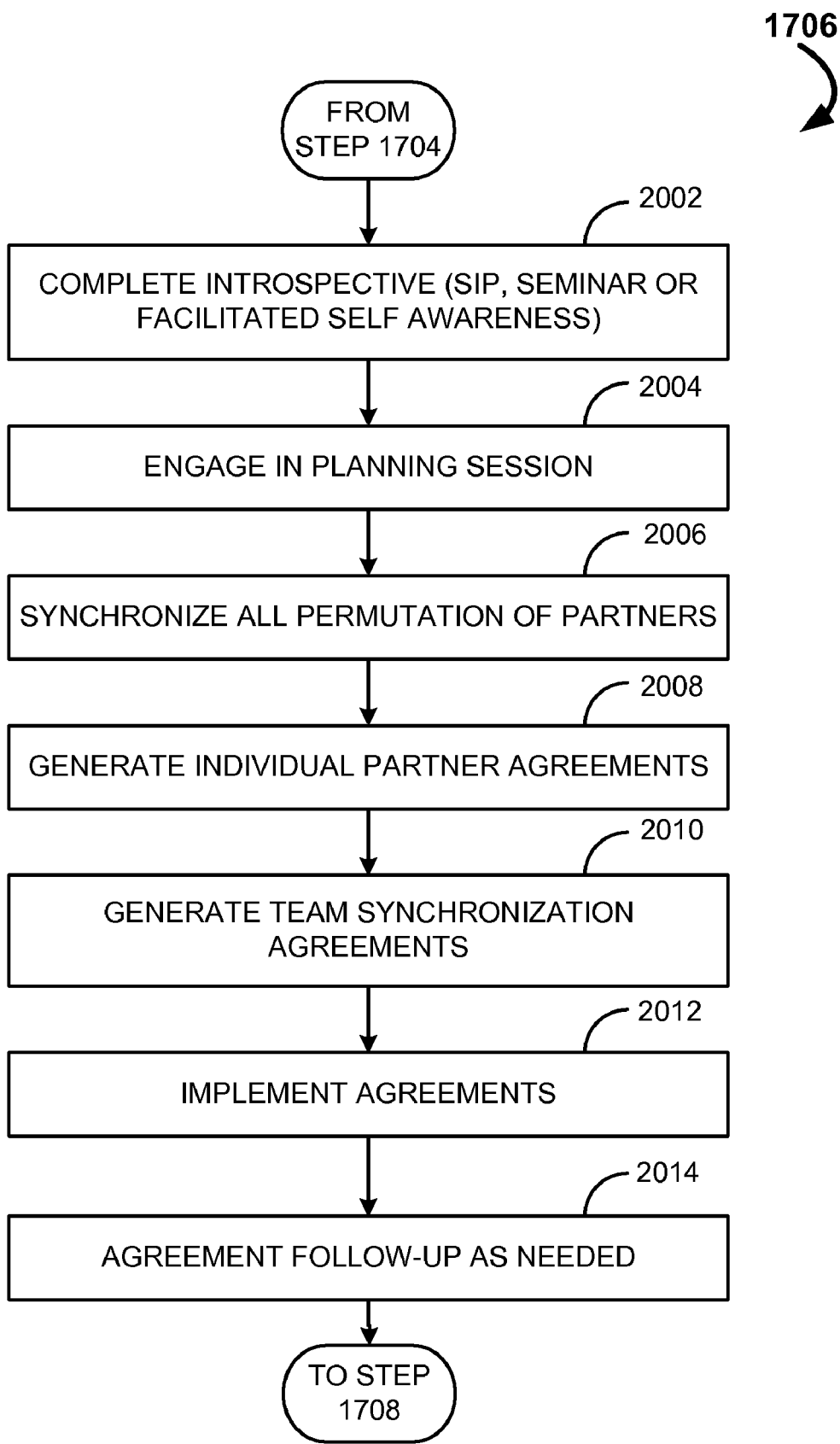
FIG. 20 shows a flow chart illustrating the process for team synchronization for the turbo evolution machine of FIG. 6.

FIG. 20 shows a flow chart illustrating the process for team synchronization, shown generally at 1706. The process begins from step 1704 of FIG. 17. The process then progresses to step 2002 where three or more individuals who have completed an introspection are collected. As noted above, an introspective may be any of the foregoing self-awareness enhancing tools, including but not limited to seminars, Self Insight Program or facilitated self-awareness. Then, at step 2004, the participating individuals may engage in a planning session. This planning session may be facilitated. The process then progresses to step 2006 where each permutation of team members are synchronized. During team synchronization each pair of individuals reviews her kernel insight with her partner. The individuals ultimately pair off with every other participating individual. Often each partner synchronization, for the team synchronization, is observed by the remaining participants, thereby limiting parallel processing of individual partner synchronization. As a result, this team synchronization process must be highly coordinated by the facilitator. Also, with an increase in participants, the partner synchronization exponentially increases in time length. The partner synchronizations act as non-threatening forums for allowing criticism and constructive dialog. The partners are also able to compare strategies of cross communication, and aid in understanding the other partner's actions and beliefs.

From the partner synchronization, agreements as to future behavior may be generated at step 2008. Further, at step 2010, team synchronization agreements may be generated. Team agreements are universal agreements applicable to every member of the team, or granted by some subset of the participants to the entire team. Then, at step 2012, all agreements may be implemented. Agreement implementation may occur over a prolonged period of time. As needed, the dyad partners, or the entire team, may reconvene, often in the presence of a facilitator, to reaffirm and discuss agreement follow up. Agreement follow-up occurs at step 2014. The process then concludes by progressing to step 1708 of FIG. 17. It should be noted that the facilitator of the Self Insight Program may be a coach, trainer, a software package or any other facilitating device.

Figure 21:
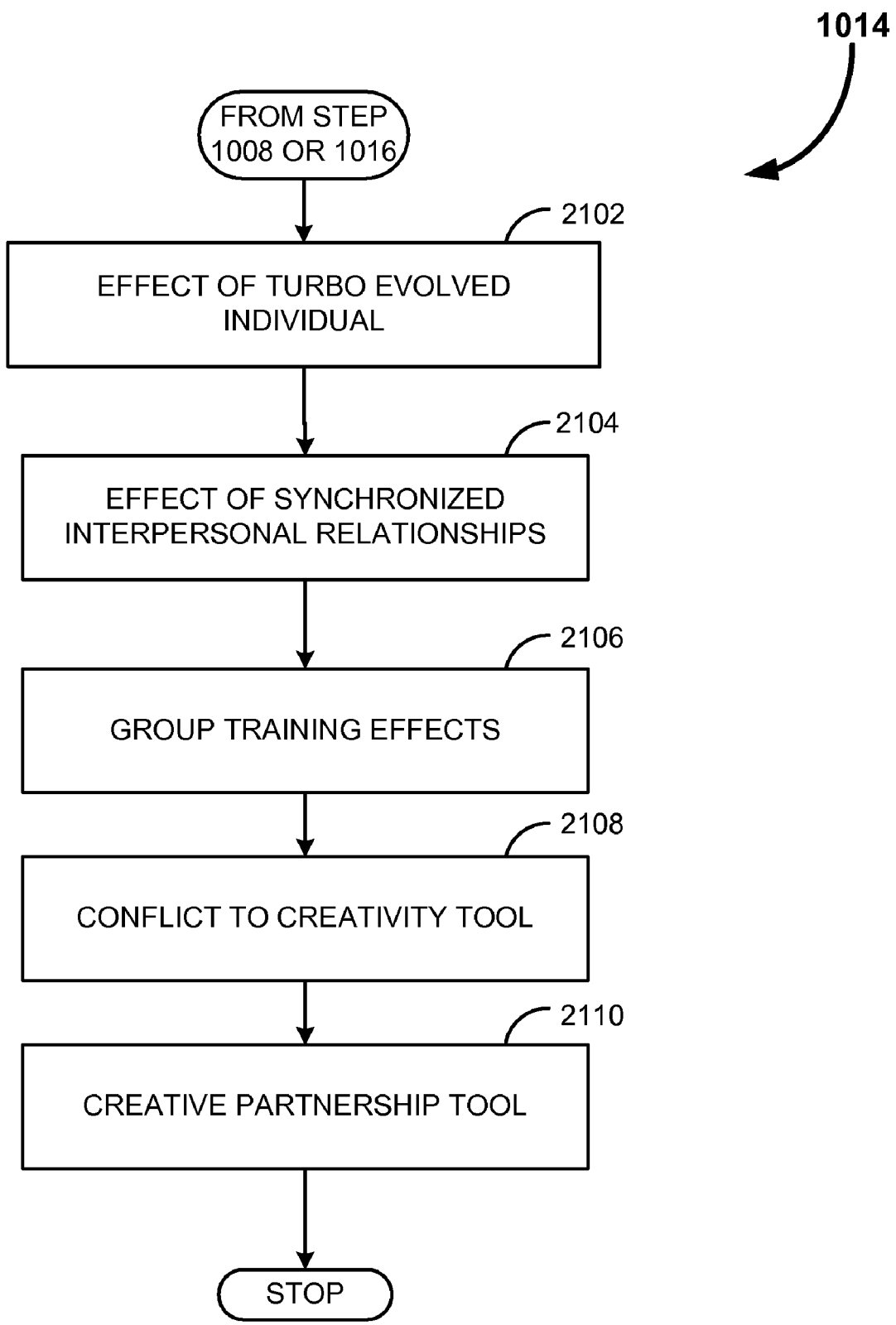
FIG. 21 shows a flow chart illustrating the process for cultural turbo evolution for the turbo evolution machine of FIG. 6.

FIG. 21 shows a flow chart illustrating the process for cultural turbo evolution, shown generally at 1014. The process begins from step 1008 or step 1016 of FIG. 10. Culture, as used in the present application, is intended to refer to any collection of interacting humans. Thus, while much of the discussion contained herein refers to business groups and the culture associated with these businesses, it should be understood that culture is intended to apply to social groups, teams, families, marriages, partnerships, or any other human collection. The process then progresses to step 2102 where the turbo evolved individual has an effect upon the culture. Even if the only change to the group is that one individual has engaged in the Turbo Evolution Machine 600, and as a result has achieved a turbo evolved state, this has a profound impact upon the group culture. This individual performs on an accelerated level, motivating and inspiring her peers. Interpersonal friction between the individual and peers is reduced, since the turbo evolved individual is capable of cross intelligence communication along with a range of other turbo evolution tools. Overall group efficiency will increase, particularly if the turbo evolved individual is in a position of leadership within the group. The norm within the human condition is for those who are turbo evolved to assume a range of leadership roles in human society. This is an ideal circumstance since via their lifestyle examples those leaders will inspire others to turbo evolve.

The process then progresses to step 2104, where synchronization positively impacts the group culture. If more than one group member has attained some level of evolution, and they have engaged in a Relationship Synchronization, interpersonal friction is greatly diminished, if not eliminated. This greatly increases group efficiency. Further, if the entire group has engaged in some manner of training, such as from a turbo evolution seminar or other event, this impact on the culture may be realized at step 2106.

At step 2108, conflict to creativity tool effects are applied. Conflict to Creativity 112, as previously noted, is a group tool to aid in the resolution of conflicts. Likewise, at step 2110, creative partnership tool effects are applied. Creative Partnership 110, as previously noted, is also a group tool to aid in the resolution of conflicts. The process then ends.

IV. System and Methods for Organizational Evolution

Figure 22:
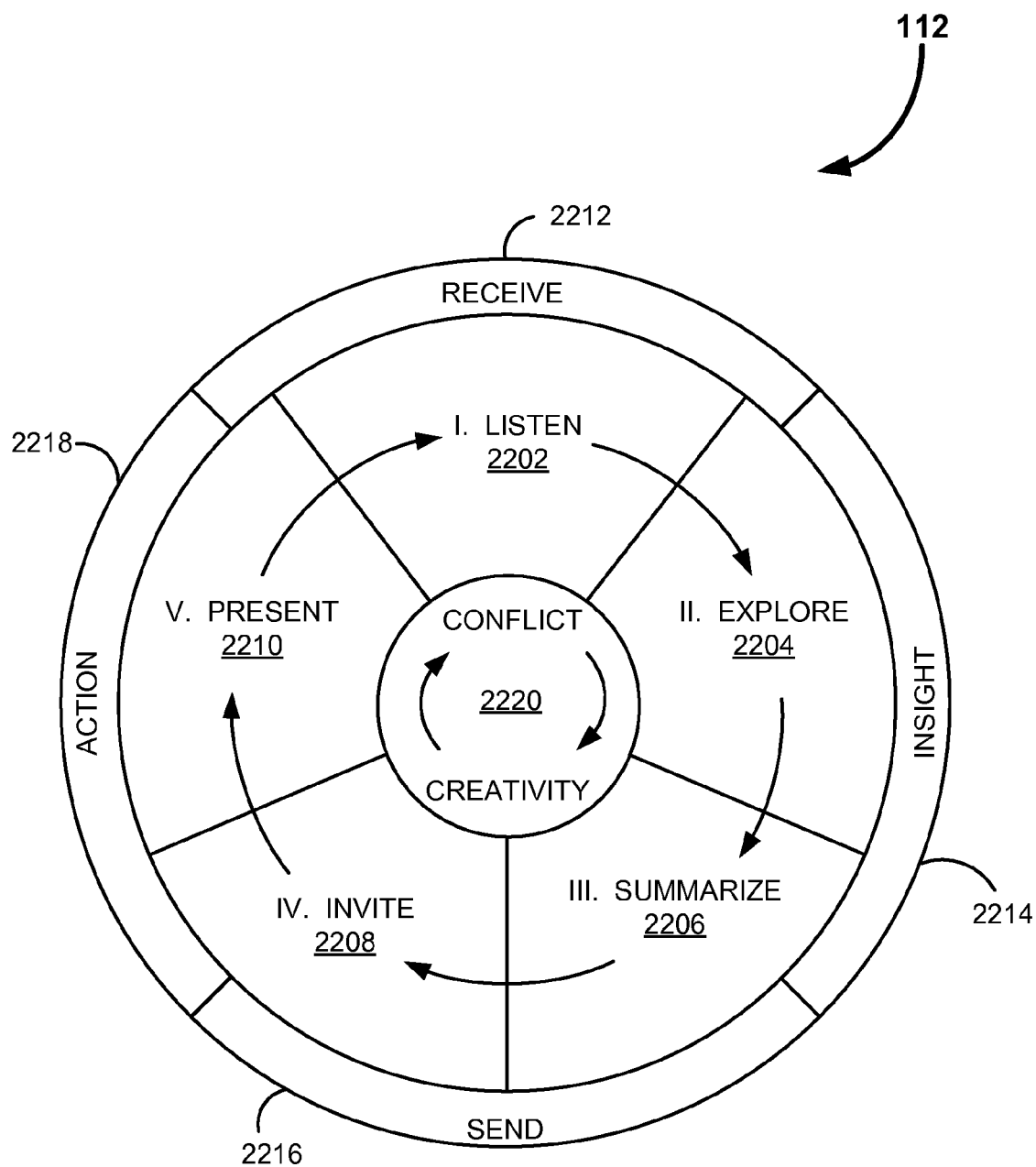
FIG. 22 shows an exemplary illustration of conflict to creativity in accordance with the turbo evolution machine toolkit of FIG. 2A.

FIG. 22 shows an exemplary illustration of Conflict to Creativity 112 in accordance with the Turbo Evolution Toolkit 100. Conflict to Creativity 112 is a cyclical process for resolving interpersonal conflicts and impasses. There are four modalities, or stances, that the individual utilizing Conflict to Creativity 112 takes during the process. These include: Receive 2212 mode, Insight 2214 mode, Send 2216 mode and Action 2218 mode. Each step of the Conflict to Creativity 112 exists in one or more of these modes. For example, the individual begins at a Listen 2202 module. Listen 2202 may also be referred to as step I of Conflict to Creativity 112. Listen 2202 exists in the Receive 2212 mode. Step II, Explore 2204, exists primarily in the Insight 2214 mode, but overlaps somewhat in the Receive 2212 mode. Step III, Summarize 2206 exists in the Insight 2214 and Send 2216 modes. Step IV, Invite 2208 exists in the Send 2216 and Action 2218 modes. Step V, Present 2210 exists predominantly in the Action 2218 mode, but also has some elements of a Receive 2212 mode.

It should be noted that the Conflict to Creativity 112 is cyclical, thus after completion of the five steps it may be repeated. This is the case because conflict and creativity are themselves in a cyclical existence, as may be seen at Conflict-Creativity Cycle 2220.

Figure 23A:
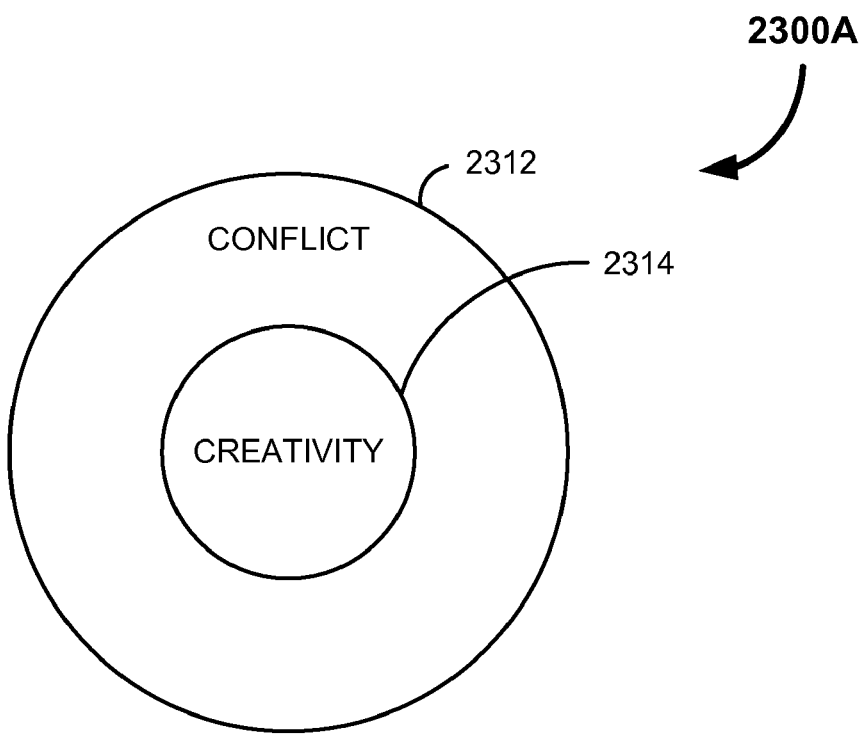
FIGS. 23A and 23B show exemplary illustrations of the relationship between conflict and creativity in accordance with some embodiment of the present invention.
Figure 23B:
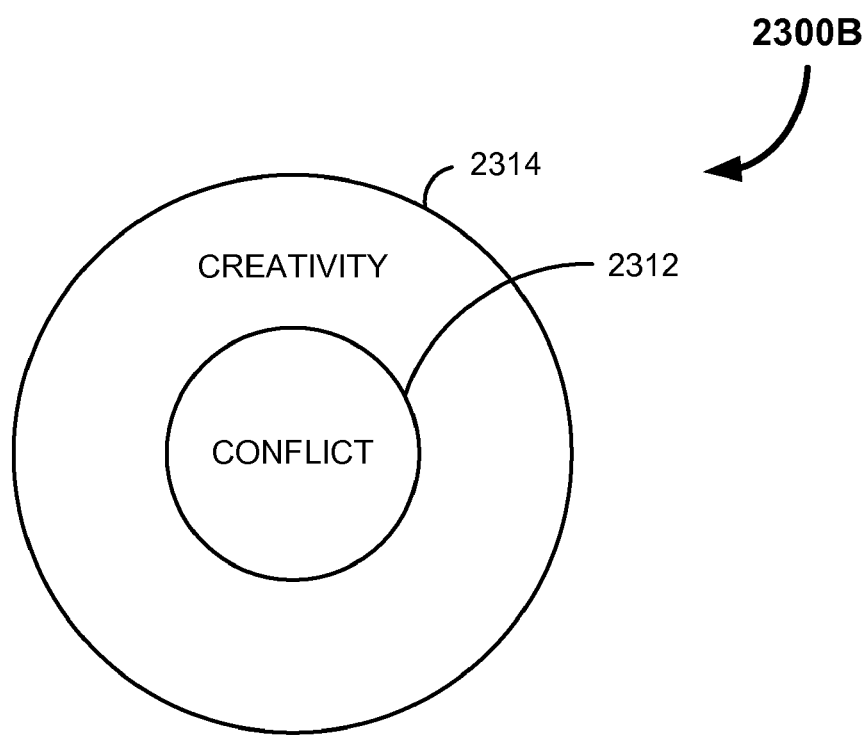

FIGS. 23A and 23B show exemplary illustrations of the relationship between conflict and creativity, shown generally at 2300A and 2300B, respectively. In FIG. 23A, Conflict 2312 may be seen. However, within every Conflict 2312 exists Creativity 2314. The key to Conflict to Creativity 112 is to draw out the Creativity 2314 in every Conflict 2312. It is just as important to recognize that at the root of all Creativity 2314, is Conflict 2312, as may be seen in FIG. 23B. This dichotomy is what leads to the cyclical transfer from Creativity 2314 to Conflict 2312 and back again. It also delineates the importance of the Conflict to Creativity 112, since creativity, a highly advantageous state, will naturally shift to conflict. Conflict to Creativity 112 enables individuals to bring about the creativity and minimize conflict states.

Figure 24:
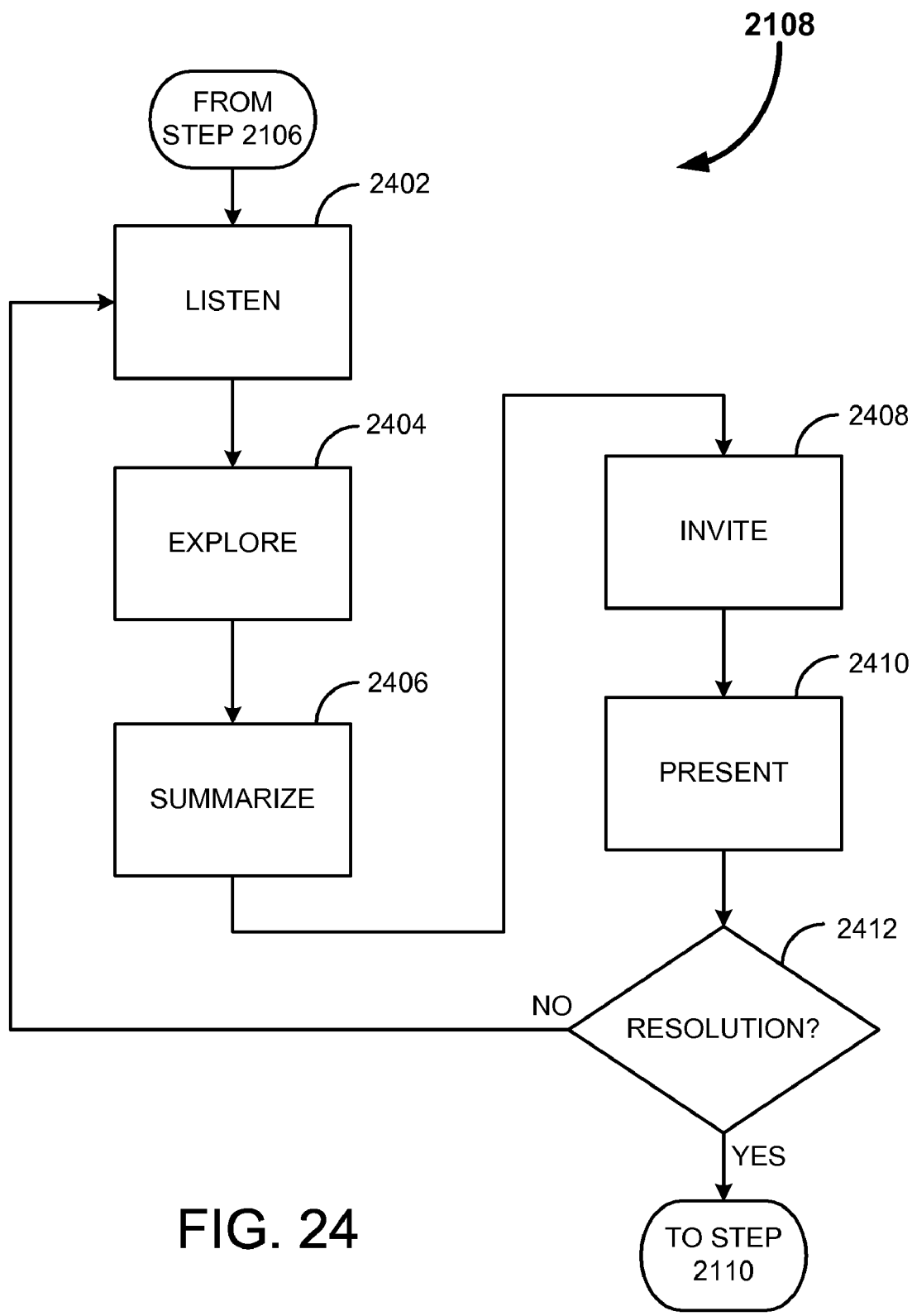
FIG. 24 shows a flow chart illustrating the process for conflict to creativity for the turbo evolution machine of FIG. 6.

FIG. 24 shows a flow chart illustrating the process for conflict to creativity, shown generally at 2108. The process begins from step 2106 of FIG. 21. It is also possible for the conflict to creativity to be utilized separately from other aspects of the Turbo Evolution Machine 600. Thus, Conflict to Creativity 112 may be an autonomous tool for interpersonal conflict management.

The process then progresses to step 2402 where the active individual listens to those she is in conflict with. Listening is essential to conflict resolution, because otherwise information may not be freely exchanged. Then, at step 2404, the information obtained through the listening process may be explored. This exploration may be an internal process for the active individual, or may be in dialog format with the other party. Exploration ensured that the information presented by the conflicting other party is truly considered and understood. This provides insight into the other party's position and motivations. Then, at step 2406, the active participant may summarize the conflicting party's views. This allows two things to occur 1) any misunderstanding of views may be resolved, and 2) the conflicting party is able to recognize that the active individual is being sincere and engaging in good faith o resolve the problem. Summarization, thus, acts to deflate the conflict, where the natural tendency in conflict is one of escalation.

At step 2408, the active participant invites the conflicting party to engage in the discussion with additional input. Again, invitation tends to deflate the conflict, and may lead to useful resolution points. The process then progresses to step 2410 where the active individual presents her viewpoint and possible resolutions to the conflict. Ideally, the conflict has been deflated to an extent that the conflicting party is responsive to the presentation. If so, the parties may engage in a more creative discussion and ultimately resolve the issue. The process then progresses to step 2414 where an inquiry is made as to whether as to whether a resolution has been made. As previously discussed, a resolution may be moving from a state of conflict to that of creativity, or if the active individual feels that no such resolution is forthcoming it may include aversion of the conflict or "giving in" dependent upon needs and circumstances. If no resolution is reached at step 2412, the process then progresses to step 2402, and the entire process may be repeated. Else, if a resolution has been reached the process then concludes by progressing to step 2110 of FIG. 21.

Figure 25:
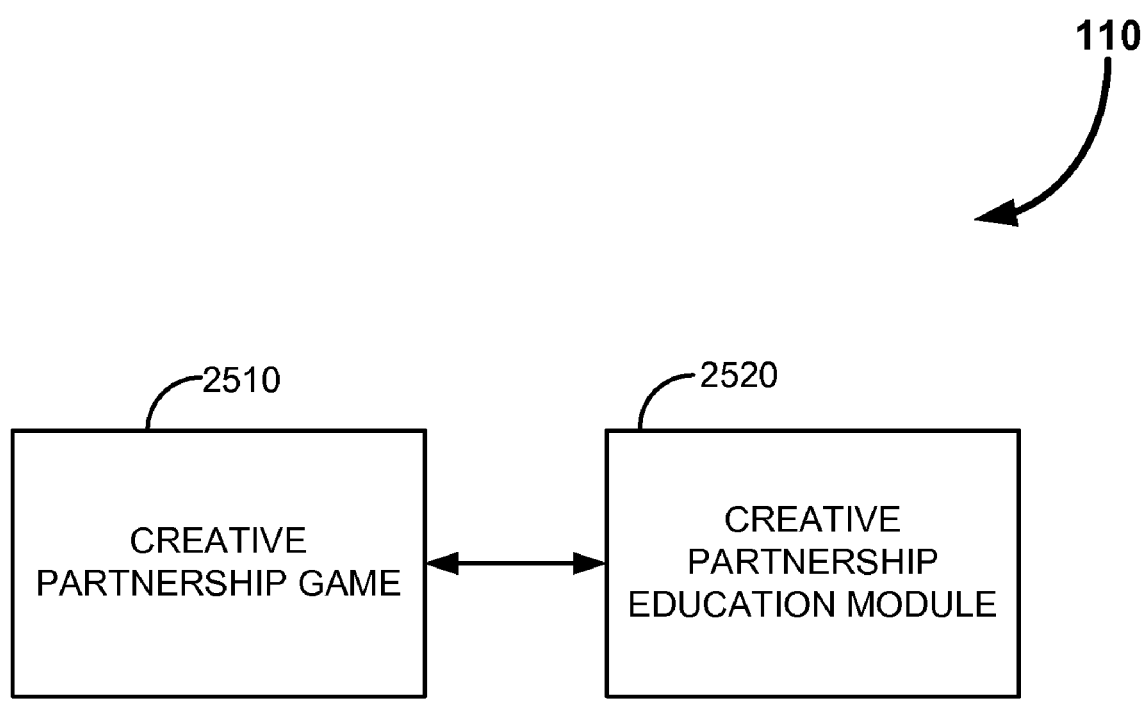
FIG. 25 shows an exemplary illustration of creative partnership in accordance with the turbo evolution machine toolkit of FIG. 2A.

FIG. 25 shows an exemplary illustration of Creative Partnership 110 in accordance with the Turbo Evolution Toolkit 100. Here, a Creative Partnership Game 2510 may be seen coupled to the Creative Partnership Education Module 2520. Typically, some training in creative partnership is provided at the Creative Partnership Education Module 2520. The Creative Partnership Game 2510 may then be utilized to hone the creative partnership skills.

The 2510 may include a board game, a computerized game, or role playing sessions. The Creative Partnership 110 relies upon four principles which aid in group dynamics. These principles include 1) "we are in this together", 2) "your success is my success", 3) "an evolving foundation of mutual trust" and 4) "creativity requires a wide perspective". The purpose of the Creative Partnership 110 is to apply the foregoing four principles to generate action plans which balance "being" and "doing". By achieving this balance and applying the four principles, potentially conflict ridden scenarios may be easily navigated.

Figure 26:
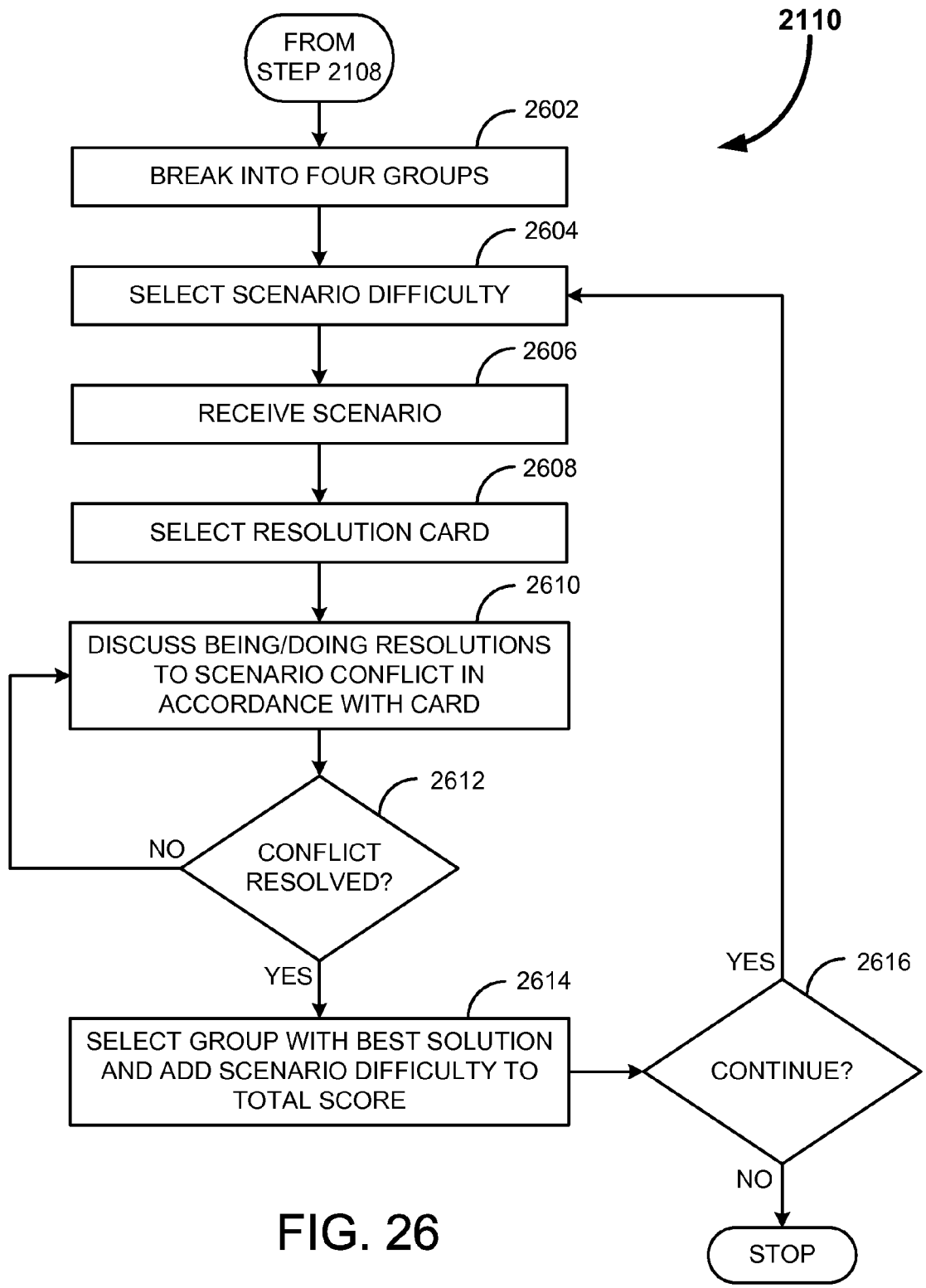
FIG. 26 shows a flow chart illustrating the process for creative partnership for the turbo evolution machine of FIG. 6.

FIG. 26 shows a flow chart illustrating the process for creative partnership shown generally at 2110. The process begins from step 2108 of FIG. 21. It is also possible for the creative partnership to be utilized separately from other aspects of the Turbo Evolution Machine 600. Thus, Creative Partnership 110 may be an autonomous tool for group scenario approach.

The process then progresses to step 2602, where the participants are broken into four groups. Each group corresponds to one of the four principles described above. Resolution cards may be provided to each group corresponding to the principle the group is associated with. A scenario is selected at step 2604. Scenarios include a difficulty rating. In some embodiments, scenarios may be customized to the business the participants are engaged in. Likewise, in some embodiments, the scenarios may be configurable to achieve any particular purpose.

The scenario is then received at step 2606. Then, at step 2608, each group selects a resolution card which the group feels most efficiently addresses a resolution to the scenario. The groups discuss balanced being and doing resolutions to the scenario in accordance to the selected card at step 2610. The process then progresses to step 2612 where an inquiry is made as to whether the conflict has been resolved. If the conflict is not satisfactorily resolved the process then progresses to step 2610 where further discussion of being and doing resolutions are performed.

Else, if the group feels that the conflict has an adequate resolution at step 2612, the process then progresses to step 2614 where the resolutions are presented to all groups, and the groups collectively choose the best of the presented scenario resolutions. The difficulty score for the scenario may then be added to a total score. The objective of the exercise is for all participants to generate scenario resolutions through open and active discussion and generate the most points. Points belong to all participants of the exercise, thereby fostering a collective approach rather than an adversarial approach.

The process then progresses to step 2616 where an inquiry is made as to whether to continue the exercise. If continuation is desired, the process then progresses to step 2604 where a new scenario is selected. Else, if continuation is not desired, the process then ends.

Figure 27:
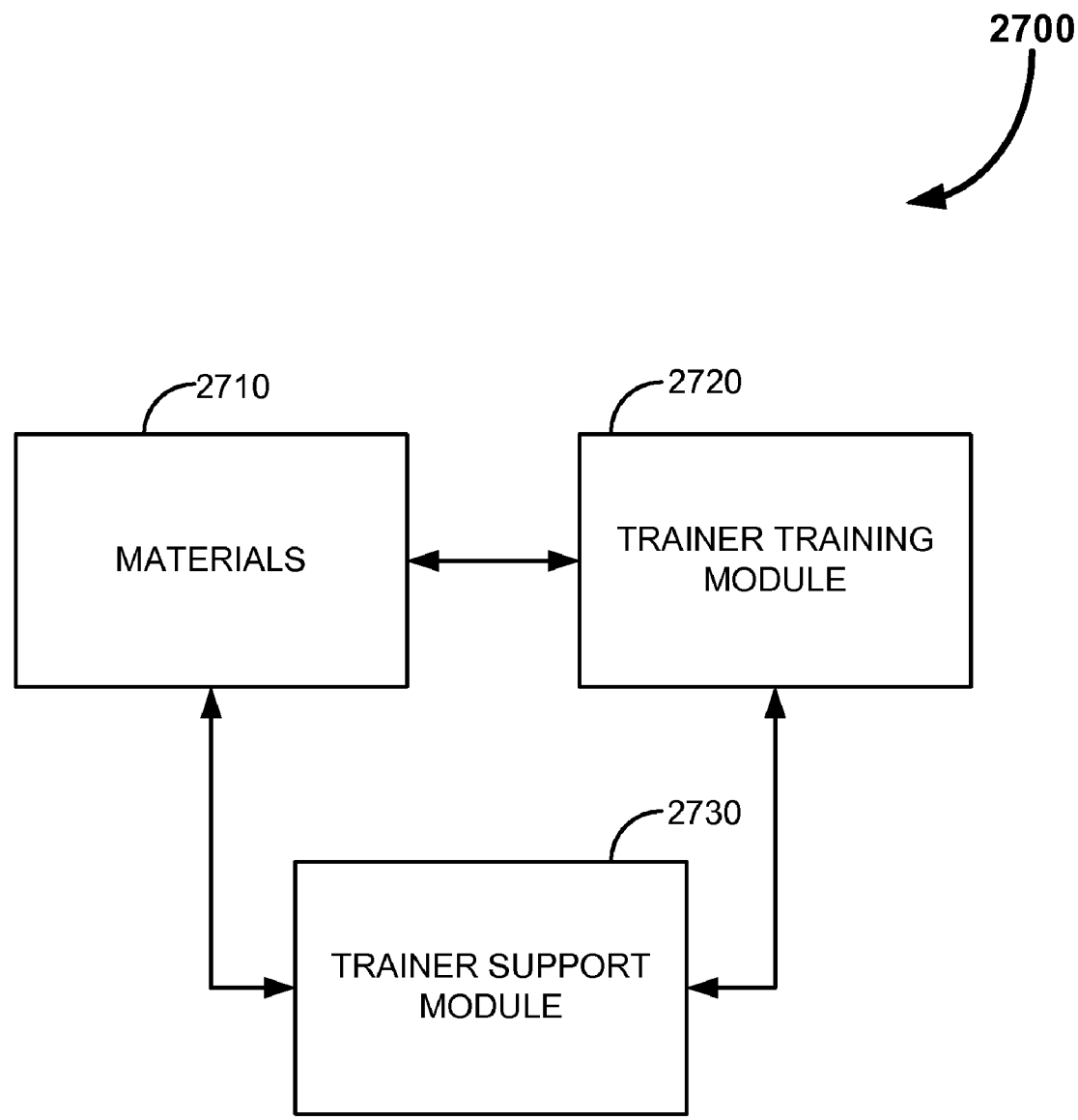
FIG. 27 shows an exemplary block diagram of the train the trainer system in accordance with some embodiment of the present invention.

FIG. 27 shows an exemplary block diagram of the Train the Trainer System 2700 accordance with some embodiment of the present invention. The Train the Trainer System 2700 includes Materials 2710, a Trainer Training Module 2720 and a Trainer Support Module 2730. The Trainer Training Module 2720 typically utilized a facilitator. The turbo evolution machine is highly defined and integrated with a foundation of underlying logic and systems that all exude from the Four Secrets system. As a result, the machine can be taught to others outside of the Trimergence organization. All systems of the machine are teachable, both for individuals and groups. The approach is that the machine is viral in nature and can be spread through both the impact and the ability to teach the system once learned. The train the trainer system is a highly documented teaching model that can be used in business or any other type of human interaction. The trainers are those who are able to model turbo evolution themselves as best possible.

Trainers are skilled in the turbo evolution machine and have taken seminars or had other experiences including the 1:1 self-awareness upgrade processes. The machine system allows both for the logic of training, as well as the modules for the trainers to use such as videos, books, etc. Trimergence provides support for both the trainers and the organizations in order to help implement the impact of the machine to the greatest degree.

Materials 2710 may be provided at the outset of the train the trainer process, and may be continually provided, as the Materials 2710 is used over time. The Trainer Support Module 2730 may include support groups, hotlines, continued meetings, real-time question response, newsletters or any additional support to the trainers.

Figure 28:
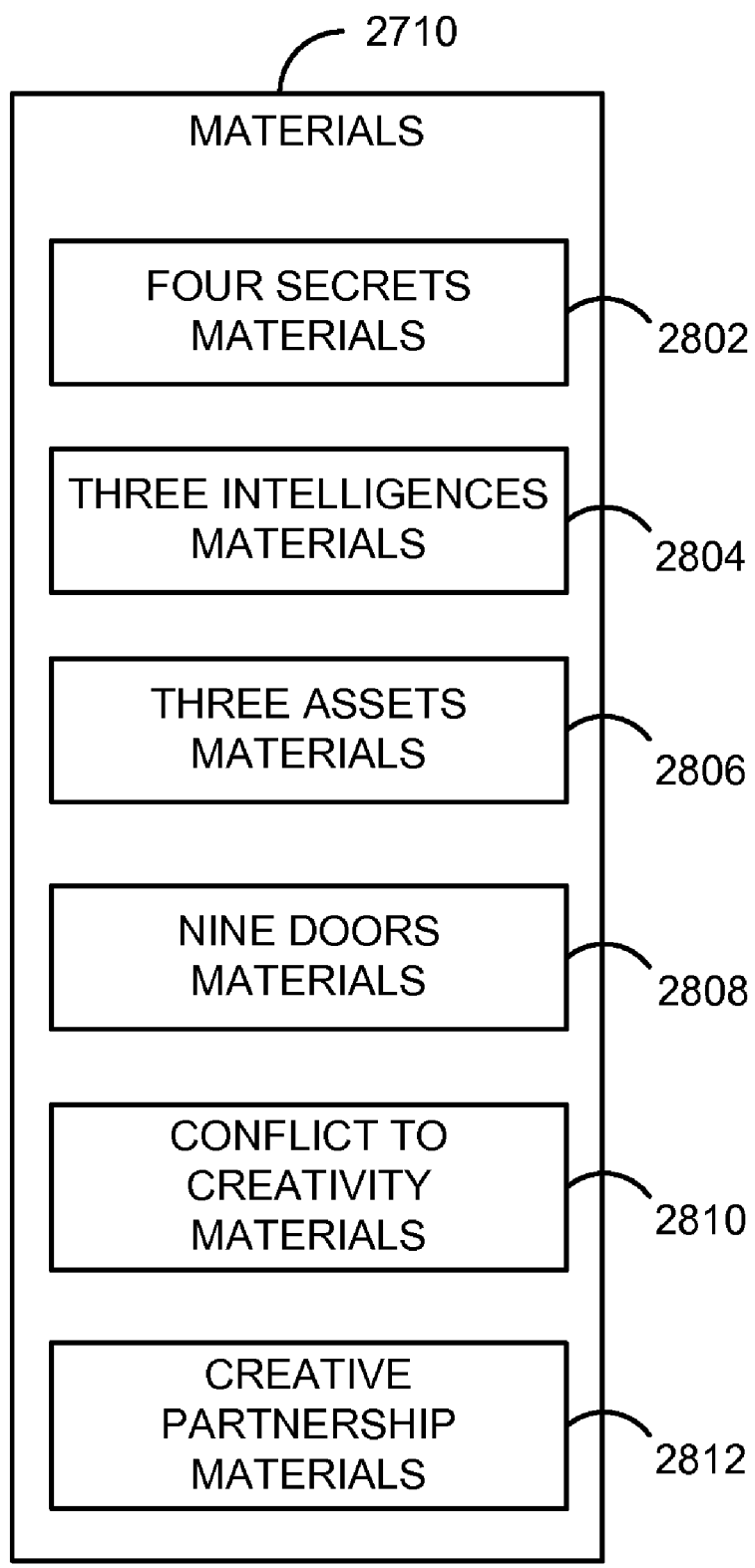
FIG. 28 shows an exemplary block diagram of the materials for the train the trainer system of FIG. 27.

FIG. 28 shows an exemplary block diagram of the Materials 2710 for the Train the Trainer System 2700. The Materials 2710 may include, but is not limited to, at least one of Four Secrets Materials 2802, Three Intelligences Materials 2804, Three Assets Materials 2806, Nine Doors Materials 2808, Conflict to Creativity Materials 2810, and Creative Partnership Materials 2812. The machine may also include a self-awareness train the trainer module so that trainers are able to facilitate self-awareness upgrades without the involvement of Trimergence trainers. In some embodiments, these Materials 2710 may include a trainer's manual, multimedia materials, workbooks, software, audio and video materials, slide show presentations, scripts, assessment tools, and any other tool that may facilitate training processes.

Figure 29:
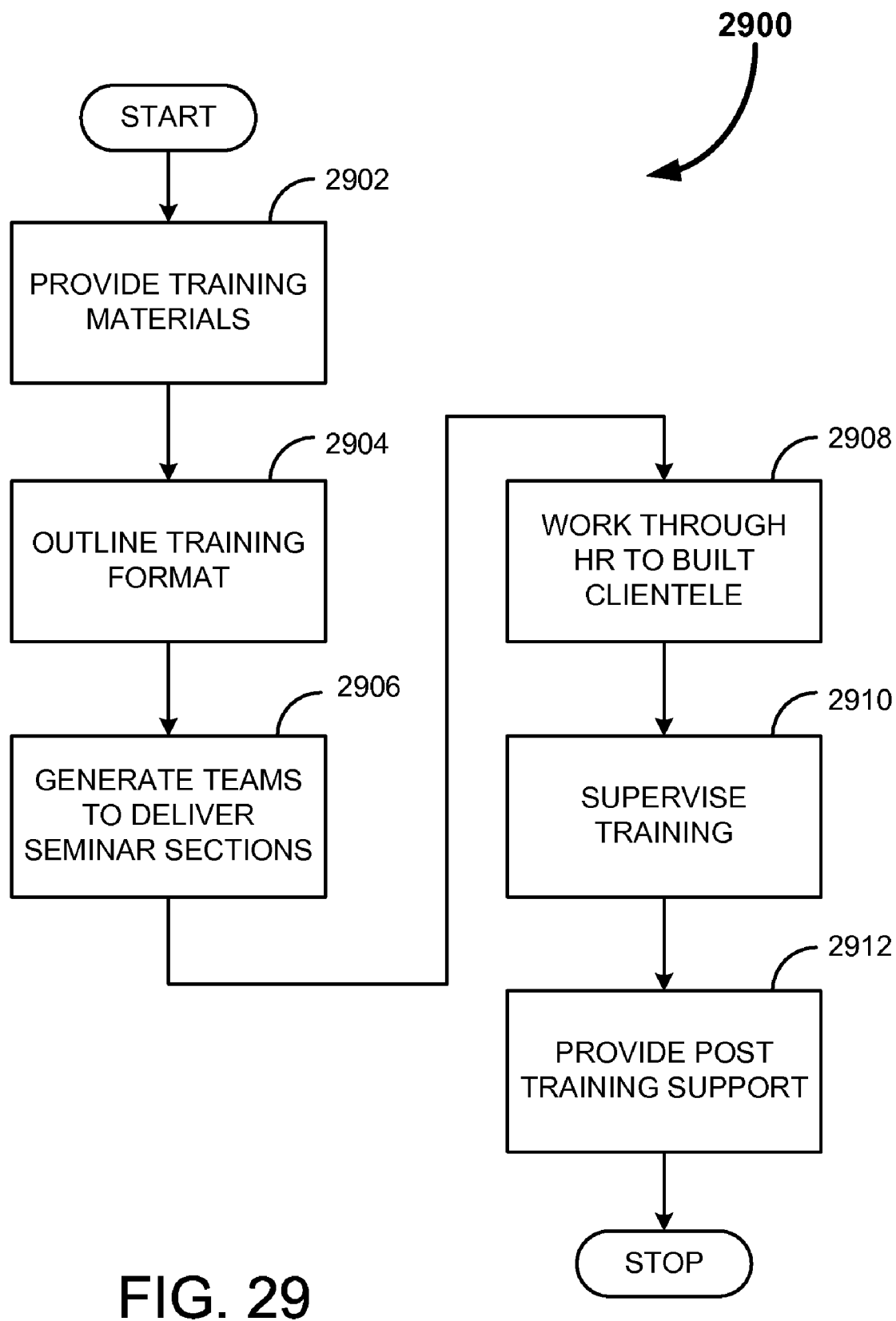
FIG. 29 shows a flow chart illustrating the process for training the trainer for the train the trainer system of FIG. 27.

FIG. 29 shows a flow chart illustrating the process for training the trainer, shown generally at 2900. The process begins and then progresses to step 2902 where training Materials 2710 are provided. Then, at step 2904, the training format may be outlined. Teams may be generated at step 2906. These teams may deliver seminar sections, thereby providing practical exercise of the training process. At step 2908, the human resources departments of the trainer's are leveraged to aid in developing a clientele base. The process then progresses to step 2910 where the trained trainers are supervised, thereby ensuring quality of the downstream lessons, as well as aiding in the trainer's education. At step 2912, post training support is provided to the trainers. This support may include customer service type support, support groups, memos, hotlines, and facilitation when needed. The process then ends.

In sum, the present invention provides a system and method for a turbo evolution machine, and more particularly systems and methods to enhance any personal relationship through self enhancement ("turbo evolution" state) and through tools for resolving interpersonal conflict. The turbo evolution system has the capacity to engage deep personal awareness coupled with powerful interpersonal conflict resolution tools to efficiently engineer human cultures with the precision and exactitude.

Other modifications and embodiments of the present invention are possible. For example, while the entire turbo evolution machine has been disclosed as being digitized and performed on a computer, it may be possible, in some embodiments to perform the turbo evolution machine manually via "pen and paper" techniques. Likewise, while synchronizations have been disclosed as being be performed over the internet or other network, face to face synchronizations are also possible.

Alternately, in some embodiments, it may be possible that the entire system be automated. In such embodiments, synchronizations may be performed with a virtual partner.

Although the present invention has been described in considerable detail with reference to exemplary embodiments, modifications, variations, permutations, and substitute equivalents may be made to the disclosed embodiments while remaining within the subject and spirit of the invention. Therefore, the spirit and scope of the appended claims should not be limited to the description of the versions contained herein.

What is claimed is:

1. A computerized method for evaluating an innate profile of an individual, useful in conjunction with training the individual in self-evaluation, the method comprising the computer implemented steps of:
    identifying an intelligence makeup of the individual as one selected at least three intelligences by scoring a completed intelligence questionnaire, wherein the three intelligences includes a logic intelligence, an emotion intelligence and an intuition intelligence;
    assessing relative strength in at least three assets of the individual by scoring a completed asset questionnaire, wherein the at least three assets includes at least a technical asset, a psychological asset, and a relational asset;
    distinguishing a viewpoint of the individual through behavioral and attitudinal analysis, wherein the viewpoint is at least one of an introversion and an extroversion;
    identifying a dominant perceptual orientation of the individual from more than one possible perceptual orientations by scoring of a completed questionnaire, wherein the more than one possible perceptual orientations are generated by cross referencing the intelligence makeup with the viewpoint, and further wherein at least one perceptual orientation exists for each of extroversion logic intelligence, introversion logic intelligence, extroversion emotion intelligence, and introversion intuition intelligence;
    aggregating profile information of the individual by compiling the intelligence makeup, the relative strength of the three assets, and the dominant perceptual orientations; and
    generating, using a computer, an innate profile report of the individual from the aggregated profile information.

2. The method of claim 1, wherein the innate profile report includes generated profile data generated by comparing the intelligence makeup, the relative strength of the three assets, and the dominant perceptual orientations.

3. The method of claim 1, wherein the dominant perceptual orientation of the individual includes at least one of a principle perceptual orientation, a service perceptual orientation, an accomplishment perceptual orientation, an essence perceptual orientation, a brilliance perceptual orientation, a vision perceptual orientation, an affirmation perceptual orientation, an energy perceptual orientation, and a unity perceptual orientation.

4. The method of claim 3, wherein the individual may transform from the dominant perceptual orientation to at least two secondary perceptual orientations.

5. The method of claim 1, wherein the scoring the completed asset questionnaire includes weighting questions of the completed asset questionnaire.

6. The method of claim 1, wherein the scoring the completed intelligence questionnaire includes weighting questions of the completed intelligence questionnaire.

7. The method of claim 1, wherein the scoring the asset questionnaire is configurable.

8. The method of claim 1, wherein the scoring the intelligence questionnaire is configurable.

9. The method of claim 1, wherein the aggregating profile information of the individual includes summing the profile information.

10. The method of claim 9, wherein the summing the profile information includes weighing the profile information, and wherein said weighing is configurable.

11. The method of claim 1, wherein at least one perceptual orientation exists for each of extroversion intuition intelligence, introversion emotion intelligence, and a hybrid of introversion and extroversion logic intelligence.

12. The method of claim 1, wherein the innate profile report provides direction for interactions between the individual and others depending upon dominant perceptual orientation of the others.

13. The method of claim 12, wherein the innate profile report enables the individual to consciously perceive and convey interpersonal information with other individuals having other intelligence makeups.

14. A computerized method for typing a dominant perceptual orientation of an individual, useful in conjunction with evaluating an innate profile and state of being of the individual, the method comprising the computer implemented steps of:
    receiving an intelligence makeup of the individual from a three intelligences assessor, wherein the intelligence makeup includes relative strengths of at least one of a logic intelligence, an emotion intelligence, and an intuition intelligence;
    distinguishing a viewpoint of the individual through perceptual analysis, wherein the viewpoint is at least one of an introversion and an extroversion;
    generating more than one possible perceptual orientations of the individual by cross referencing the intelligence makeup with the viewpoint, wherein at least one perceptual orientation exists for each of extroversion logic intelligence, introversion logic intelligence, extroversion emotion intelligence, and introversion intuition intelligence;
distinguishing a dominant perceptual orientation from the more than one possible perceptual orientations of the individual by scoring of a completed questionnaire; and
generating, using a computer, a report for the distinguished dominant perceptual orientation.

15. The method of claim 14, wherein the dominant perceptual orientation of the individual includes at least one of a principle perceptual orientation, a service perceptual orientation, an accomplishment perceptual orientation, an essence perceptual orientation, a brilliance perceptual orientation, a vision perceptual orientation, an affirmation perceptual orientation, an energy perceptual orientation, and a unity perceptual orientation.

16. The method of claim 15, wherein the individual may transform from the dominant perceptual orientation to at least two secondary perceptual orientations.

17. The method of claim 15, wherein the innate profile report provides direction for interactions between the individual and others depending upon dominant perceptual orientation of the others.

18. The method of claim 17, wherein the innate profile report enables the individual to consciously perceive and convey interpersonal information with other individuals having other intelligence makeups.

19. A computerized method for interacting with at least one partner, useful for interaction between an individual and the at least one partner with whom the individual interacts, the method comprising the computer implemented steps of:
evaluating, using a computer, an innate profile of the individual, wherein the evaluation produces a innate profile report for the individual, wherein evaluating the innate profile for the individual comprises:
identifying an intelligence makeup of the individual as one of a logic intelligence, an emotion intelligence and an intuition intelligence;
distinguishing whether the individual has an introversion and an extroversion viewpoint;
identifying a dominant perceptual orientation of the individual by cross referencing the intelligence makeup with the viewpoint, wherein at least one perceptual orientation exists for each of extroversion logic intelligence, introversion logic intelligence, extroversion emotion intelligence, and introversion intuition intelligence;
generating a self-insight report of the individual, wherein the self insight report utilizes the innate profile report of the individual;
facilitating self-awareness in the individual by exploring the insight report;
synchronizing the individual with the at least one partner with whom the individual interacts, wherein the synchronization includes forming at least one dyad between the individual and one of the at least one partner, conveying the insight report to each member of the dyad, and facilitating bilateral understandings between the dyad members; and
training the individual to resolve one or more conflicts with the at least one partner, wherein the training includes one or more conflict resolution tools.

20. The method of claim 19, further comprising synchronizing the individual with a team, wherein the team includes the individual and more than one other individual, and wherein each individual of the team synchronizes with every other individual of the team.

21. The method of claim 20, wherein each individual of the team synchronizing with every other individual of the team includes generating agreements between the individuals.

22. The method of claim 21, wherein the team generates agreements with each individual of the team.

23. The method of claim 19, wherein the conflict resolution tools includes at least one of cross intelligence communication, creative partnership, and conflict to creativity.

24. A computerized training system useful in conjunction with training an individual in self-evaluation and useful for training the individual to interact with the at least one partner, the training system comprising a non-transitory computer readable medium containing instructions operable by a computer, comprising:
an intelligence assessor configured to identify an intelligence makeup of the individual as one selected at least three intelligences by scoring a completed intelligence questionnaire, wherein the three intelligences includes a logic intelligence, an emotion intelligence and an intuition intelligence;
an asset assessor configured to assess relative strength in at least three assets of the individual by scoring a completed asset questionnaire, wherein the at least three assets includes at least a technical asset, a psychological asset, and a relational asset;
a perception assayer configured to identify a dominant perceptual orientation of the individual, wherein the perception assayer further comprises:
a receiver configured to receive the intelligence makeup of the individual from the three intelligences assessor;
a viewpoint delineator configured to distinguish a viewpoint of the individual through behavioral and attitudinal analysis, wherein the viewpoint is at least one of an introversion and an extroversion;
a candidate generator configured to generate more than one possible perceptual orientations of the individual by cross referencing the intelligence makeup with the viewpoint, wherein at least one perceptual orientation exists for each of extroversion logic intelligence, introversion logic intelligence, extroversion emotion intelligence, and introversion intuition intelligence;
a perception identifier configured to distinguish the dominant perceptual orientation from the more than one possible perceptual orientations of the individual by scoring of a completed questionnaire; and
wherein the dominant perceptual orientation of the individual includes at least one of a principle perceptual orientation, a service perceptual orientation, an accomplishment perceptual orientation, an essence perceptual orientation, a brilliance perceptual orientation, a vision perceptual orientation, an affirmation perceptual orientation, an energy perceptual orientation, and a unity perceptual orientation;
an aggregator configured to aggregate profile information of the individual by compiling the intelligence makeup, the relative strength of the three assets, and the dominant perceptual orientations;
a reporter, using a computer, configured to generate an innate profile report of the individual from the aggregated profile information;
the reporter further configured to generate a self-insight report of the individual, wherein the self insight report utilizes the innate profile report of the individual;

a facilitator configured to facilitate self-awareness in the individual by exploring the insight report;

a synchronizer configured to synchronize the individual with the at least one partner with whom the individual interacts, wherein the synchronizer forms at least one dyad between the individual and one of the at least one partner, conveys the insight report to each member of the dyad, and facilitates bilateral understandings between the dyad members; and a trainer configured to train the individual to resolve one or more conflicts with the at least one partner, wherein the training includes one or more conflict resolution tools, and wherein the conflict resolution tools includes at least one of cross intelligence communication, creative partnership, and conflict to creativity.

* * * * *